(12) United States Patent
Fujiie et al.

(10) Patent No.: US 6,288,990 B1
(45) Date of Patent: *Sep. 11, 2001

(54) REPRODUCING APPARATUS, RECORDING APPARATUS, AND RECORDING MEDIUM

(75) Inventors: Kazuhiko Fujiie; Yasushi Maeda, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,767

(22) Filed: Oct. 8, 1998

(30) Foreign Application Priority Data

Oct. 21, 1997 (JP) .................................................. 9-288731
Dec. 10, 1997 (JP) .................................................. 9-340159

(51) Int. Cl.[7] ..................................................... G11B 7/00
(52) U.S. Cl. ................................. 369/47.21; 369/47.22; 369/59.25; 369/275.3
(58) Field of Search ......................... 369/275.3, 58, 369/48, 47, 32, 59

(56) References Cited

U.S. PATENT DOCUMENTS

| 5,243,582 | * | 9/1993 | Yamauchi et al. | 369/32 |
|---|---|---|---|---|
| 5,590,100 | * | 12/1996 | Ogusu et al. | 369/50 |
| 5,805,550 | * | 9/1998 | Ohmori | 369/58 |
| 5,854,619 | * | 12/1998 | Kato | 345/116 |
| 5,953,290 | * | 9/1999 | Fukuda et al. | 369/32 |
| 6,011,897 | * | 1/2000 | Koyama et al. | 369/48 |
| 6,067,282 | * | 5/2000 | Moriyama et al. | 369/58 |
| 6,088,312 | * | 7/2000 | Utsumi | 369/48 |

* cited by examiner

Primary Examiner—Nabil Hindi
(74) Attorney, Agent, or Firm—Oblon, Spivak, McClelland, Maier & Neustadt, P.C.

(57) ABSTRACT

In reproducing a recording medium having a main data area for recording main data, an auxiliary data area for recording auxiliary data such as image data and text data corresponding to the main data, a first control area for controlling the main data area, and a second control area for controlling the auxiliary data, the auxiliary data is reproduced in a predetermined timed relation with the main data based on synchronization information recorded in the second control area.

17 Claims, 42 Drawing Sheets

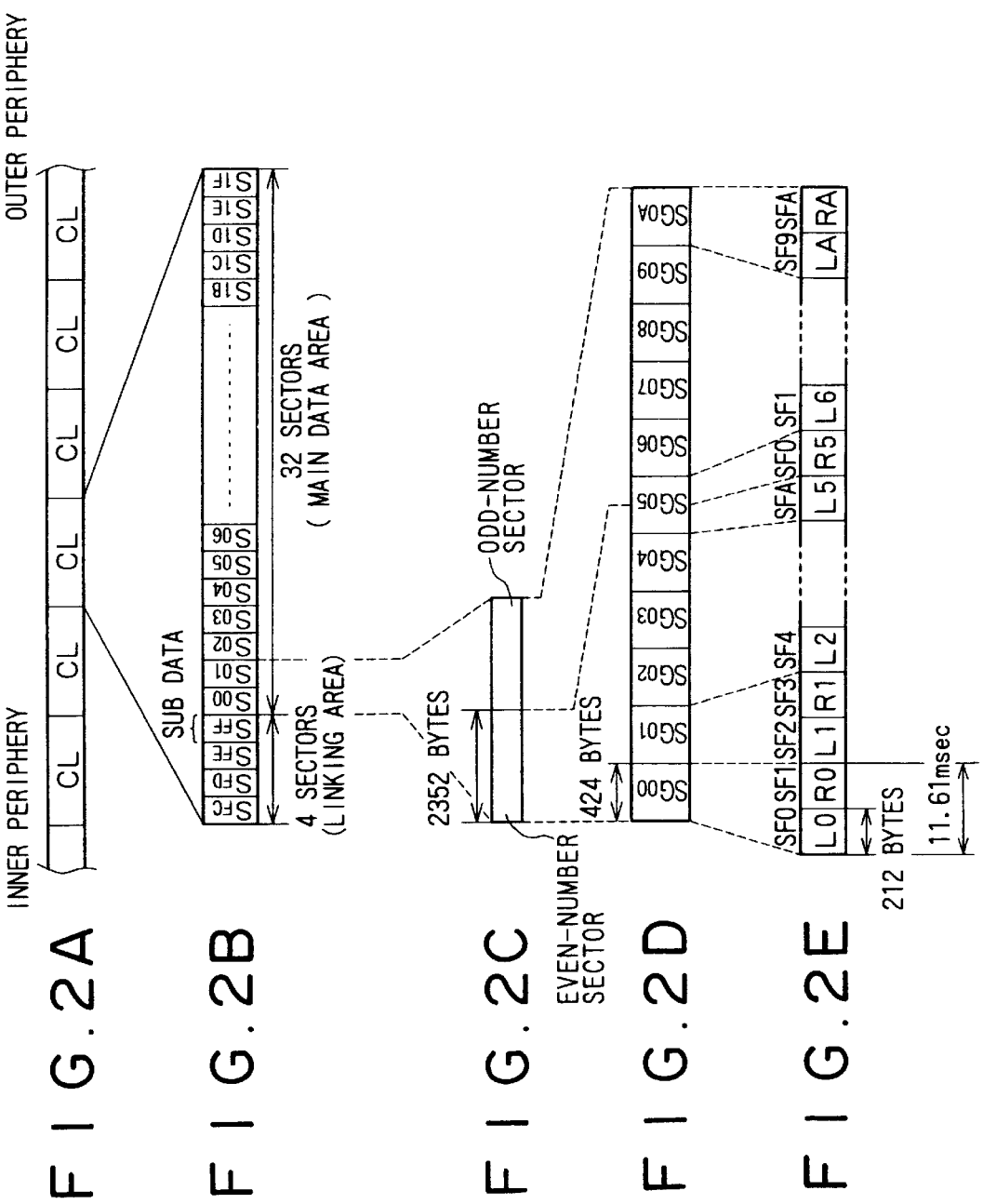

FIG. 4A

ADDRESS EXAMPLES

| CLUSTER | SECTOR | SOUND GROUP |
|---|---|---|
| 0032h | 00h | 0h |
| 0 0 0 0 0 0 0 0 0 0 1 1 0 0 1 0 | 0 0 0 0 0 0 0 0 | 0 0 0 0 |

| (SHORT-FORM ADDRESS) | 0 0 0 0 0 0 0 0 1 1 0 0 1 0 | 0 0 0 0 0 0 | 0 0 0 0 |
|---|---|---|---|
| | 00h | C8h | 00h |

FIG. 4B

| 0032h | 04h | 0h |
|---|---|---|
| 0 0 0 0 0 0 0 0 0 0 1 1 0 0 1 0 | 0 0 0 0 0 1 0 0 | 0 0 0 0 |

| (SHORT-FORM ABSOLUTE ADDRESS) | 0 0 0 0 0 0 0 0 1 1 0 0 1 0 | 0 0 0 1 0 0 | 0 0 0 0 |
|---|---|---|---|
| | 00h | C8h | 40h |
| (SHORT-FORM OFFSET ADDRESS) | 0 0 0 0 0 0 0 0 0 0 0 0 0 0 0 0 | 0 0 0 1 0 0 | 0 0 0 0 |
| | 00h | 00h | 40h |

FIG. 4C

| 0032h | 13h | 9h |
|---|---|---|
| 0 0 0 0 0 0 0 0 0 0 1 1 0 0 1 0 | 0 0 0 1 0 0 1 1 | 1 0 0 1 |

| (SHORT-FORM ABSOLUTE ADDRESS) | 0 0 0 0 0 0 0 0 1 1 0 0 1 0 | 0 1 0 0 1 1 | 1 0 0 1 |
|---|---|---|---|
| | 00h | C9h | 39h |
| (SHORT-FORM OFFSET ADDRESS) | 0 0 0 0 0 0 0 0 0 0 0 0 0 0 0 0 | 0 1 0 0 1 1 | 1 0 0 1 |
| | 00h | 01h | 39h |

FIG.6

| | 16bits | | 16bits | | |
|---|---|---|---|---|---|
| | MSB  LSB | MSB  LSB | MSB  LSB | MSB  LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| POINTER SECTION { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| TABLE SECTION (255 PART TABLES) (01h) | START ADDRESS | (TRACK ADDRESS) | | TRACK MODE | 78 |
| | END ADDRESS | | | LINK INFORMATION | 79 |
| (02h) | START ADDRESS | (TRACK ADDRESS) | | TRACK MODE | 80 |
| | END ADDRESS | | | LINK INFORMATION | 81 |
| (03h) | START ADDRESS | (TRACK ADDRESS) | | TRACK MODE | 82 |
| | END ADDRESS | | | LINK INFORMATION | 83 |
| (FCh) | START ADDRESS | (TRACK ADDRESS) | | TRACK MODE | 580 |
| | END ADDRESS | | | LINK INFORMATION | 581 |
| (FDh) | START ADDRESS | (TRACK ADDRESS) | | TRACK MODE | 582 |
| | END ADDRESS | | | LINK INFORMATION | 583 |
| (FEh) | START ADDRESS | (TRACK ADDRESS) | | TRACK MODE | 584 |
| | END ADDRESS | | | LINK INFORMATION | 585 |
| (FFh) | START ADDRESS | (TRACK ADDRESS) | | TRACK MODE | 586 |
| | END ADDRESS | | | LINK INFORMATION | 587 |

U-TOC SECTOR 0

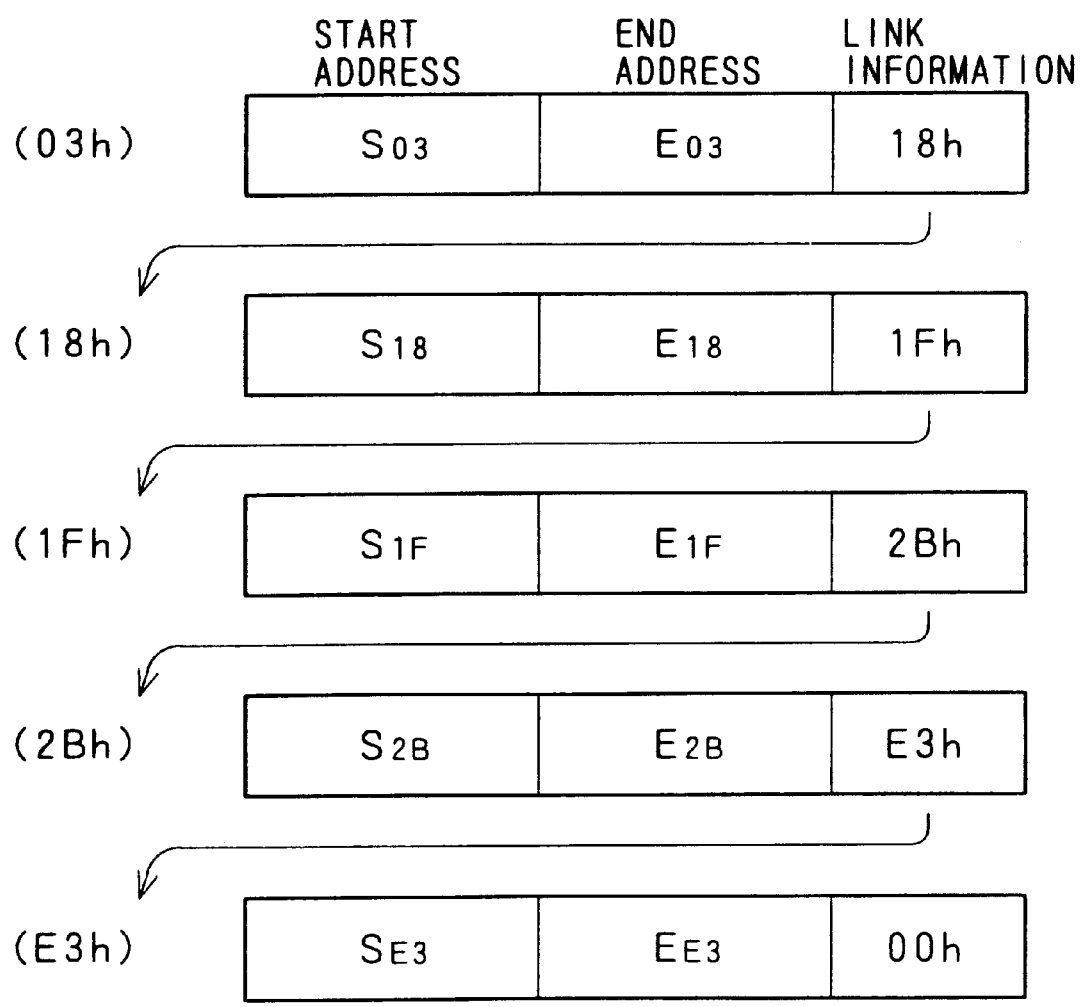

FIG.8

| | | | | |
|---|---|---|---|---|
| HEADER | 00000000 11111111 | 11111111 11111111 | 11111111 11111111 | 11111111 11111111 | 0 |

| | 16bits | 16bits | | |
|---|---|---|---|---|
| | MSB　　LSB | MSB　　LSB | MSB　　LSB | MSB　　LSB | |
| HEADER | 00000000 11111111 | 11111111 11111111 | 11111111 11111111 | 11111111 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (01h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| | 00000000 | 00000000 | 00000000 | P-EMPTY | 11 |
| | 00000000 | P-TNA1 | P-TNA2 | P-TNA3 | 12 |
| POINTER SECTION | P-TNA4 | P-TNA5 | P-TNA6 | P-TNA7 | 13 |
| | P-TNA248 | P-TNA249 | P-TNA250 | P-TNA251 | 74 |
| | P-TNA252 | P-TNA253 | P-TNA254 | P-TNA255 | 75 |

| | | | | |
|---|---|---|---|---|
| (00h) | DISK NAME | | | 76 |
| | DISK NAME | | LINK INFORMATION | 77 |
| (01h) | DISK NAME/TRACK NAME | | | 78 |
| | DISK NAME/TRACK NAME | | LINK INFORMATION | 79 |
| (02h) | DISK NAME/TRACK NAME | | | 80 |
| | DISK NAME/TRACK NAME | | LINK INFORMATION | 81 |
| (03h) | DISK NAME/TRACK NAME | | | 82 |
| | DISK NAME/TRACK NAME | | LINK INFORMATION | 83 |
| (FEh) | DISK NAME/TRACK NAME | | | 584 |
| | DISK NAME/TRACK NAME | | LINK INFORMATION | 585 |
| (FFh) | DISK NAME/TRACK NAME | | | 586 |
| | DISK NAME/TRACK NAME | | LINK INFORMATION | 587 |

SLOT SECTION 255+1 SLOTS

U-TOC SECTOR 1

FIG.9

| 16bits | | 16bits | | |
|---|---|---|---|---|
| MSB LSB | MSB LSB | MSB LSB | MSB LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | Sector (02h) | MODE | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TRD1 | P-TRD2 | P-TRD3 | 12 |
| P-TRD4 | P-TRD5 | P-TRD6 | P-TRD7 | 13 |
| P-TRD248 | P-TRD249 | P-TRD250 | P-TRD251 | 74 |
| P-TRD252 | P-TRD253 | P-TRD254 | P-TRD255 | 75 |

- HEADER: rows 0–3
- POINTER SECTION: rows 11–75
- SLOT SECTION 255+1 SLOTS:

| | | | |
|---|---|---|---|
| (00h) | DISC RECORDING DATE | | 76 |
| | | MAKER CODE | MODEL CODE | 77 |
| (01h) | TRACK RECORDING DATE | | 78 |
| | | MAKER CODE | MODEL CODE | 79 |
| (02h) | TRACK RECORDING DATE | | 80 |
| | | MAKER CODE | MODEL CODE | 81 |
| (03h) | TRACK RECORDING DATE | | 82 |
| | | MAKER CODE | MODEL CODE | 83 |
| (FEh) | TRACK RECORDING DATE | | 584 |
| | | MAKER CODE | (LINK INFORMATION) | 585 |
| (FFh) | TRACK RECORDING DATE | | 586 |
| | | MAKER CODE | (LINK INFORMATION) | 587 |

U-TOC SECTOR 2

U-TOC SECTOR 4

FIG. 11

| | 16bits | | 16bits | | |
|---|---|---|---|---|---|
| | MSB LSB | MSB LSB | MSB LSB | MSB LSB | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (00h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | Back UP | ASPB flag | 7 |
| | Used Sectors | | | | 8 |
| | 00000000 | 00000000 | 00000000 | 00000000 | 9 |
| | 00000000 | 00000000 | 00000000 | 00000000 | 10 |
| POINTER SECTION | 00000000 | 00000000 | P-DFAA | P-EMPTY | 11 |
| POINTER SECTION | P-BLANK | P-SPICT | P-TEXT | P-KRAOK | 12 |
| | 00000000 | 00000000 | 00000000 | 00000000 | 13 |
| | ⋮ | ⋮ | ⋮ | ⋮ | |
| | 00000000 | 00000000 | 00000000 | 00000000 | 74 |
| | 00000000 | 00000000 | 00000000 | 00000000 | 75 |
| | 00000000 | 00000000 | 00000000 | 00000000 | 76 |
| | 00000000 | 00000000 | 00000000 | 00000000 | 77 |
| TABLE SECTION (255 PART TABLES) (01h) | START ADDRESS | (AREA ADDRESS) | | 00000000 | 78 |
| | END ADDRESS | (AREA ADDRESS) | | LINK INFORMATION | 79 |
| (02h) | START ADDRESS | (AREA ADDRESS) | | 00000000 | 80 |
| | END ADDRESS | (AREA ADDRESS) | | LINK INFORMATION | 81 |
| (03h) | START ADDRESS | (AREA ADDRESS) | | 00000000 | 82 |
| | END ADDRESS | (AREA ADDRESS) | | LINK INFORMATION | 83 |
| | ⋮ | | | | |
| (FCh) | START ADDRESS | (AREA ADDRESS) | | 00000000 | 580 |
| | END ADDRESS | (AREA ADDRESS) | | LINK INFORMATION | 581 |
| (FDh) | START ADDRESS | (AREA ADDRESS) | | 00000000 | 582 |
| | END ADDRESS | (AREA ADDRESS) | | LINK INFORMATION | 583 |
| (FEh) | START ADDRESS | (AERA ADDRESS) | | 00000000 | 584 |
| | END ADDRESS | (AERA ADDRESS) | | LINK INFORMATION | 585 |
| (FFh) | START ADDRESS | (AREA ADDRESS) | | 00000000 | 586 |
| | END ADDRESS | (AREA ADDRESS) | | LINK INFORMATION | 587 |

AUX-TOC SECTOR 0
(AREA ALLOCATION TABLE)

FIG. 12

| | 16bits | | 16bits | | |
|---|---|---|---|---|---|
| | MSB　　　LSB | MSB　　　LSB | MSB　　　LSB | MSB　　　LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (01h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| POINTER SECTION | 00000000 | 00000000 | 00000000 | P-EMPTY | 11 |
| | P-PFRA | P-PN01 | P-PN02 | P-PN03 | 12 |
| | P-PN04 | P-PN05 | P-PN06 | P-PN07 | 13 |
| | (P-PN0248) | (P-PN0249) | (P-PN0250) | (P-PN0251) | 74 |
| | (P-PN0252) | (P-PN0253) | (P-PN0254) | (P-PN0255) | 75 |
| TABLE SECTION (255+1 PART TABLES) (00h) | START ADDRESS　(COVER PICTURE | | | SPICT MODE | 76 |
| | END ADDRESS　　　　FILE ADDRESS) | | | 00000000 | 77 |
| (01h) | START ADDRESS　( PICTURE | | | SPICT MODE | 78 |
| | END ADDRESS　　　　FILE ADDRESS) | | | 00000000 | 79 |
| (02h) | START ADDRESS　( PICTURE | | | SPICT MODE | 80 |
| | END ADDRESS　　　　FILE ADDRESS) | | | 00000000 | 81 |
| (03h) | START ADDRESS　( PICTURE | | | SPICT MODE | 82 |
| | END ADDRESS　　　　FILE ADDRESS) | | | 00000000 | 83 |
| (FCh) | START ADDRESS　( PICTURE | | | SPICT MODE | 580 |
| | END ADDRESS　　　　FILE ADDRESS) | | | 00000000 | 581 |
| (FDh) | START ADDRESS　( PICTURE | | | SPICT MODE | 582 |
| | END ADDRESS　　　　FILE ADDRESS) | | | 00000000 | 583 |
| (FEh) | START ADDRESS　( PICTURE | | | SPICT MODE | 584 |
| | END ADDRESS　　　　FILE ADDRESS) | | | 00000000 | 585 |
| (FFh) | START ADDRESS　( PICTURE | | | SPICT MODE | 586 |
| | END ADDRESS　　　　FILE ADDRESS) | | | 00000000 | 587 |

AUX-TOC SECTOR 1
(STILL PICTURE ALLOCATION TABLE)

FIG. 13

| 16bits | | 16bits | | |
|---|---|---|---|---|
| MSB  LSB | MSB  LSB | MSB  LSB | MSB  LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | Sector (02h) | MODE | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | CHARACTER CODE | 10 |
| 00000000 | 00000000 | 00000000 | P-EMPTY | 11 |
| 00000000 | P-PNA1 | P-PNA2 | P-PNA3 | 12 |
| P-PNA4 | P-PNA5 | P-PNA6 | P-PNA7 | 13 |
| (P-PNA248) | (P-PNA249) | (P-PNA250) | (P-PNA251) | 74 |
| (P-PNA252) | (P-PNA253) | (P-PNA254) | (P-PNA255) | 75 |

- Rows 0–3: HEADER
- Rows 11–75: POINTER SECTION

SLOT SECTION (255+1 SLOTS):

| | | |
|---|---|---|
| (00h) | ------- COVER PICTURE NAME ------- | 76 |
| | LINK INFORMATION | 77 |
| (01h) | ------------ PICTURE NAME ------------ | 78 |
| | LINK INFORMATION | 79 |
| (02h) | ------------ PICTURE NAME ------------ | 80 |
| | LINK INFORMATION | 81 |
| (03h) | ------------ PICTURE NAME ------------ | 82 |
| | LINK INFORMATION | 83 |
| (FEh) | ------------ PICTURE NAME ------------ | 584 |
| | LINK INFORMATION | 585 |
| (FFh) | ------------ PICTURE NAME ------------ | 586 |
| | LINK INFORMATION | 587 |

AUX-TOC SECTOR 2
(STILL PICTURE NAME TABLE)

FIG. 14

| | 16bits | | 16bits | | |
|---|---|---|---|---|---|
| | MSB　　　LSB | MSB　　　LSB | MSB　　　LSB | MSB　　　LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (03h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| | 00000000 | 00000000 | 00000000 | P-EMPTY | 11 |
| | 00000000 | P-PRD1 | P-PRD2 | P-PRD3 | 12 |
| POINTER { | P-PRD4 | P-PRD5 | P-PRD6 | P-PRD7 | 13 |
| SECTION | ～ | ～ | ～ | ～ | |
| | (P-PRD248) | (P-PRD249) | (P-PRD250) | (P-PRD251) | 74 |
| | (P-PRD252) | (P-PRD253) | (P-PRD254) | (P-PRD255) | 75 |
| (00h) | COVER PICTURE | | | | 76 |
| | RECORDING DATE | | MAKER CODE | MODEL CODE | 77 |
| (01h) | PICTURE | | | | 78 |
| | RECORDING DATE | | MAKER CODE | MODEL CODE | 79 |
| SLOT (02h) | PICTURE | | | | 80 |
| SECTION | RECORDING DATE | | MAKER CODE | MODEL CODE | 81 |
| (255+1 (03h) | PICTURE | | | | 82 |
| SLOTS) | RECORDING DATE | | MAKER CODE | MODEL CODE | 83 |
| | ～ | ～ | ～ | ～ | |
| (FEh) | PICTURE | | | | 584 |
| | RECORDING DATE | | MAKER CODE | LINK INFORMATION | 585 |
| (FFh) | PICTURE | | | | 586 |
| | RECORDING DATE | | MAKER CODE | LINK INFORMATION | 587 |

AUX-TOC SECTOR 3
(STILL PICTURE RECORDING DATE TABLE)

FIG. 15

|  | ←—16bits—→ | ←—16bits—→ | | | |
|---|---|---|---|---|---|
|  | MSB　　　LSB | MSB　　　LSB | MSB　　　LSB | MSB　　　LSB | |
| HEADER { | 00000000 | 11111111 | 11111111 | 11111111 | 0 |
|  | 11111111 | 11111111 | 11111111 | 11111111 | 1 |
|  | 11111111 | 11111111 | 11111111 | 00000000 | 2 |
|  | ClusterH | ClusterL | Sector(04h) | MODE | 3 |
|  | 00000000 | 00000000 | 00000000 | 00000000 | 4 |
|  | 00000000 | 00000000 | 00000000 | 00000000 | 5 |
|  | 00000000 | 00000000 | 00000000 | 00000000 | 6 |
|  | 00000000 | 00000000 | 00000000 | 00000000 | 7 |
|  | 00000000 | 00000000 | 00000000 | 00000000 | 8 |
|  | 00000000 | 00000000 | 00000000 | 00000000 | 9 |
|  | 00000000 | 00000000 | 00000000 | 00000000 | 10 |
|  | 00000000 | 00000000 | 00000000 | P-EMPTY | 11 |
|  | 00000000 | P-PCD1 | P-PCD2 | P-PCD3 | 12 |
| POINTER SECTION | P-PCD4 | P-PCD5 | P-PCD6 | P-PCD7 | 13 |
|  | (P-PCD248) | (P-PCD249) | (P-PCD250) | (P-PCD251) | 74 |
|  | (P-PCD252) | (P-PCD253) | (P-PCD254) | (P-PCD255) | 75 |

| | | |
|---|---|---|
| (00h) | — COVER PICTURE CODE — | 76 / 77 |
| (01h) | —— PICTURE CODE —— | 78 / 79 |
| SLOT SECTION (255+1 SLOTS) (02h) | —— PICTURE CODE —— | 80 / 81 |
| (03h) | —— PICTURE CODE —— | 82 / 83 |
| (FEh) | —— PICTURE CODE —— | 584 / 585 |
| (FFh) | —— PICTURE CODE —— | 586 / 587 |

AUX-TOC SECTOR 4
(STILL PICTURE CODE TABLE)

FIG. 16

| 16bits | | 16bits | | |
|---|---|---|---|---|
| MSB       LSB | MSB       LSB | MSB       LSB | MSB       LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | Sector (05h) | MODE | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TN01 | P-TN02 | P-TN03 | 12 |
| P-TN04 | P-TN05 | P-TN06 | P-TN07 | 13 |
| P-TN0248 | P-TN0249 | P-TN0250 | P-TN0251 | 74 |
| P-TN0252 | P-TN0253 | P-TN0254 | P-TN0255 | 75 |
| (00h) | START ADDRESS | (COVER PICTURE | 00000000 | 76 |
|       | END ADDRESS | OUTPUT ADDRESS) | 00000000 | 77 |
| (01h) | START ADDRESS | (PICTURE | P-PNO (*) | 78 |
|       | END ADDRESS | OUTPUT ADDRESS) | LINK INFORMATION | 79 |
| (02h) | START ADDRESS | (PICTURE | P-PNO (*) | 80 |
|       | END ADDRESS | OUTPUT ADDRESS) | LINK INFORMATION | 81 |
| (03h) | START ADDRESS | (PICTURE | P-PNO (*) | 82 |
|       | END ADDRESS | OUTPUT ADDRESS) | LINK INFORMATION | 83 |
| (FCh) | START ADDRESS | (PICTURE | P-PNO (*) | 580 |
|       | END ADDRESS | OUTPUT ADDRESS) | LINK INFORMATION | 581 |
| (FDh) | START ADDRESS | (PICTURE | P-PNO (*) | 582 |
|       | END ADDRESS | OUTPUT ADDRESS) | LINK INFORMATION | 583 |
| (FEh) | START ADDRESS | (PICTURE | P-PNO (*) | 584 |
|       | END ADDRESS | OUTPUT ADDRESS) | LINK INFORMATION | 585 |
| (FFh) | START ADDRESS | (PICTURE | P-PNO (*) | 586 |
|       | END ADDRESS | OUTPUT ADDRESS) | LINK INFORMATION | 587 |

HEADER: rows 0–3
POINTER SECTION: rows 11–75
TABLE SECTION (255+1 PART TABLES): rows 76–587

AUX-TOC SECTOR 5
(STILL PICTURE PLAYBACK SEQUENCE TABLE)

FIG.17

| | ←—16bits—→ | ←—16bits—→ | | |
|---|---|---|---|---|---|
| | MSB · · · LSB | MSB · · · LSB | MSB · · · LSB | MSB · · · LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (06h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| | 00000000 | 00000000 | 00000000 | P-EMPTY | 11 |
| | P-TFRA | P-TXT1 | P-TXT2 | P-TXT3 | 12 |
| POINTER SECTION { | P-TXT4 | P-TXT5 | P-TXT6 | P-TXT7 | 13 |
| | (P-TXT248) | (P-TXT249) | (P-TXT250) | (P-TXT251) | 74 |
| | (P-TXT252) | (P-TXT253) | (P-TXT254) | (P-TXT255) | 75 |
| (00h) | START ADDRESS | (COVER PICTURE | | CHARACTER CODE | 76 |
| | END ADDRESS | TEXT FILE ADDRESS) | | 00000000 | 77 |
| (01h) | START ADDRESS | ( TEXT | | CHARACTER CODE | 78 |
| | END ADDRESS | FILE ADDRESS) | | 00000000 | 79 |
| (02h) | START ADDRESS | ( TEXT | | CHARACTER CODE | 80 |
| | END ADDRESS | FILE ADDRESS) | | 00000000 | 81 |
| (03h) | START ADDRESS | ( TEXT | | CHARACTER CODE | 82 |
| | END ADDRESS | FILE ADDRESS) | | 00000000 | 83 |
| TABLE SECTION (255+1 PART TABLES) { (FCh) | START ADDRESS | ( TEXT | | CHARACTER CODE | 580 |
| | END ADDRESS | FILE ADDRESS) | | 00000000 | 581 |
| (FDh) | START ADDRESS | ( TEXT | | CHARACTER CODE | 582 |
| | END ADDRESS | FILE ADDRESS) | | 00000000 | 583 |
| (FEh) | START ADDRESS | ( TEXT | | CHARACTER CODE | 584 |
| | END ADDRESS | FILE ADDRESS) | | 00000000 | 585 |
| (FFh) | START ADDRESS | ( TEXT | | CHARACTER CODE | 586 |
| | END ADDRESS | FILE ADDRESS) | | 00000000 | 587 |

AUX-TOC SECTOR 6
(TEXT ALLOCATION TABLE)

FIG. 18

| | 16bits | | 16bits | | |
|---|---|---|---|---|---|
| | MSB  LSB | MSB  LSB | MSB  LSB | MSB  LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (07h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| POINTER SECTION | 00000000 | 00000000 | 00000000 | P-EMPTY | 11 |
| | 00000000 | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| TABLE SECTION (255+1 PART TABLES) (00h) | START ADDRESS | (DISPLAY TEXT | | 00000000 | 76 |
| | END ADDRESS | OUTPUT ADDRESS) | | 00000000 | 77 |
| (01h) | START ADDRESS | (TEXT OUTPUT | | P-TXT(*) | 78 |
| | END ADDRESS | ADDRESS) | | LINK INFORMATION | 79 |
| (02h) | START ADDRESS | (TEXT OUTPUT | | P-TXT(*) | 80 |
| | END ADDRESS | ADDRESS) | | LINK INFORMATION | 81 |
| (03h) | START ADDRESS | (TEXT OUTPUT | | P-TXT(*) | 82 |
| | END ADDRESS | ADDRESS) | | LINK INFORMATION | 83 |
| (FCh) | START ADDRESS | (TEXT OUTPUT | | P-TXT(*) | 580 |
| | END ADDRESS | ADDRESS) | | LINK INFORMATION | 581 |
| (FDh) | START ADDRESS | (TEXT OUTPUT | | P-TXT(*) | 582 |
| | END ADDRESS | ADDRESS) | | LINK INFORMATION | 583 |
| (FEh) | START ADDRESS | (TEXT OUTPUT | | P-TXT(*) | 584 |
| | END ADDRESS | ADDRESS) | | LINK INFORMATION | 585 |
| (FFh) | START ADDRESS | (TEXT OUTPUT | | P-TXT(*) | 586 |
| | END ADDRESS | ADDRESS) | | LINK INFORMATION | 587 |

AUX-TOC SECTOR 7
(TEXT PLAYBACK SEQUENCE TABLE)

FIG. 19

|  | 16bits | | 16bits | | |
|---|---|---|---|---|---|
|  | MSB ... LSB | MSB ... LSB | MSB ... LSB | MSB ... LSB | |
| HEADER { | 00000000 | 11111111 | 11111111 | 11111111 | 0 |
|  | 11111111 | 11111111 | 11111111 | 11111111 | 1 |
|  | 11111111 | 11111111 | 11111111 | 00000000 | 2 |
|  | ClusterH | ClusterL | Sector (08h) | MODE | 3 |
|  | 00000000 | 00000000 | 00000000 | 00000000 | 4 |
|  | 00000000 | 00000000 | 00000000 | 00000000 | 5 |
|  | 00000000 | 00000000 | 00000000 | 00000000 | 6 |
|  | 00000000 | 00000000 | 00000000 | 00000000 | 7 |
|  | 00000000 | 00000000 | 00000000 | 00000000 | 8 |
|  | 00000000 | 00000000 | 00000000 | 00000000 | 9 |
|  | 00000000 | 00000000 | 00000000 | 00000000 | 10 |
| POINTER SECTION { | 00000000 | 00000000 | 00000000 | P-EMPTY | 11 |
|  | P-KFRA | P-TN01 | P-TN02 | P-TN03 | 12 |
|  | P-TN04 | P-TN05 | P-TN06 | P-TN07 | 13 |
|  | P-TN0248 | P-TN0249 | P-TN0250 | P-TN0251 | 74 |
|  | P-TN0252 | P-TN0253 | P-TN0254 | P-TN0255 | 75 |
|  | 00000000 | 00000000 | 00000000 | 00000000 | 76 |
|  | 00000000 | 00000000 | 00000000 | 00000000 | 77 |
| TABLE SECTION (255 PART TABLES) (01h) | START ADDRESS | (KARAOKE TEXT | | CHARACTER CODE | 78 |
|  | END ADDRESS | FILE ADDRESS) | | 00000000 | 79 |
| (02h) | START ADDRESS | (KARAOKE TEXT | | CHARACTER CODE | 80 |
|  | END ADDRESS | FILE ADDRESS) | | 00000000 | 81 |
| (03h) | START ADDRESS | (KARAOKE TEXT | | CHARACTER CODE | 82 |
|  | END ADDRESS | FILE ADDRESS) | | 00000000 | 83 |
| (FCh) | START ADDRESS | (KARAOKE TEXT | | CHARACTER CODE | 580 |
|  | END ADDRESS | FILE ADDRESS) | | 00000000 | 581 |
| (FDh) | START ADDRESS | (KARAOKE TEXT | | CHARACTER CODE | 582 |
|  | END ADDRESS | FILE ADDRESS) | | 00000000 | 583 |
| (FEh) | START ADDRESS | (KARAOKE TEXT | | CHARACTER CODE | 584 |
|  | END ADDRESS | FILE ADDRESS) | | 00000000 | 585 |
| (FFh) | START ADDRESS | (KARAOKE TEXT | | CHARACTER CODE | 586 |
|  | END ADDRESS | FILE ADDRESS) | | 00000000 | 587 |

AUX-TOC SECTOR 8
(KARAOKE TEXT ALLOCATION TABLE)

FIG. 20

| 16bits (MSB–LSB) | 16bits (MSB–LSB) | 16bits (MSB–LSB) | 16bits (MSB–LSB) | |
|---|---|---|---|---|
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | Sector (09h) | MODE | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TN01 | P-TN02 | P-TN03 | 12 |
| P-TN04 | P-TN05 | P-TN06 | P-TN07 | 13 |
| P-TN0248 | P-TN0249 | P-TN0250 | P-TN0251 | 74 |
| P-TN0252 | P-TN0253 | P-TN0254 | P-TN0255 | 75 |
| 00000000 | 00000000 | 00000000 | 00000000 | 76 |
| 00000000 | 00000000 | 00000000 | 00000000 | 77 |
| (01h) START ADDRESS | (KARAOKE ADDRESS | | 00000000 | 78 |
| END ADDRESS | FILE ADDRESS) | | 00000000 | 79 |
| (02h) START ADDRESS | (KARAOKE ADDRESS | | 00000000 | 80 |
| END ADDRESS | FILE ADDRESS) | | 00000000 | 81 |
| (03h) START ADDRESS | (KARAOKE ADDRESS | | 00000000 | 82 |
| END ADDRESS | FILE ADDRESS) | | 00000000 | 83 |
| (FCh) START ADDRESS | (KARAOKE ADDRESS | | 00000000 | 580 |
| END ADDRESS | FILE ADDRESS) | | 00000000 | 581 |
| (FDh) START ADDRESS | (KARAOKE ADDRESS | | 00000000 | 582 |
| END ADDRESS | FILE ADDRESS) | | 00000000 | 583 |
| (FEh) START ADDRESS | (KARAOKE ADDRESS | | 00000000 | 584 |
| END ADDRESS | FILE ADDRESS) | | 00000000 | 585 |
| (FFh) START ADDRESS | (KARAOKE ADDRESS | | 00000000 | 586 |
| END ADDRESS | FILE ADDRESS) | | 00000000 | 587 |

Sections: HEADER (rows 0–3), POINTER SECTION (rows 11–75), TABLE SECTION (255 PART TABLES) (rows 78–587).

AUX-TOC SECTOR 9
(KARAOKE SYNCHRONIZATION ALLOCATION TABLE)

PICTURE FILE SECTOR

TEXT FILE SECTOR

FIG.23

| 16bits | | 16bits | | |
|---|---|---|---|---|
| MSB　　　LSB | MSB　　　LSB | MSB　　　LSB | MSB　　　LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| ClusterH | ClusterL | Sector | MODE | 3 |
| 00000000 | 00000000 | 00000000 | 00000000 | 4 |
| Mode | Category | Index | ID | 5 |
| DK0 | DK1 | DK2 | DK3 | 6 |
| DK4 | DK5 | DK6 | DK7 | 7 |
| DK8 | DK9 | DK10 | DK11 | 8 |
| DK12 | DK13 | DK14 | DK15 | 9 |
| DK16 | DK17 | DK18 | DK19 | 10 |
| DK20 | DK21 | DK22 | DK23 | 11 |
| DK2300 | DK2301 | DK2302 | DK2303 | 581 |
| DK2304 | DK2305 | DK2306 | DK2307 | 582 |
| DK2308 | DK2309 | DK2310 | DK2311 | 583 |
| DK2312 | DK2313 | DK2314 | DK2315 | 584 |
| DK2316 | DK2317 | DK2318 | DK2319 | 585 |
| DK2320 | DK2321 | DK2322 | DK2323 | 586 |
| EDC0 | EDC1 | EDC2 | EDC3 | 587 |

HEADER: rows 0-3

DATA 2324 BYTES

KARAOKE TEXT FILE SECTOR

KARAOKE ADDRESS SECTOR

FIG. 25A

KARAOKE TEXT FILE SECTOR

| DK0 | DK1 | DK2 | DK3 |
|---|---|---|---|
| 59h (Y) | 6Fh (o) | 75h (u) | 20h (␣) |
| DK4 | DK5 | DK6 | DK7 |
| 6Bh (k) | 6Eh (n) | 6Fh (o) | 77h (w) |

FIG. 25B

KARAOKE ADDRESS SECTOR
(EXAMPLE OF OFFSET ADDRESS)

| AK0 | AK1 | AK2 | AK3 |
|---|---|---|---|
| 00h | 00h | 40h | 00h |
| (0032h CLUSTER, | | 04h SECTOR, 0h SOUND GROUP) | (DUMMY) |
| AK4 | AK5 | AK6 | AK7 |
| 00h | 01h | 39h | 00h |
| (0032h CLUSTER, | | 13h SECTOR, 9h SOUND GROUP) | (DUMMY) |

FIG. 25C

KARAOKE ADDRESS SECTOR
(EXAMPLE OF ABSOLUTE ADDRESS)

| AK0 | AK1 | AK2 | AK3 |
|---|---|---|---|
| 00h | C8h | 40h | 00h |
| (0032h CLUSTER, | | 04h SECTOR, 0h SOUND GROUP) | (DUMMY) |
| AK4 | AK5 | AK6 | AK7 |
| 00h | C9h | 39h | 00h |
| (0032h CLUSTER, | | 13h SECTOR, 9h SOUND GROUP) | (DUMMY) |

KARAOKE TEXT SECTOR

FIG. 27

| DK0 59h | DK1 6Fh | DK2 75h | DK3 20h |
|---|---|---|---|
| DK4 6Bh | DK5 6Eh | DK6 6Fh | DK7 77h |
| ... | ... | ... | ... |
| DK1020 | DK1021 | DK1022 | DK1023 |
| AK0 00h | AK1 00h | AK2 40h | AK3 00h |
| AK4 00h | AK5 01h | AK6 39h | AK7 00h |

KARAOKE TEXT FILE SECTOR

FIG. 29

| | 16bits | | 16bits | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| | Mode | Category | Index | ID | 11 |
| BLOCK #1 | SOL | CTL | Fnt | PX | 12 |
| | P-Y | 「a」 | 「b」 | 「c」 | 13 |
| | <Display Start Address> | | | | |
| | <Wipe Start> | | <Wipe End> | | |
| | <Display End> | | WLa | PLa | 74 |
| | WLb | PLb | WLc | PLc | 75 |
| BLOCK #2 | 「d」 | 「e」 | 「f」 | 「g」 | 76 |
| | 「h」 | 「i」 | 「j」 | 00000000 | 77 |
| | WLd | PLd | WLe | PLe | 78 |
| | WLf | PLf | WLg | PLg | 79 |
| | WLh | PLh | WLi | PLi | 80 |
| | WLj | PLj | 00000000 | 00000000 | 81 |
| | SOL | CTL | Fnt | P-X | 82 |
| | P-Y | 「k」 | 「l」 | 「m」 | 83 |
| | ⋮ | ⋮ | ⋮ | ⋮ | 84 |
| | | | | | 581 |
| BLOCK #96 | 「x」 | 「y」 | 「z」 | 00000000 | 582 |
| | 00000000 | 00000000 | 00000000 | 00000000 | 583 |
| | WLx | PLx | WLy | PLy | 584 |
| | WLx | PLz | 00000000 | 00000000 | 585 |
| | 00000000 | 00000000 | 00000000 | 00000000 | 586 |
| | 00000000 | 00000000 | 00000000 | 00000000 | 587 |

DATA (2304 BYTES, 96 BLOCKS)

KARAOKE TEXT FILE SECTOR (TO NEXT SECTOR IF LYRICS TEXT FOR ONE PIECE OF MUSIC STILL CONTINUES)

F I G. 30A a b c d e f g h i j

F I G. 30B a b c d e f g h i j
k l m n o

F I G. 30C a b c d e f g h i j
k l m n o

F I G. 30D k l m n o

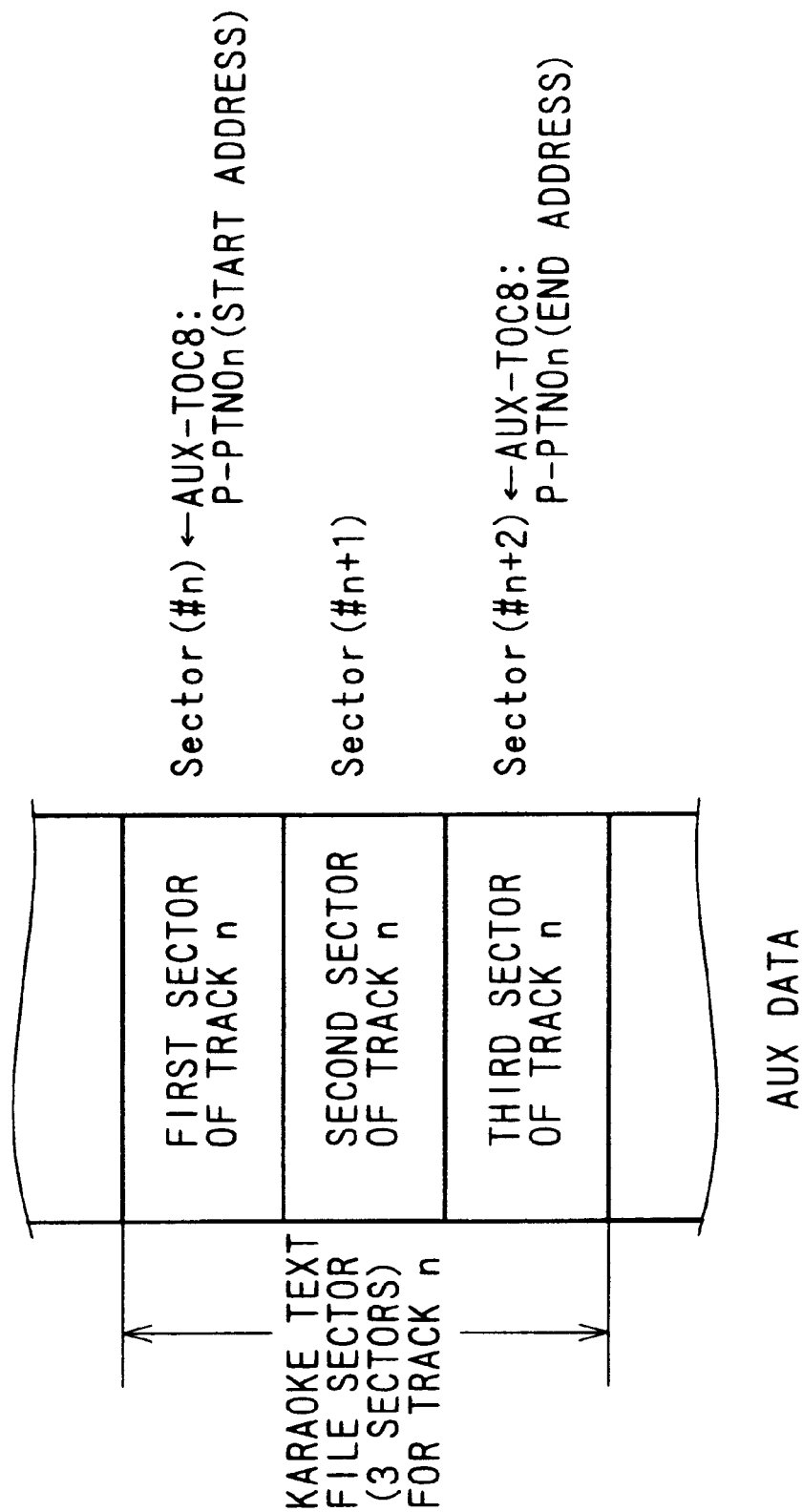

KARAOKE TEXT FILE SECTOR
(FIRST SECTOR)

KARAOKE TEXT FILE SECTOR
(SECOND SECTOR)

KARAOKE TEXT FILE SECTOR
(THIRD SECTOR)

FIG. 35A

FIRST SECTOR

| P-KRL(n) SPECIFIED VALUE | SLOT SPECIFIED BY POINTER |
|---|---|
| 1 | LINE 78 (BLOCK #1) |
| 2 | LINE 84 (BLOCK #2) |
| ⋮ K ⋮ | LINE 72 + 6K  (1 ≤ K ≤ 85) |
| 85 | LINE 582 (BLOCK #85) |

FIG. 35B

SECOND SECTOR

| P-KRL(n) SPECIFIED VALUE | SLOT SPECIFIED BY POINTER |
|---|---|
| 86 | LINE 78 (BLOCK #86) |
| 87 | LINE 84 (BLOCK #87) |
| ⋮ L ⋮ | LINE 6L − 438  (86 ≤ L ≤ 170) |
| 170 | LINE 582 (BLOCK #170) |

FIG. 35C

THIRD SECTER

| P-KRL(n) SPECIFIED VALUE | SLOT SPECIFIED BY POINTER |
|---|---|
| 171 | LINE 78 (BLOCK #171) |
| 172 | LINE 84 (BLOCK #172) |
| ⋮ M ⋮ | LINE 6M + 998  (171 ≤ M ≤ 255) |
| 255 | LINE 582 (BLOCK #255) |

FIG.36

| | | | | |
|---|---|---|---|---|
| SOL | CTL | Fnt | P-X | 78 |
| P-Y | 「a」 | 「b」 | LINK INFORMATION (LinkP=3) | 79 |
| <Display Start Address> | | | | 80 |
| <Wipe Start> | | <Wipe End> | | 81 |
| <Display End> | | WLa | PLa | 82 |
| WLb | PLb | * | * | 83 |

BLOCK #1 comprises rows 78–83.

| | | | | |
|---|---|---|---|---|
| 「c」 | 「d」 | 「e」 | 「f」 | 96 |
| 「g」 | 「h」 | 「i」 | LINK INFORMATION (LinkP=0) | 97 |
| WLc | PLc | WLd | PLd | 98 |
| WLe | PLe | WLf | PLf | 99 |
| WLg | PLg | WLh | PLh | 100 |
| WLi | PLi | * | * | 101 |

BLOCK #4 comprises rows 96–101.

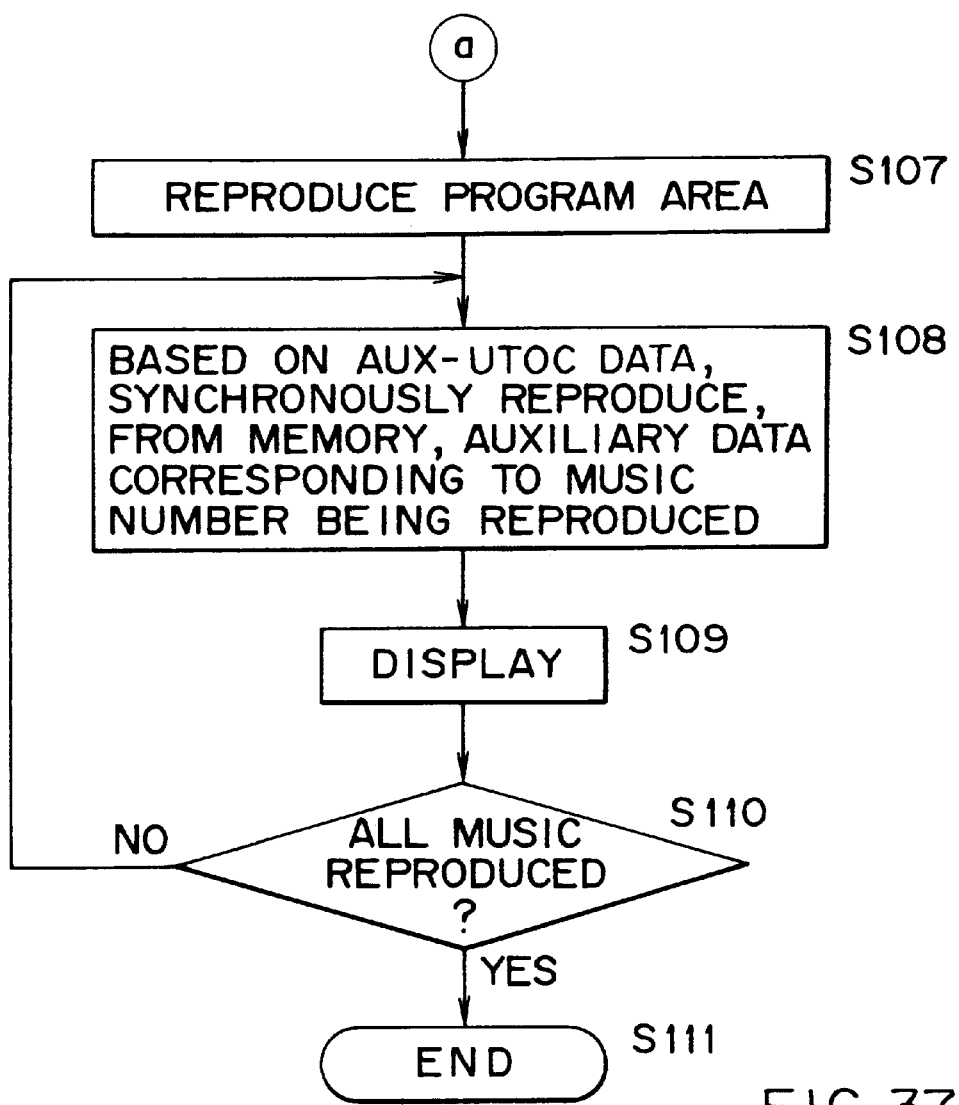
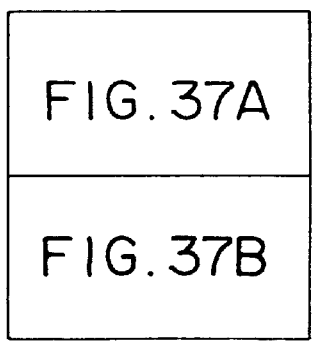

REPRODUCING APPARATUS, RECORDING APPARATUS, AND RECORDING MEDIUM

BACKGROUND OF THE INVENTION

1. Field of the Invention

The present invention generally relates to a recording medium capable of recording main data such as audio data for example and auxiliary data such as character information and image information for example, a recording apparatus compatible with this recording medium, and a reproducing apparatus compatible with this recording medium.

2. Description of Related Art

A recording and/or reproducing apparatus that uses a recording medium such as a magneto-optical disc for digitally recording an audio signal or a magnetic tape is known as a recording and/or reproducing apparatus for recording and/or reproducing music data and so on.

A recording and/or reproducing system that uses magneto-optical disc known as a Mini Disc (trademark) allows its user not only to record and reproduce an audio signal such as of music as a program but also to record as character information a disc name, which is a disc title name, and a track name, which is a music title, of each program of recorded music. At the time of reproduction of a piece of music for example, its disc title, music title, artist name, and other recorded character information can be displayed on the display monitor arranged on the reproducing apparatus.

It should be noted that the term "program" used herein denotes the unit of audio data such as music as the main data to be recorded on a disc. For example, one piece of music of audio data provides one program. It should also be noted that the term "track" is also used hereafter to denote the above-mentioned program.

In the Mini Disc system, the information recorded as a disc name and a track name is not so large in size; namely, the information is only sufficient in size to record the number of characters constituting several titles such as mentioned above. To be more specific, in control information U-TOC (User Table Of Contents) for controlling a program recording and/or reproducing operation, character information for each program can be recorded and its recordable size is not so large. For example, a comparatively large size of character information such as a lyrics text of a song recorded as a program cannot be recorded in a U-TOC.

In addition, the character information in a U-TOC is only related to a program as a whole; namely, it is not related to a particular reproducing position in a piece of music for example as a program. Therefore, a character information display timing cannot be set, according to a play position, to music to be reproduced. For example, even if a comparatively large size of character information equivalent to a lyrics text of music can be recorded, the lyrics text cannot be displayed in synchronization with the progress of the play. For example, displaying a lyrics text in synchronization with a vocal or for lyrics text guiding in karaoke playing.

However, recording a comparatively large size of character information such as a lyrics text and outputting for display the character information in synchronization with music play timing is enabled by recording the character information not in a U-TOC but an area called an auxiliary data area. CD-Graphics is known as a system for recording character information in such an auxiliary area to display a lyrics text.

This will be detailed with reference to FIG. 2. In the case of a Mini Disc system, the data unit called a cluster provides the basic unit of a recording operation. This cluster has an area of 32 sectors in which audio data is recorded as a program and an area in which one sector of auxiliary data is recorded. Therefore, storing the character information such as a lyrics text corresponding to the audio data stored in a cluster onto the auxiliary data area in each cluster can record a comparatively large size of lyrics text information and output the recorded information for display in synchronization with the play of music.

However, the above-mentioned use of auxiliary data involves following problems.

Because a recording operation is performed with one cluster as a minimum unit, auxiliary data alone cannot be recorded. Therefore, because additional recording of auxiliary data alone is disabled, if an attempt is made to additionally record character information providing a lyrics text onto auxiliary data for a recorded piece of music to be rewritten, all of the audio data, which is the main data, and the auxiliary data, which is character information, must be recorded again. This holds true with modifying character information. Hence, additional writing or modification of character information or adjustment of display timing is not necessarily impossible but is burdensome and takes time.

In other words, in additionally recording character information onto auxiliary data, the audio data, which is the main data, must be reproduced in a predetermined amount and the reproduced audio data must be stored in memory. Then, the stored audio data must be read on a cluster basis and character information must be added to the auxiliary data portion to be recorded onto disc again.

In addition, because character information comes to be controlled strictly as a complete accompaniment to a program, flexible handling of character information is disabled, thereby hampering the future system expansion.

SUMMARY OF THE INVENTION

In consideration of the above-mentioned problems, it is an object of the present invention to provide a recording and/or reproducing apparatus of a higher added value than that of conventional counterpart. The recording and/or reproducing apparatus according to the invention records a program that provides main data and a data file that provides auxiliary data such as characters and images, outputs the data file as lyrics text information for example in synchronization with the reproduction of the main program or in synchronization with a fine timing such as of a position inside music for example, and controls the data file independently of the main program for more versatile output forms. The added value of the recording and/or reproducing apparatus according to the invention is still enhanced by enabling the recording, editing, and reproducing of the data file alone as auxiliary data.

In carrying out the invention and according to one aspect thereof, there is provided a reproducing apparatus for reproducing a recording medium having main data area for recording a main program composed of main data, an auxiliary data area for recording an auxiliary program composed of auxiliary data corresponding to the main program composed of the main data in the main data area, a first control area for controlling at least a recording position of the main program composed of the main data in the main data area, and a second control area for controlling at least a recording position of the auxiliary program composed of the auxiliary data in the auxiliary data area and timing information for reproducing the auxiliary program in synchronization with the main program composed of the main data in the main data area, the reproducing apparatus comprising: a reproducing module for reproducing the first control area, the second control area, the auxiliary data area, and the main data area sequentially; a memory module for storing the auxiliary program composed of the auxiliary data reproduced by the reproducing module from the auxiliary data area; a memory control module for reading from the memory module the auxiliary program composed of the auxiliary data corresponding to the main program in synchronization with the main program reproduced from the main data area by the reproducing module based on the timing information reproduced from the second control area by the reproducing module; and a display module for displaying the auxiliary program in synchronization with the main program, the auxiliary program being read from the memory module.

In carrying out the invention according to another aspect thereof, there is provided a recording apparatus for recording auxiliary data in a manner related to main data onto a recording medium having main data area for recording a main program composed of the main data, an auxiliary data area for recording an auxiliary program composed of the auxiliary data corresponding to the main program composed of the main data in the main data area, a first control area for controlling at least a recording position of the main program composed of the main data in the main data area, and a second control area for controlling at least a recording position of the auxiliary program composed of the auxiliary data in the auxiliary data area and timing information for reproducing the auxiliary program in synchronization with the main program composed of the main data in the main data area, the recording apparatus comprising: a recording module for recording the auxiliary program composed of the auxiliary data corresponding to the main program onto the auxiliary data area; an operating module for relating the auxiliary program recorded by the recording module to the main program recorded in the main data area; and an updating module for updating, based on the recording position of the auxiliary program recorded in the auxiliary data area by the recording module and an operation performed through the operating module, the auxiliary program composed of the auxiliary data in the auxiliary data area recorded in the second control area and timing information for use in synchronous reproduction.

In carrying out the invention and according to still another aspect thereof, there is provided a recording medium having a main data area for recording at least one main program composed of main data, an auxiliary data area for recording an auxiliary program composed of auxiliary data corresponding to the main program composed of the main data, a first control area for controlling at least a recording position of the main program composed of the main data in the main data area, and a second control area for controlling at least a recording position of the auxiliary program composed of the auxiliary data in the auxiliary data area and timing information for reproducing the auxiliary program in synchronization with the main program composed of the main data recorded in the main data area.

BRIEF DESCRIPTION OF THE DRAWINGS

These and other objects of the invention will be seen by reference to the description, taken in connection with the accompanying drawing, in which:

FIG. 2A is a schematic diagram illustrating a state in which a cluster, or a unit of recording, is recorded on a disc according to the invention;

FIG. 2B is a schematic diagram illustrating a data structure of the above-mentioned cluster;

FIG. 2C is a diagram illustrating a data structure of two sectors that constitute a sound frame;

FIG. 2D is a diagram illustrating a data structure of sound groups SGs that constitute a sound frame;

FIG. 2E is a diagram illustrating a data structure of right-channel data and left-channel data that constitute a sound group SG;

FIG. 4A shows a table indicative of a start address represented in the short address format;

FIG. 4B shows a table indicative of predetermined addresses represented in a short absolute address format and a short offset address format;

FIG. 4C shows a table indicative of predetermined addresses represented in the short absolute address format and the short offset address format;

FIG. 6 is a diagram illustrating a data structure of U-TOC sector 0 for controlling addresses recorded in the control area;

FIG. 7 is a schematic diagram illustrating a linked state of slots linked by link information;

FIG. 8 is a diagram illustrating a data structure of U-TOC sector 1 in the control area for controlling character information;

FIG. 9 is a diagram illustrating a data structure of U-TOC sector 2 in the control area for controlling recording date;

FIG. 11 is a diagram illustrating a data structure of AUX-TOC sector 0 in the control area for controlling area allocation;

FIG. 12 is a diagram illustrating a data structure of AUX-TOC sector 1 in the control area for controlling still image allocation;

FIG. 13 is a diagram illustrating a data structure of AUX-TOC sector 2 in the control area for controlling character information for a still image;

FIG. 14 is a diagram illustrating a data structure of AUX-TOC sector 3 in the control area for controlling recording date information for a still image;

FIG. 15 is a diagram illustrating a data structure of AUX-TOC sector 4 in the control area for controlling code information for a still image;

FIG. 16 is a diagram illustrating a data structure of AUX-TOC sector 5 in the control area for controlling reproduction timing information for a still image;

FIG. 17 is a diagram illustrating a data structure of AUX-TOC sector 6 in the control area for controlling a recording position of character information for description of music for example;

FIG. 18 is a diagram illustrating a data structure of AUX-TOC sector 7 in the control area for controlling a reproduction timing of character information for description of music for example;

FIG. 19 is a diagram illustrating a data structure of AUX-TOC sector 8 in the control area for controlling a recording position of character information for a lyrics text for example;

FIG. 20 is a diagram illustrating a data structure of AUX-TOC sector 9 in the control area for controlling a reproduction timing of character information for a lyrics text for example;

FIG. 23 is a diagram illustrating a data structure of a karaoke text file sector to be recorded in the AUX data area;

FIG. 25A is a diagram illustrating an example of description of the karaoke text file sector;

FIG. 25B is a diagram illustrating an example of description of the karaoke address sector written in a corresponding offset address in the karaoke text file sector;

FIG. 25C is a diagram illustrating an example of description of the karaoke address sector written in an absolute address in the karaoke text file sector;

FIG. 27 is a diagram illustrating a data structure in which the karaoke text data and the karaoke address data of FIG. 26 are controlled;

FIG. 29 is a diagram illustrating a data structure of a karaoke text file sector practiced as a third preferred embodiment of the invention;

FIGS. 30A through 30D are diagrams illustrating transitions of displaying a lyrics text to be realized by the karaoke text file sector shown in FIG. 29.

FIG. 31 is a diagram illustrating a karaoke text file practiced as a fourth preferred embodiment of the invention;

FIGS. 35A through 35C are diagrams illustrating specification rules on the karaoke text file by a pointer in the fourth preferred embodiment shown in FIG. 31;

FIG. 36 is a diagram illustrating a structure of the karaoke text file corresponding to one line of lyrics text in the fourth preferred embodiment shown in FIG. 31;

FIGS. 37A and 37B are flowcharts indicative of a reproduction procedure in the reproducing apparatus associated with the present invention.

DETAILED DESCRIPTION OF PREFERRED EMBODIMENTS

This invention will be described in further detail by way of example with reference to the accompanying drawings.

In the preferred embodiments of the invention described below, a magneto-optical disc (or a Mini Disc) is used by way of example of a recording medium and a Mini Disc recording and/or reproducing apparatus is used by way of example of a recording apparatus and a reproducing apparatus.

Figure 1:
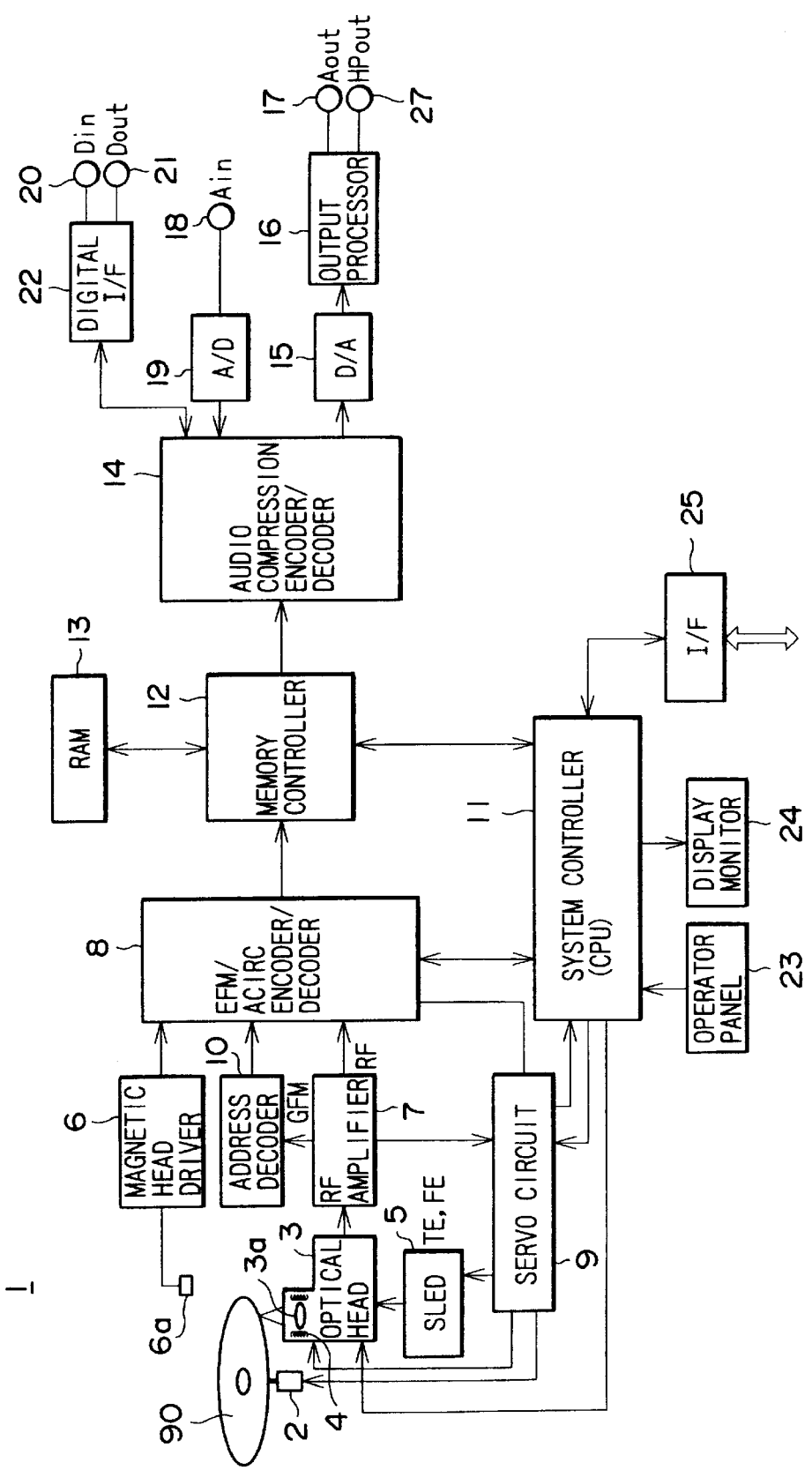
FIG. 1 is a block diagram illustrating a recording and/or reproducing apparatus practiced as one preferred embodiment of the invention.

The description will be made in the following order:
1. Constitution of the recording and/or reproducing apparatus
2. Sector format and address format
3. Area structure
4. U-TOC
4-1 U-TOC sector 0
4-2 U-TOC sector 1
4-3 U-TOC sector 2
4-4 U-TOC sector 4
5. AUX-TOC
5-1 AUX-TOC sector 0
5-2 AUX-TOC sector 1
5-3 AUX-TOC sector 2
5-4 AUX-TOC sector 3
5-5 AUX-TOC sector 4
5-6 AUX-TOC sector 5
5-7 AUX-TOC sector 6
5-8 AUX-TOC sector 7
5-9 AUX-TOC sector 8
5-10 AUX-TOC sector 9
6. Data files
6-1 Picture file sector
6-2 Text file sector
6-3 Karaoke text file sector
6-4 Karaoke address sector
7. Reproducing program-synchronized data file
8. Recording AUX data
9. Variations
9-1 Variation A
9-2 Variation B
9-3 Variation C
9-4 Variation D 1. Constitution of the Recording and/or Reproducing Apparatus FIG. 1 is a block diagram illustrating an internal constitution of a Mini Disc recording and/or reproducing apparatus 1 practiced as one preferred embodiment of the invention. A magneto-optical disc (a Mini Disc) 90 on which audio data is recorded is rotatably driven by a spindle motor 2. A laser beam is radiated from an optical head 3 onto the magneto-optical disc 90 at the time of a data recording and/or reproducing operation.

The optical head 3 performs, at recording, a high-level laser output operation to heat a recording track to the Curie temperature and, at reproduction, a comparatively low laser output operation to detect data from the reflected laser beam by the magnetic Kerr effect.

To achieve these objects, the optical head 3 has a laser diode as a laser output means, an optical system composed of a polarized beam splitter and an objective lens 3a, and a detector for detecting a reflected laser beam. The objective lens 3a is displaceably held by a two-axis feed mechanism in radial and axial directions relative to the disc 90.

A magnetic head 6a is arranged at a position opposed to the optical head 3 with the disc 90 located in between. The magnetic head 6a field-modulates modulated data supplied from an EFM (Eight-to-Fourteen Modulation)/ACIRC (Advanced Cross Interleave Reed Solomon Coding) encoder/decoder 8 and applies resultant data onto the magneto-optical disc 90.

The entire optical head 3 and the magnetic head 6a are movable by a sled-feed mechanism 5 in the radial direction relative to the disc 90.

Information read from the disc 90 by the optical head 3 in a reproducing operation is supplied to an RF amplifier 7. From the supplied information, the RF amplifier 7 extracts by computation a reproduced RF signal, a tracking error signal TE, a focus error signal FE, and groove information GFM. The groove information GMF denotes absolute positional information recorded on the disc 90 beforehand as a pre-groove (Wobbling Groove).

The extracted reproduced RF signal is supplied to the EFM/ACIRC encoder/decoder 8. The tracking error signal TE and the focus error signal FE are supplied to a servo circuit 9. The groove information GFM is supplied to an address decoder 10.

Based on the supplied tracking error signal TE, the focus error signal FE, a track jump command and an access command issued from a system controller 11 constituted by a microcomputer, and revolution detect information of the spindle motor 2, the servo circuit 9 generates various servo drive signals to control the two-axis feed mechanism 4 and the sled-feed mechanism 5, thereby performing focus control and tracking control and controlling the spindle motor 2 to a constant linear velocity (CLV).

The address decoder 10 decodes the supplied groove information GFM to extract address information. The extracted address information is supplied to the system controller 11 to be used for various control operations.

EFM/ACIRC encoder/decoder 8 performs EFM (Eight-to-Fourteen Modulation)-demodulation and ACIRC (Advanced Cross Interleave Reed Solomon Coding)-decoding on the reproduced RF signal. At this moment, an address and auxiliary code data are also extracted to be supplied to the system controller 11.

The audio data demodulated and decoded in the EFM/ACIRC encoder/decoder 8 is once stored by a memory controller 12 into a buffer memory 13. It should be noted that reading of data by the optical head 3 from the disc 90 and transferring of reproduced data through a path from the optical head 3 to the buffer memory 13 are performed at 1.41 Mbit/second intermittently.

The data written to the buffer memory 13 is read in a timed relation in which the reproduced data is transferred at 0.3 Mbit/second to be supplied to an audio compression encoder/decoder 14. Then, the reproduced data undergoes such reproduced signal processing as audio decompression for audio compression to provide a digital audio signal of 44.1 KHz sampling and 16-bit quantization.

This digital audio signal is converted by a D/A converter 15 into an analog signal to be adjusted in level and impedance by an output processor 16, being outputted from a line output terminal 17 to an external device as an analog audio signal Aout. The digital audio signal is also supplied to a headphone output terminal 27 as headphone output HPout to be outputted to a headphone connected to the apparatus.

The digital audio signal as decoded by the audio compression encoder/decoder 14 is supplied to a digital interface 22 to be outputted from a digital output terminal 21 to an external device as a digital audio signal Dout. For example, the digital audio signal is outputted in a transmission form based on an optical cable.

At recording to the magneto-optical disc 90, an analog audio signal Ain, which is a record signal supplied to a line input terminal 18, is converted by an A/D converter 19 into a digital signal, which is then supplied to the audio compression encoder/decoder 14 to be compressed.

If a digital audio signal Din is supplied from an external device to a digital input terminal 20, a control code and so on are extracted from the supplied signal by the digital interface 22 and audio data carried by this signal is supplied to the audio compression encoder/decoder 14 to be compressed.

It should be noted that a microphone terminal, not shown, may be arranged to use a microphone input as the record signal.

The record data compressed by the audio compression encoder/decoder 14 is once written by the memory controller 12 to the buffer memory 13 for storage. The stored record data is then intermittently read in data units of a predetermined size to be sent to the EFM/ACIRC encoder/decoder 8. In the encoder/decoder 8, the record data is ACIRC-encoded and EFM-modulated to be supplied to a magnetic head driver 6.

According to the encoded record data, the magnetic head driver 6 supplies a magnetic head drive signal to the magnetic head 6a. Namely, the magnetic head driver 6 has the magnetic head 6a apply N-pole or S-pole field to the magneto-optical disc 90. At the same time, the system controller 11 supplies a control signal to the optical head 6a to output a laser beam of a high recording level.

An operator panel 23 is a section provided for user operation and has various operator controls including keys and knobs. To be more specific, the operator controls include such controls associated with recording and/or reproducing operations as reproduction, record, pause, stop, fast forward (FF), rewind (REW), and automatic music sensor (AMS), controls associated with play modes such as normal reproduction, programmed reproduction, and shuffle reproduction, display mode controls for changing display states in a display monitor 24, controls for program editing such as track (program) split, track linkage, track erase, track name input, and disc name input, and controls necessary for auxiliary (AUX) data recording, reproducing, and operating modes to be described later in the present embodiment.

Operating information about the operation of these controls is supplied to the system controller 11, which then executes control operations according to the received operating information.

Display operations of the display monitor 24 are controlled by the system controller 11.

To be more specific, the system controller 11 sends data to be displayed when a display operation is performed to a display driver, not shown, in the display monitor 24. Based on the supplied data, the display driver drives a display operation by a liquid crystal panel for example, thereby displaying required numerals, characters, symbols, and so on.

The display monitor 24 displays an operation mode state of the disc being recorded and/or reproduced, a track number, recording time or reproduction time, an edit state, and so on.

The disc 90 can record character information such an album title controlled by in accompaniment with the program, or the main data. The display monitor 24 displays input characters of the character information and character information read from the disc.

In addition, in the present embodiment, the disc 90 has an audio data area which is main data and an AUX data area which is auxiliary data, these areas being discrete from each other. The data file as auxiliary data provides information such as characters and images. These characters and images may also be outputted to the display monitor 24.

However, for outputting of character information and still picture information as AUX data, a full-dot display device or a CRT display device that are comparatively large in screen size and allow use of the screen with freedom to some extent are often preferable. Therefore, it is possible to execute display output of AUX data on an externally attached monitor device through an interface 25.

An AUX data file may also be recorded by the user onto the disc 90. In this case, such input devices as an image scanner, a personal computer, and a keyboard may be required. It is possible for the information as an AUX data file to be inputted from such an input system through the interface 25.

The system controller 11 is a microcomputer having a CPU, a program ROM, a work RAM, an interface, and so on and controls each of the operations described so far.

Meanwhile, when a recording and/or reproducing operation is performed on the disc 90, control information, namely P-TOC (Pre-mastered Table of Contents (TOC)) and U-TOC (user TOC) must be read from the disc 90. Based on these pieces of control information, the system controller 11 determines the address of a recording area and the address of a reproducing area on the disc 90.

These pieces of information are held in the buffer memory 13.

Then, the system controller 11 reads these pieces of control information by executing reproduction of control information recorded the innermost peripheral when the disc 90 is loaded and stores the read control information into the buffer memory 13 to reference the control information when recording, reproducing, and editing a program recorded on the disc 90.

A U-TOC is rewritten every time program data is recorded or edited. The system controller 11 updates U-TOC stored in the buffer memory 13 every time such an operation is performed accordingly and rewrites the U-TOC area on the disc 90 accordingly in a predetermined timing relation.

An AUX data file is recorded on the disc 90 separately from the program. To control the AUX data file, AUX-TOC is formed on the disc 90.

The system controller 11 also reads AUX-TOC at the same time U-TOC is read and stores AUX-TOC in the buffer memory 13 for reference as required.

The system controller 11 reads the auxiliary data file in a predetermined timing relation or at the same time AUX-TOC is read as required and stores the read AUX data file into the buffer memory 13. Then, the system controller 11 has the display monitor 24 and a device externally attached through the interface 25 execute character and image output operations according to the output timing controlled by the AUX-TOC.

2. Sector Format and Address Format

Now, referring to FIGS. 2A through 2E, data units called a sector and a cluster will be described below.

For recording tracks in a Mini Disc system, clusters CLs are formed consecutively as shown in FIG. 2A, one cluster providing a minimum recording unit. One cluster is equivalent to two to three circles of tracks.

One cluster CL is formed with linking area composed of four sectors SFC through SFF and a main data area composed of 32 sectors S00 through S1F as shown in FIG. 2B.

One sector is a data unit consisting of 2352 bytes.

Of the 4-sector auxiliary data area, the sector SFF is an auxiliary data sector, which is available for the recording of auxiliary data as shown in FIG. 2B. The three sectors SFC through SFE are not used for data recording.

On the other hand, TOC data, audio data, and AUX data are recorded in 32 sectors of the main data area.

It should be noted that an address is recorded for each sector.

A sector is further divided into sound groups, two sectors being divided into 11 sound groups (SGs) as shown in FIG. 2D.

To be more specific, as shown in FIGS. 2C and 2D, consecutive two sectors such as an even-number sector S00 and an odd-number sector S01 include sound groups SG00 through SG0A. One sound group is composed of 424 bytes, providing an audio data amount equivalent to 11.61 msec.

In one sound group SG, data is stored in L (Left) channel and R (Right) channel as shown in FIG. 2E. For example, the sound group SG00 is composed of L-channel data L0 and R-channel data R0. The sound group SG01 is composed of L-channel data L1 and R-channel data R1.

It should be noted that 212 bytes that provide an L-channel or R-channel data area is referred to as a sound frame.

Figures 3A, 3B:
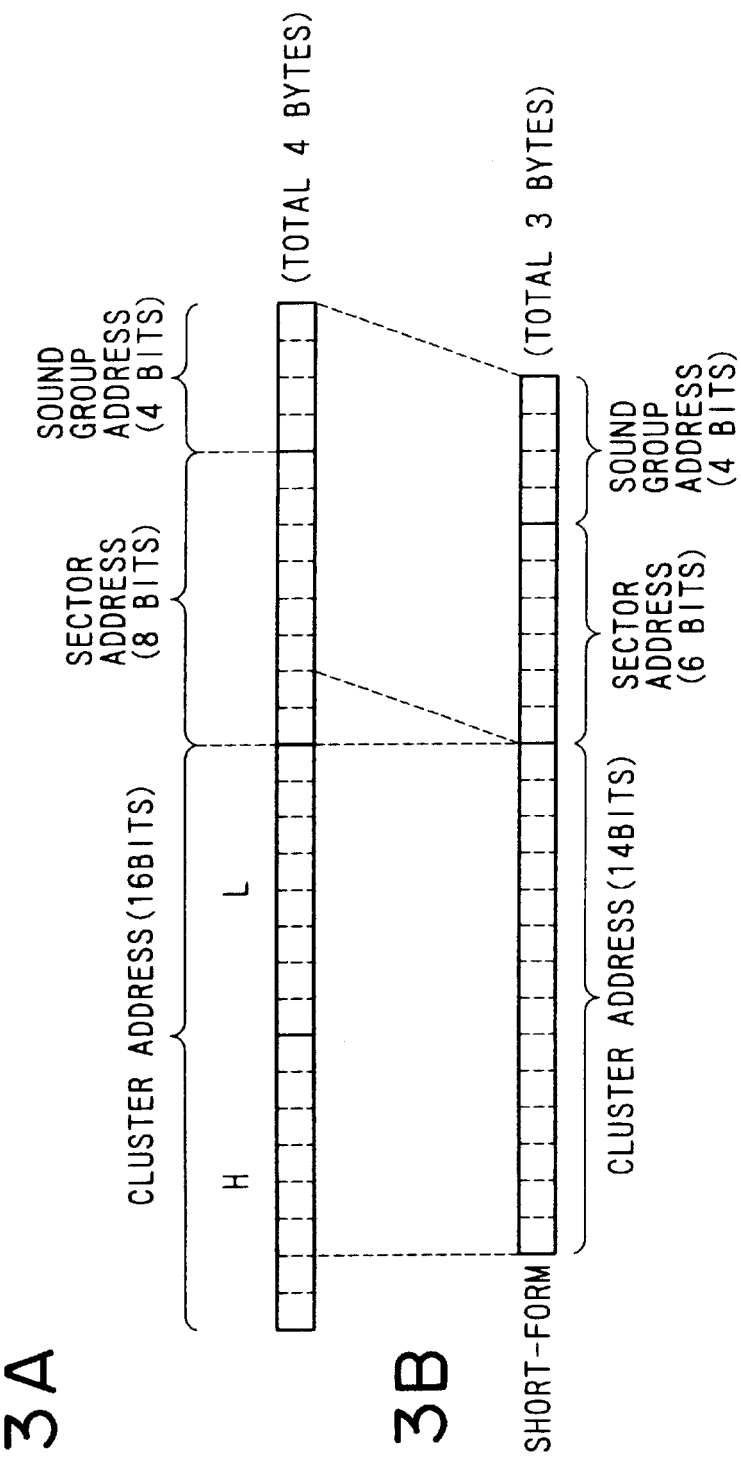
FIG. 3A is a diagram illustrating a data structure indicative of a normal address format.
FIG. 3B is a diagram illustrating a data structure indicative of a short address format.

The following describes an address format in the Mini Disc system with reference to FIGS. 3A and 3B.

Each sector is addressed by a cluster address and a sector address. As shown in FIG. 3A, the cluster address consists of 16 bits (=2 bytes) and the sector address consists of 8 bits (=1 byte).

The address consisting of these three bytes is recorded at the head of each sector.

Adding a sound group address consisting of four bits can represent the address of each sound group within a sector. In control of U-TOC for example, notation including the sound group address allows setting of reproduction position in units of sound group.

Meanwhile, in U-TOC and AUX-TOC, in order to represent all of a cluster address, a sector address, and a sound group address in three bytes, a short-form address as shown in FIG. 3B is used.

In the short-form address, each sector can be represented in six bits because one cluster has 36 sectors. Therefore, the high-order two bits of each sector address can be omitted. Likewise, each cluster can be represented in 14 bits up to the disc outermost periphery, so that the high-order two bits of each cluster address can be omitted.

Thus, omitting the high-order two bits of each of sector address and each cluster address can represent an address specifying all of cluster, sector, and sound group in three bytes.

In U-TOC and AUX-TOC to be described later, each address for controlling reproduction position, reproduction timing, and so on is expressed in the above-mentioned short form. For this short-form address, an absolute address or an offset address is possible for example. An offset address denotes a relative address with the head position of each program such as music being defined as address 0, thereby indicating a position inside the program. An example of this offset address will be described below with reference to tables shown in FIGS. 4A through 4C.

Recording of a program such as music will be described later with reference to FIGS. 5A and 5B. The program is recorded on the disc starting with a cluster 50 (cluster 32h in hexadecimal notation). It should be noted that a number suffixed with character "h" herein denotes a hexadecimal number.

For example, the value of the address of cluster 32h, sector 00h, and sound group 0h of the start position of a first program is "000000000011001000000000000" (to be more specific, 0032h, 00h, 0h) as shown in the upper portion of FIG. 4A. In the short form, this address is indicated as "00000000110010000000000" (namely, 00h, C8h, 00h) as shown in the lower portion of FIG. 4A.

When this start address is used as the origin, the address of a certain position in the first program, for example cluster A0032h, sector 04h, and sound group 0h, is "00h, C8h, 40h" in a short-form absolute address as shown in FIG. 4B. On the other hand, the corresponding offset address is "00h, 00h, 40h" because cluster 0000h, sector 04h, sound group 0h may be expressed by the difference from the origin, or the start address.

When the start address shown in FIG. 4A is used as the origin, a certain position in the first program, for example an address of cluster 0032h, sector 13h, sound group 9h, is "00h, C9h, 39h" in the corresponding short-form absolute address as shown in FIG. 4C and "00h, 01h, 39h" in the corresponding offset address.

For example, as shown above, a position and so on inside a particular program can be specified by an absolute address or an offset address.

3. Area Structure

Figures 5A, 5B:
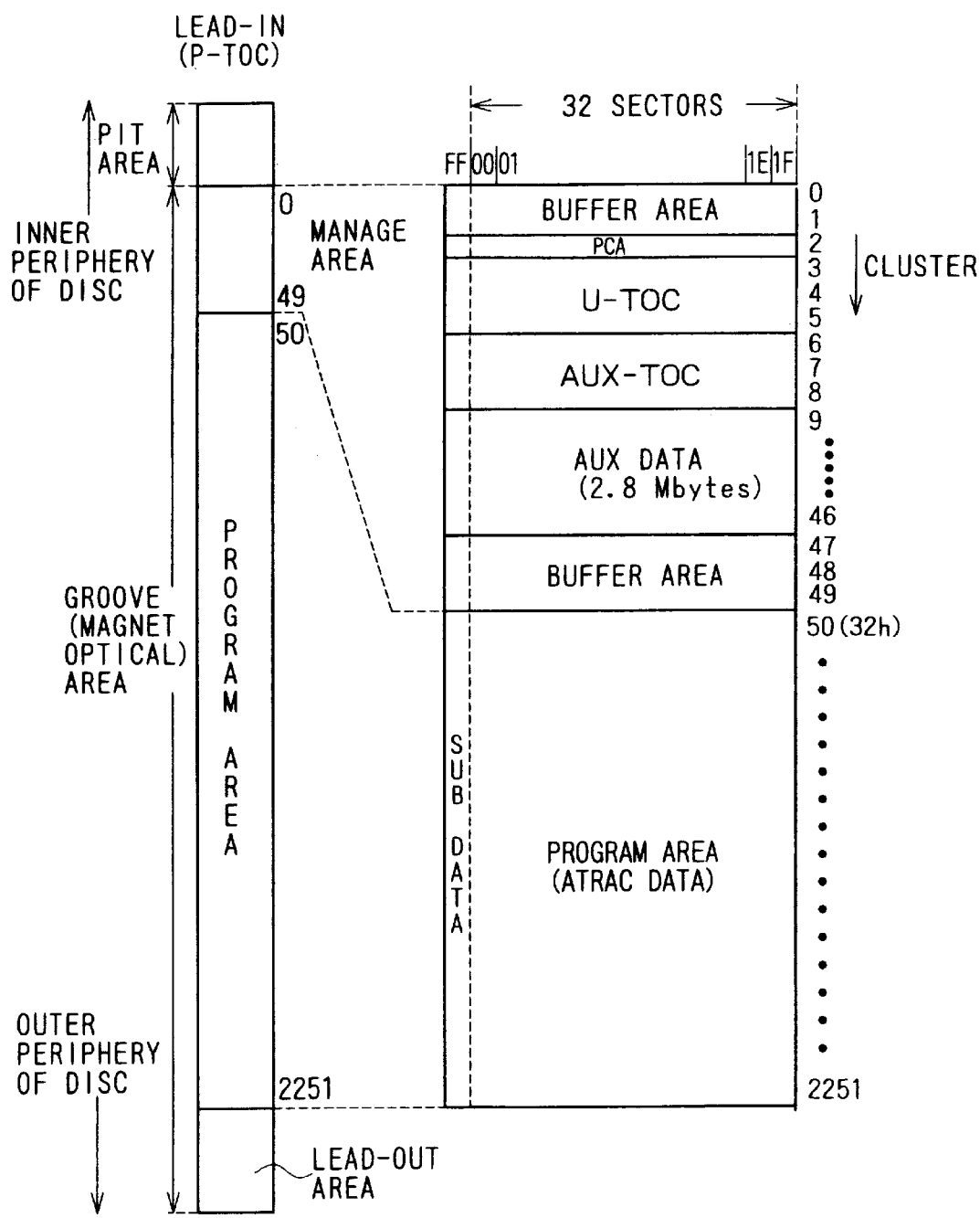
FIG. 5A is a schematic diagram illustrating a control area and a program area recorded on the disc.
FIG. 5B is a schematic diagram illustrating details of data recorded in the above-mentioned control area and the above-mentioned program area.

The following describes the area structure used on the disc 90 in the present embodiment with reference to FIGS. 5A and 5B.

FIG. 5A shows an area from the innermost periphery to the outermost periphery.

With the disc 90 as a magneto-optical disc, the innermost periphery is a pit area formed with reproduction-only data by emboss pits, in which P-TOC is recorded.

Outside the pit area is a magneto-optical area that provides a recording/reproduction-enabled area formed with recording track guide grooves.

Cluster 0 through cluster 49 on the inner periphery side of the magneto-optical area provide a control area. An actual program such as music is recorded in a program area ranging from cluster 50 through cluster 2251. The program area is enclosed by a lead-out area.

Details of the control area are shown in FIG. 5B, in which sectors are shown laterally while clusters are shown vertically.

In the control area, clusters 0 and 1 provide a buffer area against the pit area. Cluster 2 provides a power calibration area PCA for use in calibrating a laser beam output power.

Clusters 3, 4, and 5 record U-TOC. The contents of U-TOC will be described later. A data format is specified in each section in one cluster to record predetermined control information. A sector providing such U-TOC data is recorded in clusters 3, 4, and 5 repeatedly.

Clusters 6, 7, and 8 record AUX-TOC. Contents of AUX-TOC will be described later. A data format is specified in sector in one cluster to record predetermined control information. A sector having such AUX-TOC data is recorded in clusters 6, 7, and 8 repeatedly.

An area from cluster 9 through cluster 46 records AUX data. A data file as AUX data is formed on a sector basis. This data file includes a picture file sector as a still picture file to be described later, a text file sector as a character information file to be described later, and a karaoke text file sector as a character information file in synchronization with program to be described later.

The data file as the AUX data and the area enabled to record the AUX data file within the AUX data area are controlled by AUX-TOC.

It should be noted that the data file recording size in the AUX data area is 2.8 MB with error correction mode 2 considered.

It is also possible to form a second AUX data area in, for example, the last half of the program area or an area outside the program area (for example, the lead-out portion), thereby expanding the data file recording size.

Clusters 47, 48, and 49 provide a buffer area against the program area.

The program area starting with cluster 50 (=32h) records audio data for one or more pieces of music in a compressed form known as ATRAC (Adaptive Transform Acoustic Coding).

The recorded programs and recordable areas are controlled by U-TOC.

It should be noted that sector FFh in each cluster in the program area can be used for recording certain information as auxiliary data as described before.

In the Mini Disc system, a reproduction-only disc in which programs and so on are recorded in the pit form as reproduction-only data may be used. In such a reproduction-only disc, the entire disc is covered with the pit area. The programs recorded in the reproduction-only disc are controlled by P-TOC in generally the same manner as U-TOC. Therefore no U-TOC is formed on the reproduction-only disc.

It should be noted that, when a reproduction-only data file is recorded as AUX data, AUX-TOC for controlling the data file is recorded on the reproduction-only disc.

4. U-TOC 4-1 U-TOC Sector 0

As described before, recording and/or reproduction of a program on the disc 90 requires the system controller 11 to read control information P-TOC and U-TOC from the disc 90 beforehand to reference them as required.

The following describes the U-TOC sector that is control information for controlling the recording and/or reproducing of a program.

It should be noted that P-TOC is formed in the pit area on the inner periphery of the disc 90 as described with reference to FIGS. 5A and 5B. P-TOC is read-only information. The positions of recordable area (or recordable user area), lead-out area, U-TOC area on the disc are controlled by P-TOC. It should be noted that, in a reproduction-only optical disc on which all data are recorded in pit form, music recorded in a reproduction-only manner can also be controlled and therefore no U-TOC is formed.

Details of P-TOC will be omitted from the following description. The following describes the details of U-TOC formed on a recordable magneto-optical disc.

FIG. 6 shows the format of U-TOC sector 0.

It should be noted that, for the U-TOC sectors, sector 0 through sector 32 can be provided. Sector 1 and sector 4 provides areas for recording character information and sector 2 provides area for recording a date of recording.

First, U-TOC sector 0 will be described which is always necessary for a recording and/or reproducing operation on the disc 90.

U-TOC sector 0 provides a data area recording control information about a program such as music mainly recorded by a user and a free area in which additional programs are recorded.

For example, when recording a piece of music on the disc 90, the system controller 11 searches, based on P-FRA, the disc for a free area, which is a recordable area, starting U-TOC sector 0 and records the music in the retrieved free area. In a reproducing operation, based on U-TOC sector 0, the system controller 11 determines an area in which a piece of music to be reproduced is recorded and accesses that area for reproduction.

In the data area (4 bytes×588=2352 bytes) of U-TOC sector 0, synchronous patterns in which 1-byte data of all 0s or all 1s is formed side by side are recorded at the start position.

The synchronous patterns are followed by addresses providing cluster address (cluster H and cluster L) and a sector address (sector) in three consecutive bytes. These addresses are followed by one byte of mode information (MODE). These four bytes forms a header. The addresses of three bytes provide an address of that sector itself.

The header in which synchronous patterns and addresses are recorded is the same as those of P-TOC sector, AUX-TOC sector, AUX file sector, and program sector. Therefore, the headers of these sectors are skipped from the descriptions of these sectors with reference to FIG. 8 and subsequent drawings. The address and synchronous patterns of a particular sector are recorded on a sector basis.

It should be noted that, for the address of a particular sector itself, the cluster address is represented in two bytes of high-order address (cluster H) and low-order address (cluster L) and the sector address is represented in one byte. Namely, the address of each sector is not a short-form address.

Then, a maker code indicative of manufacturer, a model code indicative of a model of the apparatus by which recording has been performed, a first track number (First TN0), a last track number (Last TN0), a sector usage state (Used sectors), a disc serial number, and a disc ID are recorded at predetermined byte positions.

Further, an area is prepared in which various pointers (P-DFA (Pointer for Defective Area), P-EMPTY (Pointer for Empty Slot), P-FRA (Pointer for Free Area), and P-TN01 through P-TN0255) are recorded as a pointer section for identifying the areas of programs such as music recorded by the user and the free areas, which are recordable areas, by relating them to a table section to be described later.

The pointer section is followed by the table section composed of 255 part tables 01h through FFh to be related to the pointers (P-DFA through P-TN0255). Each part table records a start address providing the origin of a particular part, an end address providing the end point of that part, and mode information (track mode) about that part are recorded. A part listed in one part table may be linked to another, so that link information indicative of the part table in which the start and end addresses of the destination part can be recorded in the table section.

It should be noted that a part denotes a track part in which pieces of data consecutive in time are physically consecutively recorded in one track.

The address indicated by the start address and the end address provides an address indicative of one or more parts constituting one piece of music.

These addresses are recorded in the short form to specify a cluster, a sector therein, and a sound group therein.

In the recording and/or reproducing apparatus of this type, if data of one piece of music is physically recorded in a discontinuous manner, namely over plural parts, access is made from part to part for reproduction, causing no problem in reproduction. Therefore, music and so on to be recorded by user is sometimes recorded over plural parts in order to enhance usage efficiency of the recordable area.

For this purpose, link information is provided. For example, part tables to be linked can be linked by specifying them by numbers 01h through FFh assigned to the part tables.

To be more specific, in the control table section in U-TOC sector 0, one part table represents one part. For a piece of music constituted by linking three parts, the positions of these parts are controlled by the part tables linked by the link information.

Actually, the link information is indicated by a value, which is a byte position in U-TOC sector 0, by predetermined computation. Namely, the part table is specified by 304+(link information)×8 (8th byte).

The contents of the part tables 01h through FFh in the table section of U-TOC sector 0 are indicated as follows by the pointers (P-DFA, P-EMPTY, P-FRA and P-TN01 through P-TN0255) of the pointer section.

Pointer P-DFA is indicative of a defect area on the magneto-optical disc 90, specifying the start part table in one or more part tables indicative of a track portion (=part) providing a defective area caused by a scratch for example. Namely, if a defective part exists, one of 01h through FFh is recorded in the pointer P-DFA and the corresponding part table indicates the defective part in start address and end address. If another defective part exists, another part table is specified as the link information in the former part table. The defective part is also indicated in that part table. If no other defective parts are found, the link information becomes "00h" for example, indicating no further link.

The pointer P-EMPTY points at the beginning part table of one or more empty part tables in the control table section. If an empty part table exists, one of 01h through FFh is recorded as the pointer P-EMPTY.

If two or more empty tables exist, the part tables are sequentially specified by link information starting with one specified by the pointer P-EMPTY, linking all empty part tables in the control table section.

The pointer P-FRA points at a free area (including an erase area) on the magneto-optical disc 90, in which data can be written. This pointer specifies the beginning part table of one or more part tables with a track portion (=part) providing a free area indicated. Namely, if a free area exists, one of 01h through FFh is recorded in the pointer P-FRA and the corresponding part table indicates the part providing the free area by the start and end addresses. If there are two or more such parts, or there are two or more part tables, the part tables are sequentially specified by the link information up to one at which the line information becomes "00h."

FIG. 7 schematically shows, by way of part tables, a control state of parts providing free areas. This shows that, if parts 03h, 18h, 1Fh, 2Bh, and E3h are free areas, this state is represented by the linking of the part tables 03h, 18h, 1Fh, 2Bh, and E3h after the pointer P-FRA. It should be noted that this holds true with the control form of the above-mentioned defective areas and empty part tables.

The pointers P-TN01 through P-TN255 point at programs of music for example recorded on the magneto-optical disc 90 by the user. For example, the pointer P-TN01 points at a part table indicating a beginning part in time of one or more parts recorded with the data of the first track.

If, for example, a piece of music which is the first track (or the first program) is recorded with the track undivided on the disc, namely recorded as a whole part, the record area of the first track is recorded as the start and end addresses of the part table pointed by the pointer P-TN01.

If, for example, a piece of music which is the second track (or the second program) is recorded discretely over two or more parts, the parts indicative of the record position of the second track are specified sequentially in time. Namely, starting with the part table pointed by the pointer P-TN02, other part tables are sequentially specified by the link information up to the part table at which the link information is "00h" (in the same form shown in FIG. 7).

Thus, if all parts recorded with the data of the second piece of music for example are sequentially specified and recorded, use of the data in the U-TOC sector o allows to take out continuous music information from discrete parts or effectively use the recording area by having the optical head 3 and the magnetic head 6a perform access operations when reproducing or overwriting the second piece of music.

As described above, for the rewritable magneto-optical disc 90, the area control on the disc is performed by P-TOC and the control of the music recorded in the recordable user area and the control of free areas are performed by U-TOC.

4-2 U-TOC Sector 1

The following describes the format of U-TOC sector 1 with reference to FIG. 8. The sector 1 is a data area for recording character information inputted when track names are assigned to recorded tracks and a disc name is attached to the disc itself.

U-TOC sector 1 has a pointer section containing pointers P-TNA1 through P-TNA255 corresponding to recorded tracks. U-TOC sector 1 also has a slot section containing 255 8-byte slots (01h through FFh) plus one 8-byte slot that are specifiable by the pointers P-TNA1 through P-TNA255. U-TOC sector 1 controls the character information in generally the same manner as the above-mentioned U-TOC sector 0.

Character information about the disc title and track names is recorded in slots 01h through FFh in ASCII (American Standard Code for Information Interchange) codes.

For example, the slot specified by pointer P-TNA1 records characters inputted by the user for the first track. Slots are linked together by link information, so that the number of characters exceeding 7 bytes (or 7 characters) can be inputted for one track.

It should be noted that the 8 bytes as a slot (00h) provide an area dedicated to disc name recording, so that this slot is not specified by some pointers (P-TNA(x)).

In U-TOC sector 1, the pointer P-EMPTY also controls empty slots.

4-3 U-TOC Sector 2

The following describes the format of U-TOC sector 2 with reference to FIG. 9. This sector 2 is a data area for mainly recording a date at which the user recorded music.

U-TOC sector 2 has a pointer section containing pointers P-TRD1 through P-TRD255 corresponding to the recorded tracks and a slot section containing slots to be specified by these pointers. The slot section has 255 8-byte slots 01h through FFh, controlling the date data in generally the same manner as the above-mentioned U-TOC sector 0.

Each of the slots 01h through FFh records a music (or track) recording date in six bytes. These six bytes record values corresponding to year, month, day, hour, minute, and second respectively. The remaining two bytes of each 8-byte slot record a maker code and a model code, namely code data indicative of the manufacturer of the recording apparatus that recorded the music and code data indicative of the model of that recording apparatus.

For example, when a track is recorded as a first piece of music, the slot specified by pointer P-TRD1 records the recording date, the maker code, and the model code. The recording date data is automatically recorded by the system controller 11 by referencing the internal clock of the recording apparatus.

The 8 bytes as a slot (00h) provide an area dedicated to the recording of recording date on a disc basis, so that this slot is not specified by some pointers P-TRD(x).

It should be noted that, in U-TOC sector 2, the slot pointer P-EMPTY also controls the empty slots. For the empty slots, link information is recorded instead of the model code. With the slot pointer P-EMPTY located at the beginning of each empty slot, the empty slots are linked by link information for control.

4-4 U-TOC Sector 4

Figure 10:
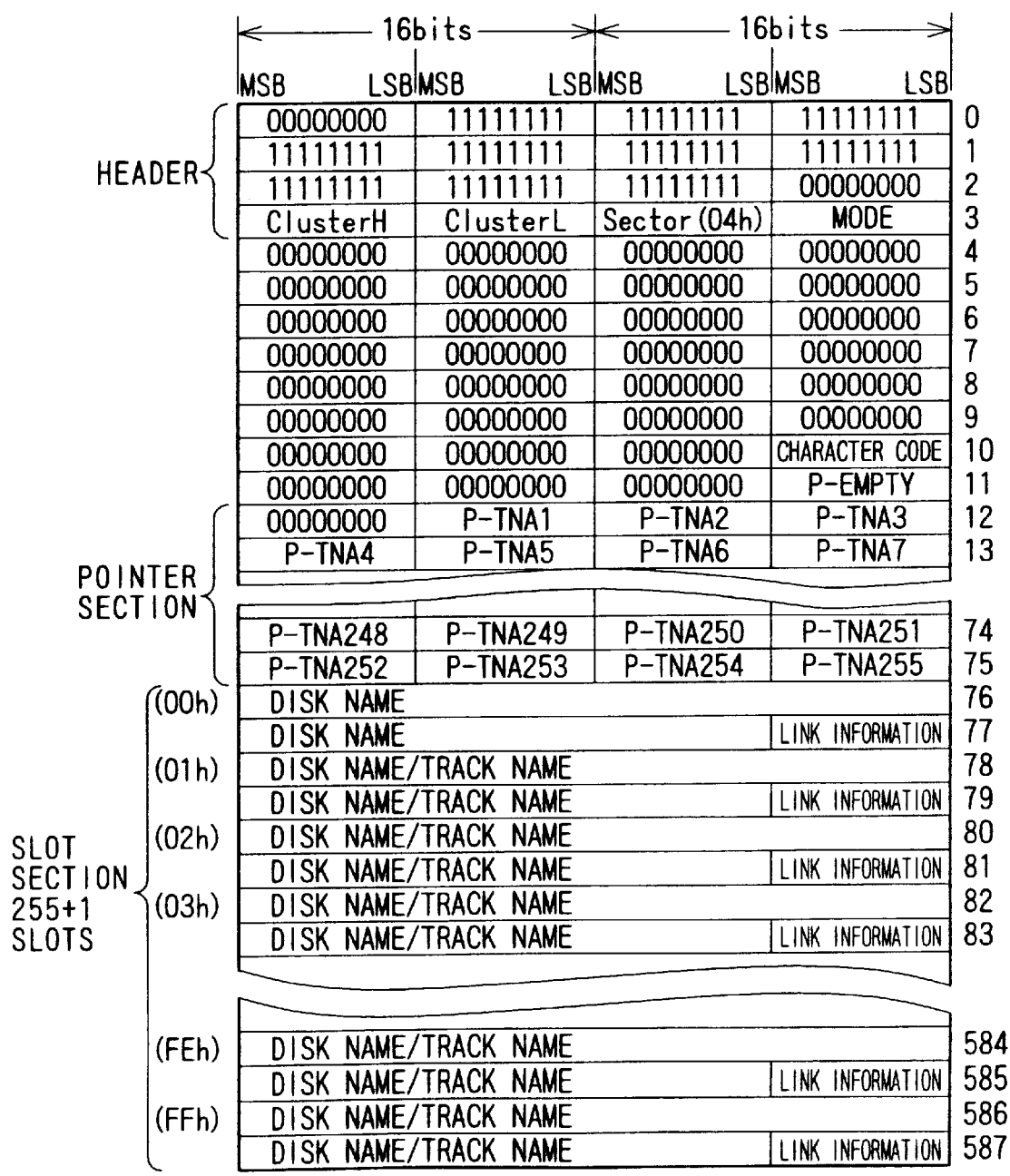
FIG. 10 is a diagram illustrating a data structure of U-TOC sector 4 in the control area for controlling character information.

FIG. 10 shows U-TOC sector 4. Like the above-mentioned sector 1, the sector 4 provides a data area for recording character information inputted by the user when attaching a music title to a track recorded by the user or a disc name to the disc. As seen from comparison between FIGS. 10 and 8, the format of the sector 4 is generally the same as that of the sector 1.

However, the sector 4 is adapted to record code data (a 2-byte code) for kanji and European characters. In addition to the data of the sector 1, character code attributes are recorded at predetermined byte positions as shown in FIG. 10.

Like sector 1, the character information of U-TOC sector 4 is controlled by pointers P-TNA1 through P-TNA255 and the 255 slots 01h through FFh specified by the pointers P-TNA1 through P-TNA255.

It should be noted that the recording and/or reproducing apparatus 1 practiced as the present preferred embodiment supports the reproduction-only disc with no U-TOC formed; in the case of reproduction-only discs, character information about the disc name and track names can be stored in P-TOC.

To be more specific, for the P-TOC sector, a sector generally the same as U-TOC sectors 1 and 4 is prepared. The disc manufacturer can record the disc name and track names in this P-TOC sector beforehand.

5. AUX-TOC 5-1 AUX-TOC Sector 0

In the disc 90 of the present embodiment, an area for recording the AUX data file and AUX-TOC as described with reference to FIGS. 5A and 5B is set to record character information and image information as an AUX data file independently of a program such as music for example.

The AUX data file is controlled by AUX-TOC. This AUX-TOC is recorded in each of three consecutive clusters. Therefore, in control data structure, 32 sectors in one cluster can be used as with U-TOC.

In the present embodiment, AUX-TOC sectors 0 through 9 are set to control the AUX data files as described below.

First, the format of AUX-TOC sector 0 will be described with reference to FIG. 11.

AUX-TOC sector 0 provides an area allocation table for mainly controlling the AUX data area in its entirety.

As shown in FIG. 11, this sector 0 records a maker code, a model code, backup information, an ASPB (Auto Sequence Play Back) flag, and used sector information in this order at respective predetermined byte positions following the header. The ASPB flag indicates that a still picture, a text, and a karaoke text, for example, as AUX data files are outputted in synchronization with the reproduction of music as a program. For the used sector information, the sector usage state recorded in AUX-TOC is displayed.

This AUX-TOC sector 0 has a pointer section containing pointers P-DFAA, P-EMPTY, P-BLANK, P-SPICT, P-TEXT, and P-KRAOK.

A table section of this sector 0 contains 255 8-byte part tables for recording start addresses, end addresses, and link information. The AUX data area is controlled in the same manner as the above-mentioned U-TOC sector 0.

The pointer P-DFAA (pointer for defective area of auxiliary data area) controls a defective area in the AUX data area by the start and end addresses recorded in the specified part table. If there are two or more defective areas, other part tables are linked by link information.

The pointer P-EMPTY (Pointer for Empty Slot) controls empty part tables in this AUX-TOC sector 0 in a linked form.

The pointer P-BLANK (Pointer for Blank Area) controls, in a part table linked form, an area in which free areas in the AUX data area, namely AUX data files can be recorded, like the pointer P-FRA in the U-TOC sector 0.

The pointer P-SPICT (Pointer for Still Picture) controls, in a part table linked form, an area for recording a still picture data file (namely a picture file sector to be described later) in the AUX data area. It should be noted that one picture file consists of one or two clusters. Therefore, the still picture data file area to be controlled by the pointer P-SPICT is a cluster-based area.

The pointer P-TEXT (Pointer for TEXT data) controls, by part table link information, an area for recording a text file (namely a text file sector to be described later) in the AUX data area. It should be noted that the file length of one text file is one sector. However, the text file area to be controlled by the pointer P-TEXT is a cluster-based area.

The pointer P-KRAOK (Pointer for Karaoke data) controls, in a part table linked form, an area for recording a karaoke text file (namely a karaoke text file sector and a karaoke address sector to be described later) in the AUX data area. It should be noted that one karaoke text file is a file based on one or two sectors corresponding to one program.

However, the text data file area controlled by the pointer P-KRAOK is based on cluster.

The pointers P-SPICT, P-TEXT, and P-KRAOK control the areas for recording a picture (still picture) file, a text file, and a karaoke text file in the AUX data area by the start and end addresses as the area address in part tables. Therefore, according to the control state in the sector 0, each of the above-mentioned areas can be dividably set freely or the length of each area can be set freely.

It should be noted that the start address and the end address are of short form and specifiable up to the sound group position.

In the table section or the slot section in each of AUX-TOC sectors 1 through 9, the start address and the end address recorded in three bytes each are also of short form and positional specification can be performed on a sound group basis.

If AUX-TOC is formed on a reproduction-only disc, the link information in each part table is not used.

As described above, the pointers for identifying the types of AUX files are P-SPICT, P-TEXT, and P-KRAOK. If a file other than the picture file, the text file, and the karaoke file is to be recorded as an AUX data file, a pointer corresponding to the type of that file may be set for area control. The pointer section can contain pointers corresponding to a maximum of 255 types of files including P-SPICT, P-TEXT, and P-KRAOK.

5-2 AUX-TOC Sector 1

AUX-TOC sectors 1 through 5 are used for controlling a picture file as still picture information.

The AUX-TOC sector 1 shown in FIG. 12 provides a control sector as a still picture allocation table to control the data files recorded as picture files in the picture file area set by the pointer P-SPICT in the above-mentioned AUX-TOC sector 0.

In the AUX-TOC sector 1, the picture files are controlled in the same manner as the U-TOC sector 0.

The length of the picture file for one piece of still picture to be recorded in the AUX data area is one cluster or two clusters in the present embodiment. If one file is one cluster long, the AUX data area can record up to 38 pieces of picture files. One of these picture files provides a so-called disc cover image (a cover picture providing a disc cover for example).

For pointers P-PN0(x) that are used for controlling 37 picture files other than the cover picture file, pointers P-PN01 through P-PN037 are formed in the AUX-TOC sector 1. However, in order to accommodate a future expansion of the AUX data area and a future file size change to record more picture files, pointers P-PN0(x) can be set up to P-PN0255 as shown in the parentheses in FIG. 12.

In the pointer section, pointers P-PFRA and P-EMPTY are also formed.

In addition, in the table section, 255 part tables 01h through FFh each for recording a start address, an end address, and a picture mode (or SPICT mode) are formed as 8-byte part tables corresponding to the above-mentioned pointers in the pointer section.

The part table 00h is not specified by some pointers. In the present embodiment, this part table is used only to control the address of a picture file that provides a cover picture.

Pointers P-PN01 through P-PN037 controls areas each recording one picture file by specifying a particular part table. For example, the part table specified by pointer P-PN01 records the start address, end address, and image mode (or SPICT mode) of the picture file that provides the first piece of image data.

It should be noted that the AUX-TOC sector 1 does not perform file control by linking part tables by link information. Namely, one picture file is not recorded discretely over physically separated sections.

However, the empty part tables in this sector are controlled in a linked form (the 8th byte in the part table provides the link information) with the pointer P-EMPTY used as the origin.

The pointer P-PFRA controls the free areas, namely the picture file recordable areas in the picture file area set by the pointer P-SPTCT in the above-mentioned AUX-TOC sector 0. The address of the section providing a free area is recorded in the part table specified by the pointer P-PFRA. In this free area control, part tables are sometimes linked by the link information provided by the 8th byte in each part table, controlling two or more separated sections as free areas.

5-3 AUX-TOC Sector 2

FIG. 13 shows the format of the AUX-TOC sector 2. The sector 2 provides a still picture name table. When a picture name is assigned to each of the recorded picture files, the sector 2 is a data area for recording character information that provides the picture name.

The AUX-TOC sector 2 has a pointer section containing pointers P-PNA1 through P-PNA37 (expandable to P-TNA255) corresponding to the recorded picture files. This sector also has a slot section containing 255 8-byte slots 01h through FFh and one 8-byte slot 00h to be specified by the pointers P-TNA1 through P-TNA37.

The slots 00h through FFh record character information as a picture name in an ASCII code or another character code. The type of characters to be recorded is recorded at a predetermined byte position as a character code.

For the character code, 00h is represented in an ASCII code, 01h is represented in a modified ISO (International Standard Organization) 8859-1 code, and 02h is represented in a music-shifted JIS (Japanese Industry Standard) code for example.

The pointers P-PNA1 through P-PNA37 each specify a particular part table recording a picture name for one picture file. For example, the slot specified by the pointer P-PNA1 records characters corresponding to the image of the first picture file. Linking slots by use of linking information allows a picture name for one picture file to be made larger than 7 bytes (or 7 characters).

It should be noted that 8 bytes for the slot 00h provide an area dedicated to the recording of a cover picture name for the cover picture. Therefore, this slot is not specified by pointer P-PNA(x).

The pointer P-EMPTY controls empty slots in a linked form.

5-4 AUX-TOC Sector 3

FIG. 14 shows the format of the AUX-TOC sector 3.

The sector 3 is a still picture recording date table and provides a data area for controlling the record date at which a picture file was recorded.

The AUX-TOC sector 3 has a pointer section containing pointers P-PRD1 through P-PRD37 (expandable to P-PRD255) corresponding to the recorded picture files. This sector also has a slot section to be specified by these pointers P-PRD1 through P-PRD37. The slot section contains 255 8-byte slots 01h through FFh and one 8-byte slot 00h to control the date data in generally the same manner as the above-mentioned U-TOC sector 2.

The slots 01h through FFh each record a picture file recording date in six bytes. These six bytes record values representing year, month, day, hour, minute, and second respectively. The remaining two bytes record a maker code and a model code, namely code data indicative of the manufacturer of the recording apparatus that recorded the music and code data indicative of the model of that recording apparatus.

For example, when a first picture file is recorded on the disc, the slot specified by pointer P-PRD1 records the recording date, the maker code, and the model code. The recording date data is automatically recorded by the system controller 11 by referencing the internal clock of the recording apparatus.

The 8 bytes as a slot (00h) provide an area dedicated to the recording of recording date of the cover picture, so that this slot is not specified by some pointers P-PRD(x).

It should be noted that, in AUX-TOC sector 3, the slot pointer P-EMPTY also controls the empty slots. For the empty slots, link information is recorded instead of the model code. With the slot pointer P-EMPTY located at the beginning of each empty slot, the empty slots are linked by link information for control.

5-5 AUX-TOC Sector 4

FIG. 15 shows the format of the AUX-TOC sector 4. The sector 4 provides a still picture code table for recording code information of recorded picture files.

The AUX-TOC sector 4 has a pointer section containing pointers P-PCD1 through P-PCD37 (expandable to P-PCD255) corresponding to the recorded picture files. This sector also has a slot section to be specified by these pointers P-PCD1 through P-PCD37. The slot section contains 255 8-byte slots 01h through FFh and one 8-byte slot 00h.

For example, for the first picture file, the slot specified by the pointer P-PCD1 records the code information of that picture file.

The 8 bytes as a slot (00h) provide an area dedicated to the recording of the code information of the cover picture file, so that this slot is not specified by some pointers P-PCD(x).

In the AUX-TOC sector 4, the pointer P-EMPTY also controls the empty slots.

5-6 AUX-TOC Sector 5

The AUX-TOC sector 5 shown in FIG. 16 provides a still picture playback sequence table.

This table provides control information for outputting (namely displaying an image) a picture file in synchronization with reproduction of a program such as music.

The sector 5 contains pointers P-TN01 through P-TN0255. These pointers are the same as those of the U-TOC sector 0 and correspond to tracks 1 through 255 as programs such as music.

A part table section of the sector 5 contains 255 8-byte part tables 01h through FFh, which are specified by the pointers P-TN01 through P-TN0255. The part table section also has one part table 00h that is not specified by these pointers.

The part tables specified by the pointers P-TN01 through P-TN0255 each record the start and end addresses, which are offset addresses from the start position address of that track. Particular picture files are identified by pointer P-PN0(*). The pointer P-PN0(*) has a value equivalent to each picture file controlled by the AUX-TOC sector 1. Further, this pointer can link other part tables by link information.

For example, when a piece of music is reproduced as a first track and if it is desired to output the image of a first picture file in a particular timed relation during the reproduction, the start and end addresses defining an image output period are recorded in the part table specified by the pointer P-TN01 and a particular picture file is indicated by the pointer P-PN0(*) as the image to be outputted. If it is desired to output and display the image of the first picture file during a period from a point of time one minute zero second after starting the reproduction of the first track to a point of time one minute 30 seconds after starting that reproduction, an address point equivalent to one minute zero second after starting the reproduction of the first track and an address point equivalent to one minute 30 seconds after starting that reproduction are recorded in the part table specified by the pointer P-TN01 as the start address and the end address respectively in an offset address relation. Then, the pointer P-PN0(*) takes the value of pointer P-PN01 to specify the first picture file.

If it is desired to display two or more images one after another during reproduction of one track, the corresponding part tables are linked to control the picture files to be outputted and the output period.

It should be noted that the start and end addresses as the output timing of a picture file providing the cover picture are recorded in the part table 00h.

However, these start address and end address are recorded as negative offset addresses.

Meanwhile, if the start and end addresses in the part table corresponding to a certain track are both "000h," the image of a specified picture file is kept displayed all during the period in which the voice of that track is outputted.

In the AUX-TOC sector 5, the pointer P-EMPTY also controls the empty part tables.

5-7 AUX-TOC Sector 6

The AUX-TOC sector 6 and the AUX-TOC sector 7 are used for controlling text files.

The AUX-TOC sector 6 shown in FIG. 17 provides a control sector as a text allocation table to control the data files recorded as text files in a text file area set by pointer P-TEXT in the above-mentioned AUX-TOC sector 0.

In the AUX-TOC sector 6, the text files are controlled in the same manner as the U-TOC sector 0.

If the AUX data area is all used for recording text files, 38 clusters (×32 sectors×2324 bytes) of text data can be recorded. This text data can be controlled in the AUX-TOC sector 6 as a maximum of 255 files.

It should be noted that the length of each text file is based on sector.

One particular text file can be positioned as a text file (or a cover text) corresponding to a so-called disc cover picture.

As pointers P-TXT(x) for use in controlling text files, pointers P-TXT1 through P-TXT255 are formed in the AUX-TOC sector 6.

In the pointer section of this sector, pointers P-TFRA and P-EMPTY are also formed.

The table section of this sector contains 255 8-byte part tables 01h through FFh, each part table recording a start address, an end address, and a character mode and a superimposed bit.

The part table 00h is not specified by any pointer. This table is used only for controlling the addresses and character code of the text file positioned as a cover text.

The pointers P-TXT1 through P-TXT255 control areas each recording one text file by specifying particular part tables. For example, the part table specified by the pointer P-TXT1 records the start and end addresses and character code and a superimposed bit of the first text file.

It should be noted that the AUX-TOC sector 6 does not perform the file control operation in which part tables are linked by use of link information. Namely, no one text file is recorded over physically separated sections.

However, the empty tables in this sector are controlled in a linked form with the pointer P-EMPTY used as the origin.

The pointer P-TFRA controls the free areas, or the text file recordable areas in the text file area set by the pointer P-TEXT in the AUX-TOC sector 0. The addresses of a section, which is a free area, are recorded in the part table specified by the pointer P-TFRA. In this free area control, part tables are linked by the link information provided by the 8th byte of each part table, sometimes controlling two or more separated sections as free areas.

5-8 AUX-TOC Sector 7

The AUX-TOC sector 7 shown in FIG. 18 provides a text playback sequence table.

This table provides control information for outputting a text file in synchronization with the reproduction of a program such as music.

The sector 7 has pointers P-TN01 through P-TN0255. These pointers are the same as those described with reference to the U-TOC sector 0 and correspond to tracks 1 through 255 as programs such as music.

The part table section of the sector 7 contains 255 8-byte part tables 01h through FFh to be specified by the pointers P-TN01 through P-TN0255. One 8-byte part table 00h that is not specified by these pointers is also formed in the table section.

The control form in this sector is generally the same as that in the above-mentioned AUX-TOC sector 5.

Namely, the part tables specified by the pointers P-TN01 through P-TN0255 each record the start and end addresses, which are offset addresses from the start position address of that track. Particular text files are identified by pointer P-TXT(*). The pointer P-TXT(*) has a value equivalent to each text file controlled by the AUX-TOC sector 6. Further, this pointer can link other part tables by link information.

For example, when a piece of music is reproduced as a first track and if it is desired to output characters of a first text file in a particular timed relation during the reproduction, the start and end addresses defining a character output period are recorded in the offset address format in the part table specified by the pointer P-TN01 and a particular text file is indicated by the pointer P-TXT(*) as the character to be outputted. If it is desired to output two or more pieces of character information during reproduction of one track, corresponding part tables are linked to control the text files to be outputted and the output period.

It should be noted that the start and end addresses as the output timing of a text file providing the cover text are recorded in the part table 00h.

However, these start address and end address are recorded as negative offset addresses.

Meanwhile, if the start and end addresses in the part table corresponding to a certain track are both "000h," the characters of a specified text file is kept displayed all during the period in which the audio signal of that track is outputted.

In the AUX-TOC sector 7, the pointer P-EMPTY also controls the empty part tables.

5-9 AUX-TOC Sector 8

The AUX-TOC sector 8 and sector 9 are for use in controlling karaoke text files. A karaoke text file denotes a text file for displaying character information providing a lyrics text for example in synchronization with the music to be outputted. In the present embodiment, for one karaoke text file, a karaoke text file sector recording character information such as lyrics text and a karaoke address sector for finely setting a character output timing are recorded in a pair.

The structures of these sectors will be described later. In the present embodiment, one karaoke text file to be recorded in one track is composed of two sectors, namely the karaoke text file sector and the karaoke address sector. The sector 8 mainly controls the karaoke text file sector while the sector 9 mainly controls the karaoke address sector.

The AUX-TOC sector 8 shown in FIG. 19 provides a control sector as a karaoke text allocation table. This control sector controls the data files (karaoke file data sectors) recorded as karaoke text files in a karaoke text file area set by the pointer P-KRAOK in the above-mentioned AUX-TOC sector 0.

The AUX-TOC sector 8 controls the karaoke text files in the same manner as the U-TOC sector 0.

As seen from the U-TOC sector 0, a maximum of 255 tracks can be recorded as programs, so that a maximum of 255 karaoke text files corresponding to these tracks may be controlled.

Since one karaoke text file corresponds to only one track, the pointers P-TN01 through P-TN0255 used in the U-TOC sector 0 are used in this AUX-TOC sector 8 without change for controlling these karaoke text files.

The pointers P-KFRA and P-EMPTY are also formed in the sector 8.

The table section of this sector contains 255 8-byte part tables 01h through FFh, each part table recording a start address, an end address, and a character code (to be specific, a character code and a superimposed bit).

The pointers P-TN01 through P-TN0255 control areas each recording one karaoke text file by specifying particular part tables. For example, the part table specified by the pointer P-TXT1 records the start and end addresses and character mode and a superimposed bit of a karaoke text file sector corresponding to the first track.

It should be noted that the AUX-TOC sector 8 does not performed the file control operation in which part tables are linked by use of link information. Namely, no one karaoke text file is recorded over physically separated sections.

However, the empty tables in this sector are controlled in a linked form with the pointer P-EMPTY used as the origin (the 8th byte of each part table provides the link information).

The pointer P-KFRA controls the free areas, or the karaoke text file recordable areas in the karaoke text file area set by the pointer P-KRAOK in the AUX-TOC sector 0. The addresses of a section, which is a free area, are recorded in the part table specified by the pointer P-KFRA. In this free area control, part tables are linked by the link information provided by the 8th byte of each part table, sometimes controlling two or more separated sections as free areas.

5-10 AUX-TOC Sector 9

As described above, the AUX-TOC sector 8 controls the karaoke text file sector constituting a karaoke text file. On the other hand, the AUX-TOC sector 9 controls the karaoke address sector to be recorded in a pair with the karaoke text file sector for finely setting the output timing of the character information recorded in the karaoke text file sector.

Like the above-mentioned AUX-TOC sector 8, the sector 9 specifies part tables each recording the address of a corresponding karaoke address sector by track-corresponding pointers P-TN01 through P-TN0255. In the table section of the sector 9, each 8-byte part table corresponding to each of these pointers records the start and end addresses of a karaoke address file.

Namely, the pointers P-TN01 through P-TN0225 each control the address of a karaoke address sector in one karaoke text file corresponding to one of the tracks 1 through 255 by specifying a particular part table. For example, the part table specified by the pointer P-TN01 records the start and end addresses of the karaoke address sector to be paired with the karaoke text file sector controlled by the above-mentioned AUX-TOC sector 8 in correspondence with the first track.

It should be noted that the AUX-TOC sector 9 does not perform the file control operation in which part tables are linked by use of link information. Namely, no one karaoke address file is recorded over physically separated sections.

However, the empty tables in this sector are control led in a linked form With the pointer P-EMPTY used as the origin.

Thus, in the AUX-TOC sector 8 and sector 9, the karaoke text file sector and the karaoke address sector constituting a karaoke text file corresponding to each track are controlled in a pair. The actual output timing of the character information recorded in the karaoke text file sector is set by the karaoke address sector. The method of this setting and the output operation will be described later.

6. Data Files 6-1 Picture File Sector

The following describes three types of AUX data files to be controlled by AUX-TOC sectors formed as described above.

The file length of one piece of still picture, namely the size of one picture file is equivalent to one cluster or two clusters.

If a picture file is as long as one cluster, a maximum of 37 picture files plus one cover picture file can be recorded in the AUX data area.

One still picture consists of 650×480 dots. Each picture file is based on JPEG (Joint Photographic Coding Expert Group) format. Each picture file is controlled by AUX-TOC, so that the file bit stream is from the SOI marker specified by JPEG to the EOI marker of the file.

For the sector format, mode 2 is used and no third-layer ECC (Error Correction Code) is practiced, so that the image data capacity of one sector is 2324 bytes or the capacity of one cluster is 74368 bytes.

Figure 21:
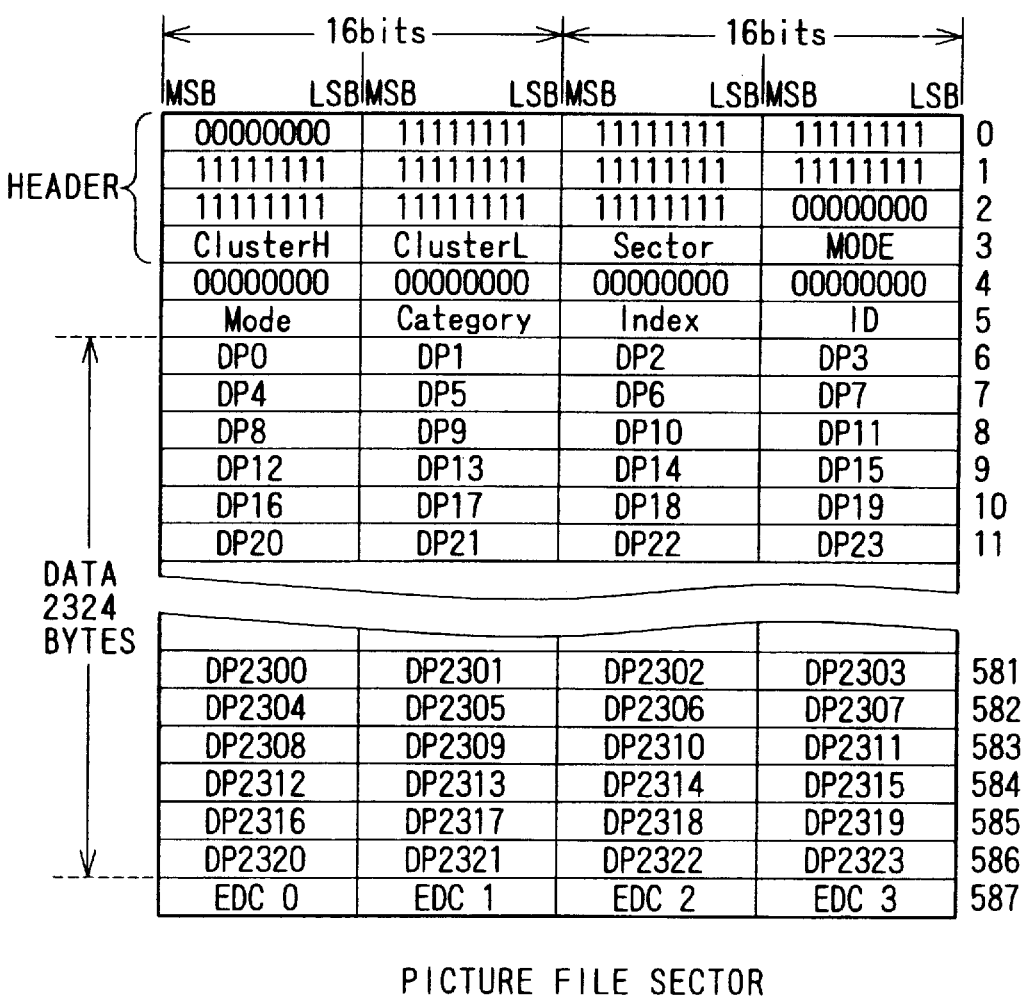
FIG. 21 is a diagram illustrating a data structure of a image file sector to be recorded in an AUX data area.

The format of sectors constituting a cluster that provide the above-mentioned picture file is as shown in FIG. 21 for example.

Following the header composed of synchronous patterns, cluster addresses, sector address, and mode information, information about error correction mode (Mode), category information indicative of data file attribute (Category), and index information indicative of a data file parameter (Index) are arranged at predetermined byte positions. A system identifier (ID) is also recorded in the picture file sector.

Below the header, 2324 bytes of image data are recorded as shown in data DPO through DP2323.

In the last four bytes of this sector, error-detecting codes (RDC0 through EDC3) are recorded.

6-2 Text File Sector

For a text file, text data such as ASCII, Modified ISO 8859-1, and Music Shifted JIS can be recorded.

The sector as a text file records characters and control codes. The control codes include a line feed, a page feed, and the like information.

Figure 22:
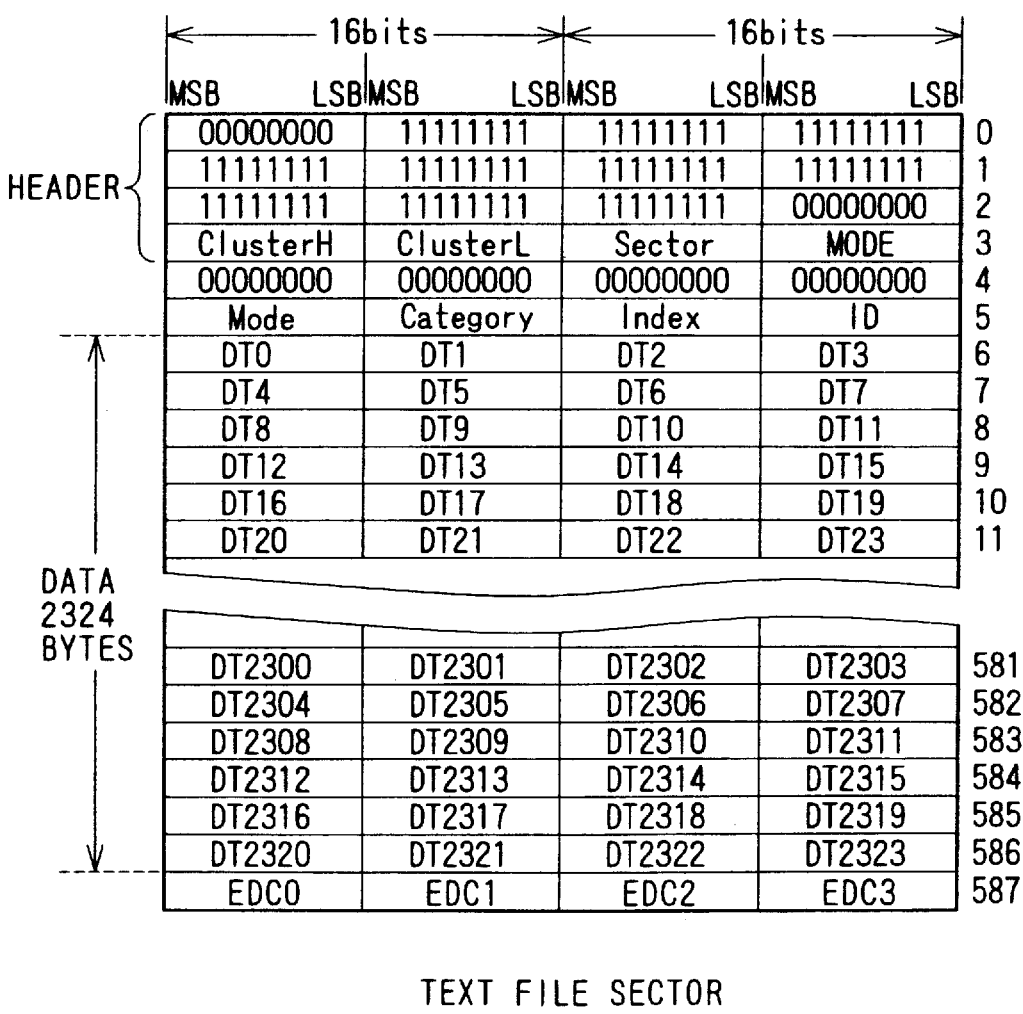
FIG. 22 is a diagram illustrating a data structure of a text file sector to be recorded in the AUX data area.

The format of the sector constituting a text file is as shown in FIG. 22 for example. Like a picture file, a header, error correction mode information (Mode), category information (Category), index information (Index), and a system identifier (ID) are arranged in this order. After these pieces of information, 2324 byte of character information (and control codes) as indicated by data DT0 through DT2323 are recorded.

In the last four bytes of this sector, error-detecting codes (RDC0 through EDC3) are recorded.

6-3 Karaoke Text File Sector

As described above, karaoke text files are formed each corresponding to one track. At the same time, each karaoke text file is constituted in which a karaoke text file sector and a karaoke address sector are paired.

The character information such as a lyrics text recorded in the karaoke text file sector is outputted for display based on the address information recorded in the karaoke address sector in a timed relation synchronized with the song or accompaniment of the corresponding track.

The karaoke text file sector can record text data such as ASCII, Modified ISO 8859-1, and Music Shifted JIS.

The karaoke text file sector also records various control codes for specifying character display position on screen, font, color, line feed, wipe, and so on.

The format of a karaoke text file sector that constitutes, in a pair with a karaoke address sector to be described later, one karaoke text file is as shown in FIG. 23 for example. Like a picture file, a header, error correction mode information (Mode), category information (Category), index information (Index), and a system identifier (ID) are arranged in this order. After these pieces of information, 2324 byte of character information and control codes as indicated by data DK0 through DK2323 are recorded.

In the last four bytes of this sector, error-detecting codes (RDC0 through EDC3) are recorded.

6-4 Karaoke Address Sector

Figure 24:
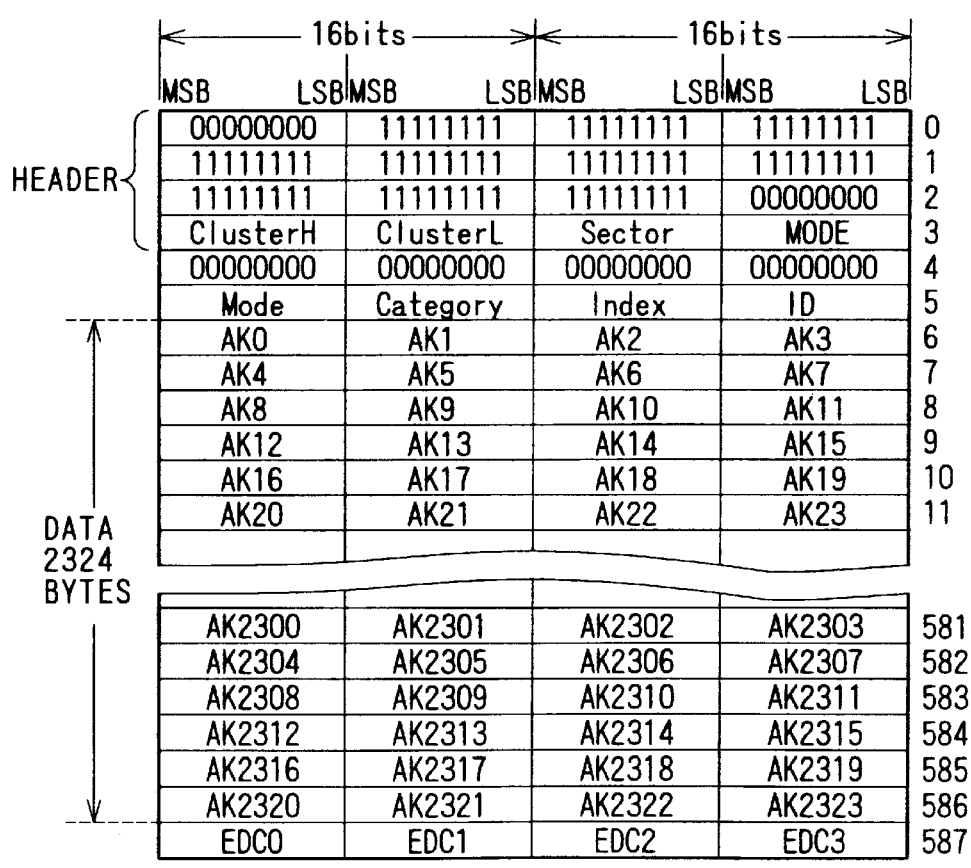
FIG. 24 is a diagram illustrating a data structure illustrating a karaoke address sector to be recorded in the AUX data area.

The format of a karaoke address sector paired with the karaoke text file sector shown in FIG. 23 is shown in FIG. 24. Also like a picture file, a header, error correction mode information (Mode) , category information (category), index information (Index), and a system identifier (ID) are arranged in this order. After these pieces of information, 2324 byte of character information (and control codes) as indicated by data AK0 through AK2323 are recorded.

In this format, one address is represented in four bytes (each of cluster addresses, a sector address, or a sound group address).

Namely, one address is recorded in four bytes, for example address data AK0 through AK3, that form one line in FIG. 24.

However, along with the address notation such as the start address and the end address in AUX-TOC, the cluster, sector, and sound group addresses are represented in a 3-byte short form, the remaining one byte being dummy.

Because one address is represented in four bytes in the offset address format for example, the karaoke address sector can record up to 581 address values per sector, or specify 581 timings (or offset addresses from track start address) in a corresponding piece of music as a track.

Also, specifying the start and end address of each part table in the AUX-TOC sectors 8 and 9 can arbitrarily set the lengths of the karaoke text file and karaoke address file for one piece of music on a sector basis.

7. Reproducing Program-synchronized Data File

The data files as AUX data and the AUX-TOC sectors for controlling these data files are formed as described above. Each data file can perform output such as image display and character display in synchronization with the reproduction of a program. The following describes this data file reproducing operation.

Each picture file is controlled by the AUX-TOC sector 1, so that the system controller 11 can output the picture file at any point of time for display. For example, the system controller 11 can display the picture file on the display monitor 24 or an externally attached monitor device through the interface 25.

In addition, the system controller 11 can display the picture names and recording dates controlled by the AUX-TOC sectors 2 and 3 onto the display monitor 24 for example at displaying images as pictures.

Further, based on the information provided by the AUX-TOC sector 5, the system controller 11 can execute the display output of a predetermined picture file in synchronization with a program. For example, as described in the AUX-TOC sector 5, the system controller 11 can, during reproduction of music of a certain track, output and display an image as one or more picture files in a particular timed relation indicated as the start and end addresses.

The output operation of a picture file can also be performed on a text file.

Namely, because each text file is controlled by the AUX-TOC sector 6, the system controller 11 can output a text file for character display at any point of time. For example, the system controller 11 can display a text file on the display monitor 24 or an externally attached monitor device through the interface 25.

In addition, based on the information provided by the AUX-TOC sector 7, the system controller 11 can execute display output of a predetermined text file in synchronization with the reproduction of a program. For example, as described in the AUX-TOC sector 5, the system controller 11 can, during reproduction of music of a certain track, output and display an image as one or more text files in a particular timed relation indicated as the start and end addresses.

Further, in the present embodiment, the system controller 11 can output and display a karaoke text file in synchronization with the reproduction of music as a track, or the character information as a lyrics text in synchronization with the play of music as a vocal or a karaoke guide.

Therefore, one karaoke text file is formed for one track and each karaoke text file thus formed is constituted by a pair of karaoke text file sector and karaoke address sector.

The following describes output timing control on the character information recorded in the karaoke text file sector with reference to FIGS. 25A through 25C.

FIGS. 25A shows an example of information in the karaoke text file sector shown in FIG. 23 to be recorded as data DK0 through DK7.

Values 59h, 6Fh, . . . , 77h representing data DK0 through DK7 provide character information in ASCII code. As shown, this example records character information "Y", "o", "u", "", "k", "n", "o", and "w" forming a part of the lyrics text of a track as data DK0 through DK7.

FIG. 25B shows an example of information in the karaoke address sector to be recorded as address data AK0 through AK7.

As described above, the address is represented in the short form by use of three of the four bytes. Therefore, one offset address is recorded as address data AK0 through AK3 and another offset address is recorded as address data AK4 through AK7. In this example, the address values "cluster 0032h, sector 04h, sound group 0h" and the address values "cluster 0032h, sector 13h, sound group 9h" shown in FIG. 4 are recorded as offset addresses starting from the address values "cluster 0032h, sector 00h, sound group 0h" respectively.

The karaoke text file sector and the karaoke address sector shown in FIGS. 25A and 25B are controlled as a pair of sectors by the AUX-TOC sectors 8 and 9.

The address data AK0 through AK3 of the karaoke address sector provide an address corresponding to the data DK0 through DK3 of the karaoke text file sector.

Likewise, the address data AK4 through AK7 of the karaoke address sector provide an address corresponding to the data DK4 through DK7 of the karaoke text file sector.

Although not shown in FIGS. 25A through 25C, the karaoke address sector and the karaoke text file sector are related to each other on a 4-byte basis. Namely, as shown in FIGS. 23 and 24, data DK8 through DK11 correspond to address data AK8 through AK11, data DK12 through DK15 correspond to address data AK12 through AK15, . . . , and data DK2320 through DK2323 correspond to address data AK2320 through AK2323.

In other words, in the character information recorded in the karaoke text file sector, the addresses as output timings are recorded in the karaoke address sector on a 4-byte basis.

This arrangement allows the system controller 11 to know that characters "You" for example shown in FIG. 25A is to be outputted in the reproduction timing of "cluster 0032h, sector 04h, sound group 0h" shown in FIG. 25B and that characters "Know" shown in FIG. 25A is to be outputted in the reproduction timing of "cluster 0032h, sector 13h, sound group 9h" shown in FIG. 25B.

The output timing of the character information providing a lyrics text is thus controlled on a 4-byte basis, so that presetting the address data providing this output timing in a matched relation with a piece of music can output and display the characters forming a lyrics text in synchronization with th e song or accompaniment of the music.

Consequently, when playing karaoke based on the display operation by use of this karaoke text file, the lyrics text to be sung is displayed in an appropriate timed relation. In addition, when listening to a normal singing play, the lyrics text of a song can be displayed in synchronization with the song, thereby extending user's musical enjoyment.

It should be noted that FIG. 25C shows an example in which address information is represented not in an offset address but in an absolute address (or a short form). Thus, an output timing may be specified in an absolute address.

FIGS. 25B and 25C show examples in which addresses are recorded in the short form. However, the addresses may not always be represented in the short form because the 4-byte area is allocated.

Figure 37A:
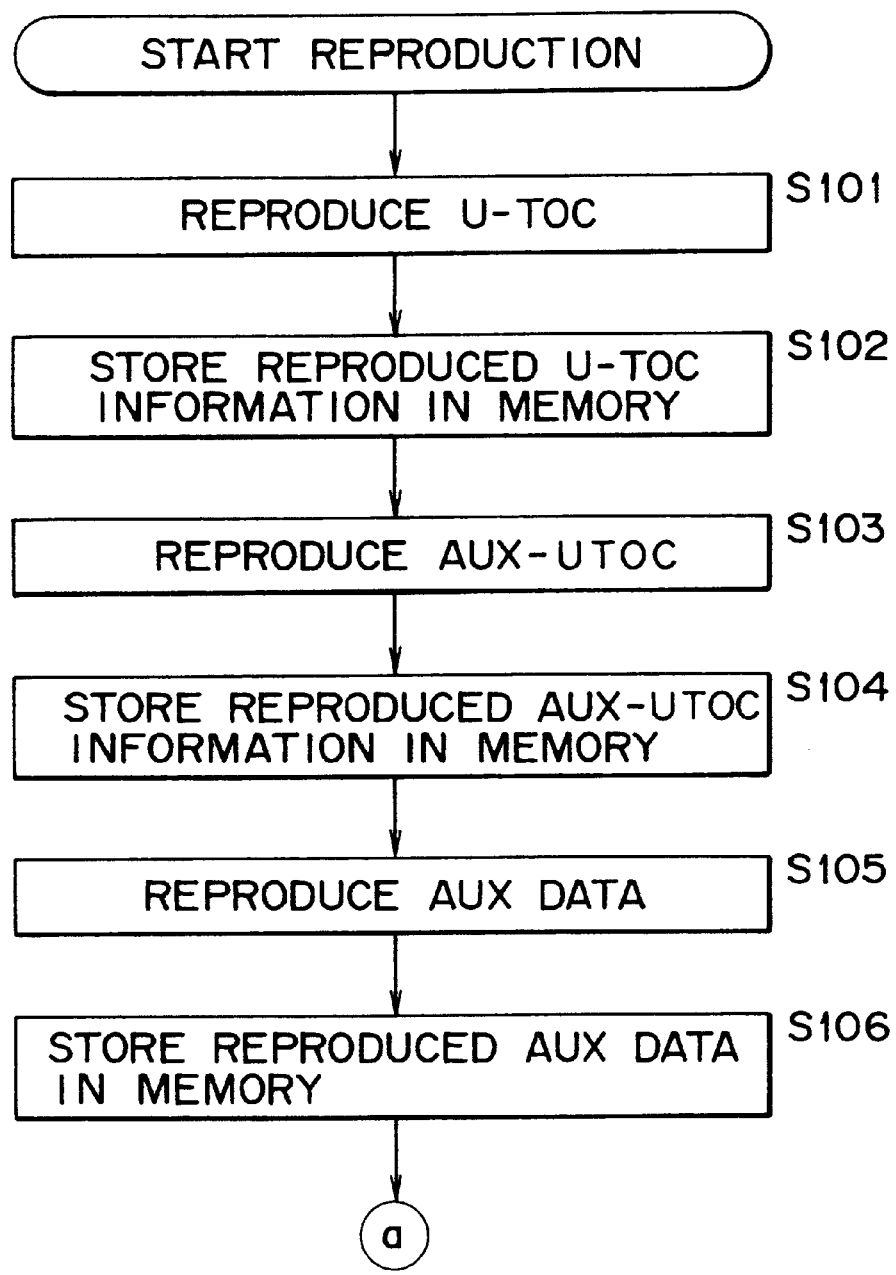
Figure 38A:
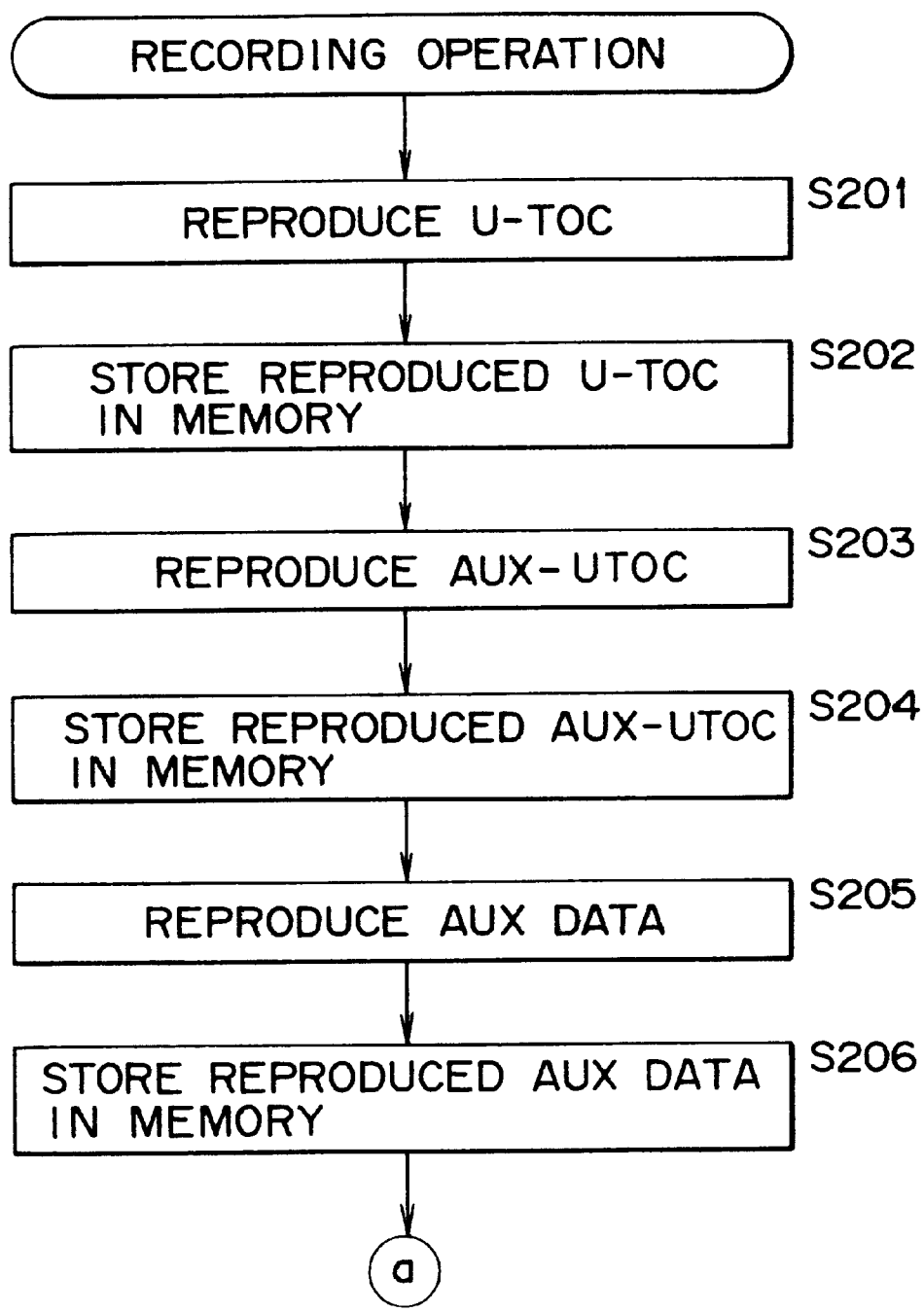
FIGS. 38A, 38B, 38C, and 38D are flowcharts indicative of a recording procedure in the recording apparatus associated with the present invention.
Figure 38B:
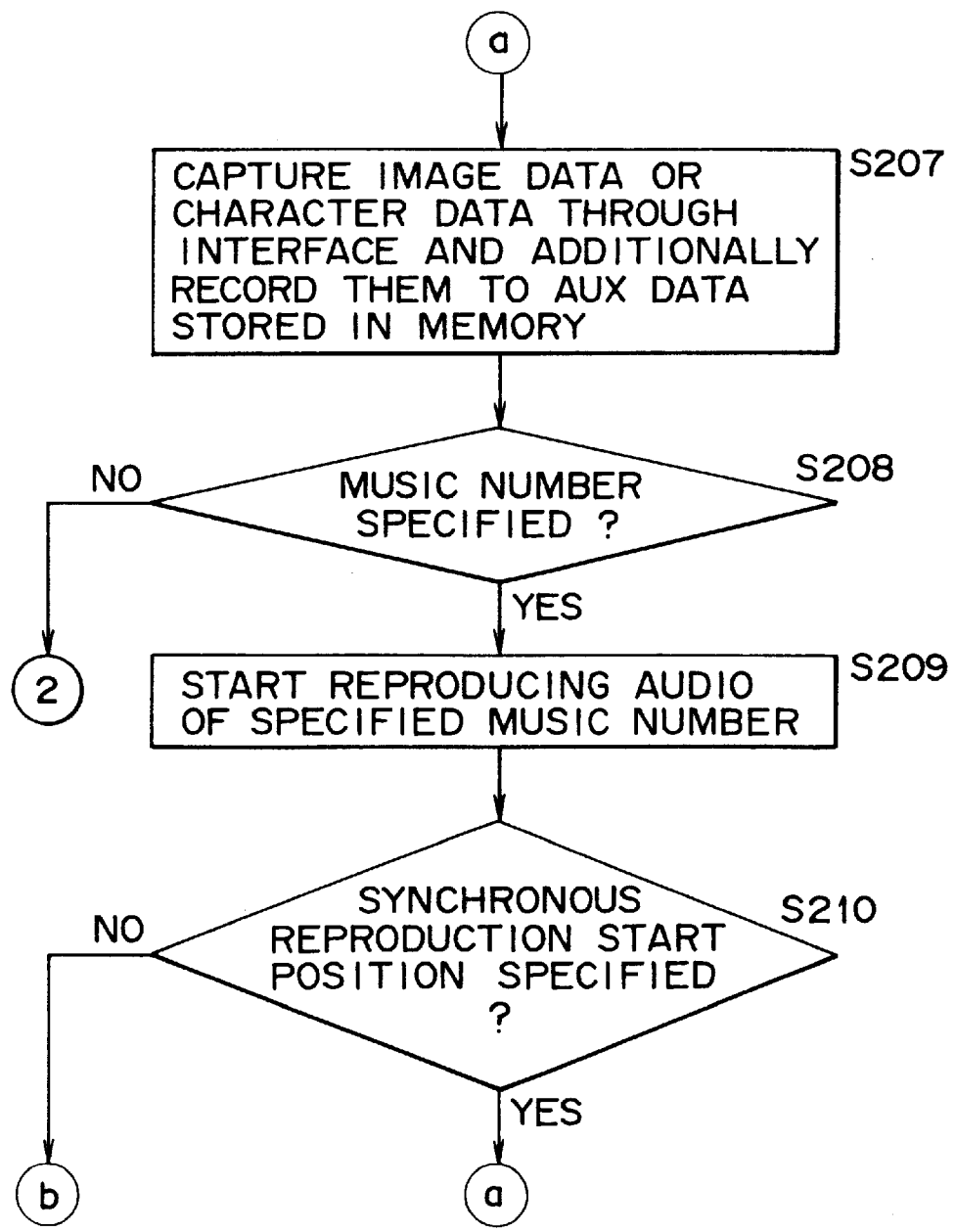
Figure 38C:
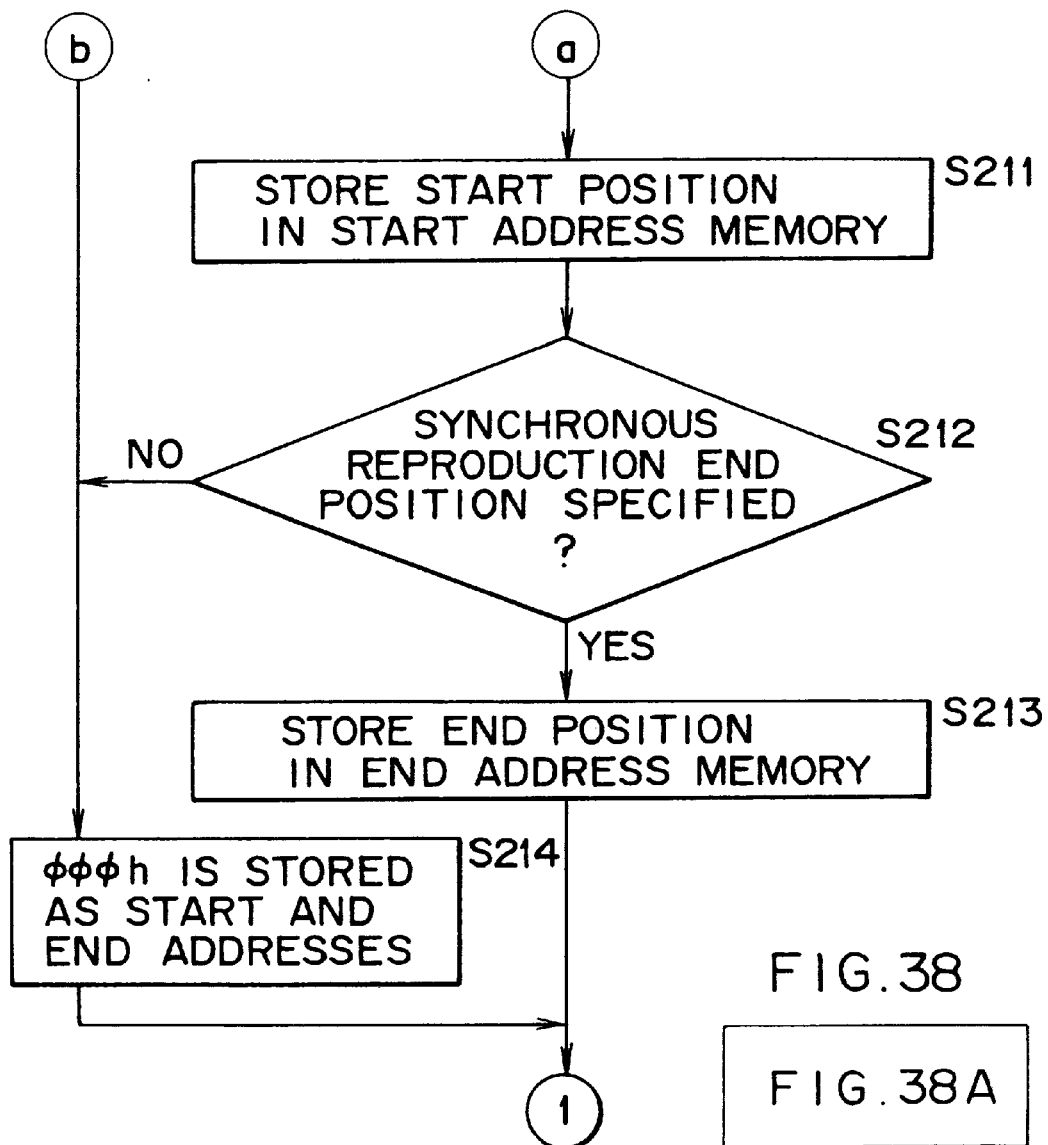
Figure 38:
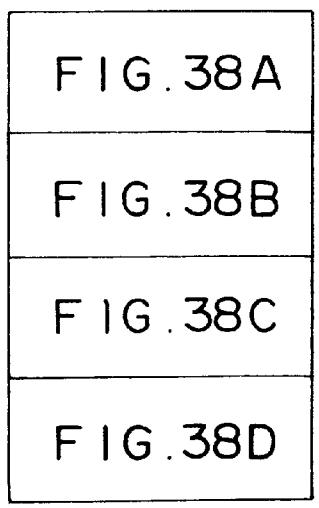
Figure 38D:
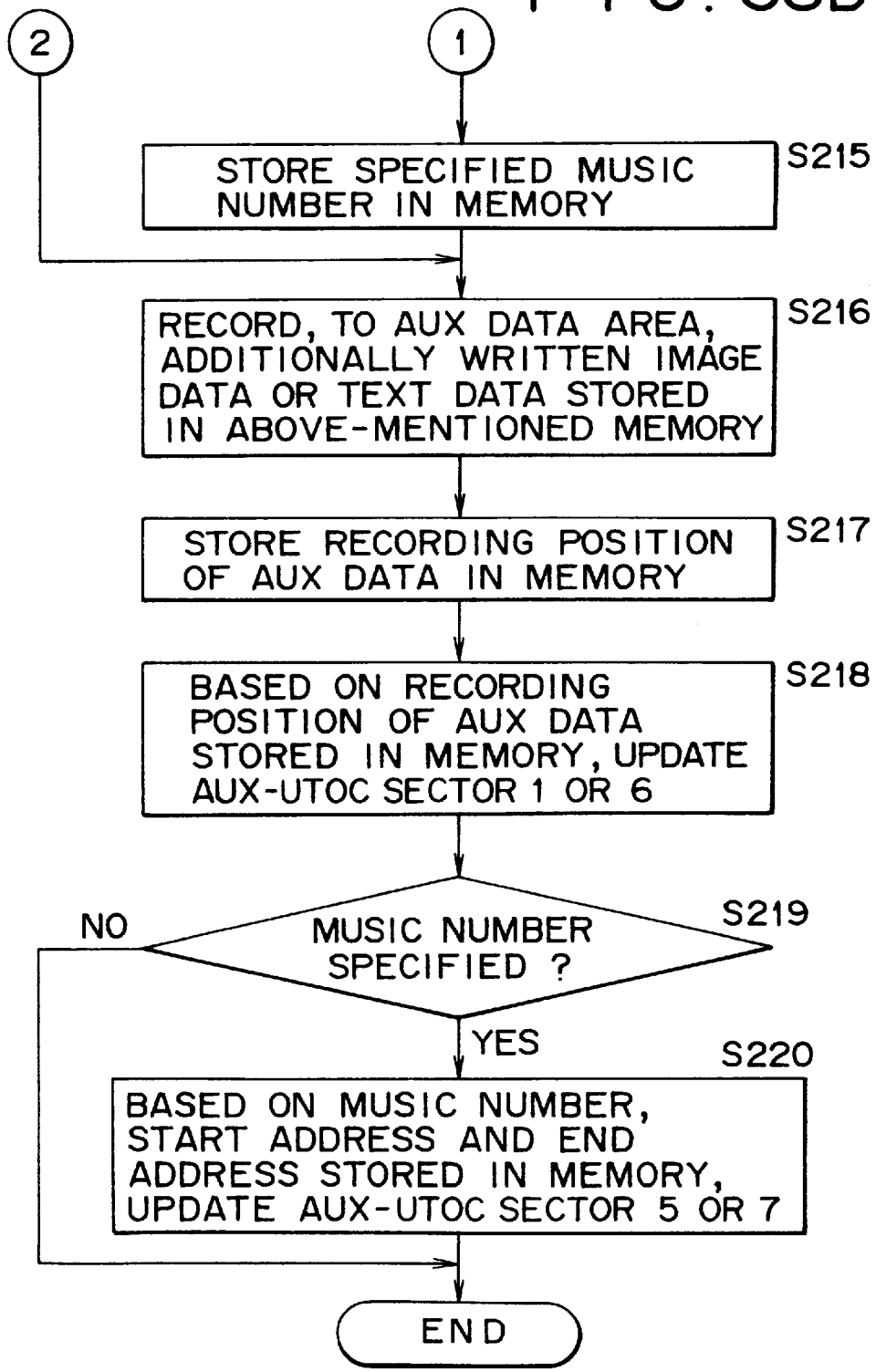

The following describes a reproducing procedure with reference to a flowchart shown in FIG. 37.

When reproduction is instructed, the U-TOC area is reproduced in step S101 and data such as the recording position of each music in the program area is stored in memory in step S102. In step S103, the AUX-U-TOC area is reproduced to tabulate various file number information corresponding to the recording position and music number in the AUX data area in which a picture file, a text file, and a karaoke file are recorded and the timing information for synchronous reproduction. The resultant table is stored in memory in step S104. In step S105, auxiliary data is reproduced from the AUX data area and the reproduced auxiliary data is stored in memory in step S106. In step S107, the optical pickup is moved to the program area in which music is recorded to start reproducing audio data.

In step S108, in synchronization with the reproduction of the audio data, the image, text, lyrics text data corresponding to the currently reproduced music number are outputted from memory in a predetermined timed relation based on the various file number information corresponding to the music number reproduced from the AUXU-TOC area and the timing information for synchronous reproduction stored in memory.

The auxiliary data including the image, text, and lyrics text data outputted from memory in the predetermined time relation are displayed on a monitor display such as CRT in step S109.

In step S110, it is determined whether all pieces of music have been reproduced. If not, then back in step S108, the auxiliary data for the music number being reproduced is synchronously reproduced.

If yes, the reproduction of the music in the program area and the reproduction of the auxiliary data from memory are ended in step S111.

It should be noted that the memory device for storing the above-mentioned U-TOC data, AUX-U-TOC data, and auxiliary data may be one memory device or two or more memory devices provided in correspondence with the above-mentioned types of data. If the auxiliary data is image data, a memory device of a relatively large storage size is required in general.

8. Recording AUX Data

The AUX data file that can be outputted for reproduction as described above can be recorded on the disc 90 by the user after (or at the same time) a piece of music has been recorded as a program.

For example, in the case of a picture file or a text file, the user inputs character data and image data by operating the operator panel 23 or a personal computer or an image scanner connected to the present embodiment through the interface 25.

In inputting image data as a picture file or character data as a text file, the user may or may not input a track number or output timing information of a program to be related.

If no track number for providing the relation is inputted, the system controller 11 controls the recording operation on the disc 90 such that the inputted image data or character data is recorded as one picture file or one text file in the AUX data area. At the same time, the system controller 11 updates the AUX-TOC such that the recorded data file is controlled by the AUX-TOC sector 1 or sector 6.

On the other hand, if the user inputted a corresponding track number along with image data or character data, the system controller 11 records the picture file or a text file onto the disc 90 and updates the AUX-TOC sector 1 or sector 6 as well as the AUX-TOC sector 5 or sector 7 that provides the playback sequence table.

Namely, a control state is realized in which a recorded data file is outputted for display at reproduction of a particular track.

It should be noted that, if the user does not input the output timing information in the specified track, the start and end addresses of a part table to be used for the specified track are each "000h" in the AUX-TOC sector 5 or sector 7. Namely, a state is provided in which an image or characters as a data file to be recorded are outputted continuously during reproduction of the specified track.

Obviously, if the user inputted output timing information, the values of the start and end address of the part table to be used are set according to this input in the AUX-TOC sector 5 or sector 7. In other words, a state is provided in which the data file is outputted for reproduction in a predetermined period during reproduction of the specified track.

It should be noted that the reproduction timing may be inputted by allowing the user to turn on a predetermined operator switch in the image or character output start and end timings while having the user be listening to the reproduced audio output of the specified track.

Specification of the track corresponding to a data file and an output timing setting operation may be performed at the time the data file is recorded as well as at a later time. Namely, an editing operation mode is provided in which the user can arbitrarily execute a data updating operation only for the AUX-TOC sector 5 or sector 7.

As for a karaoke text file, the user can arbitrarily input character data for recording by operating the operator panel 23 or a personal computer connected through the interface 25.

In this case, the user inputs all character data such as the lyrics text of one piece of music for example. Following the inputting of the character data, the system controller 11 requests the user for specification a particular track. The user inputs the track number accordingly.

Then, the system controller 11 starts reproducing the specified track and, at the same time, displays the characters inputted by the user in units of four bytes from the first character sequentially.

For the four bytes of characters being display, the user waits for a desired output timing while listening to the reproduced audio and, when that timing comes, the user presses a predetermined timing specifying switch.

The system controller 11 uses the address of the reproducing position in the timing of this switch pressing operation as the address corresponding to the four bytes of data being displayed. Namely, the system controller 11 holds that address as one of the addresses to be recorded in the karaoke address sector.

Performing this operation for the last four bytes of the inputted character information sets each address value to be recorded in the karaoke address sector.

Then, the system controller 11 records, into the AUX data area, the inputted character information as the karaoke text file sector and each address value corresponding to the 4-byte character data that was set as the karaoke address sector. At the same time, the system controller 11 updates the AUX-TOC sector 8 and sector 9.

Thus, the state in which character information is outputted in synchronization with a song or a performance is realized as described above with respect to the outputting of a karaoke text file for reproduction.

It should be noted that only the karaoke address sector can be updated so that the output timing of each character of the karaoke text file can be adjusted according to the music.

As described above, the present embodiment allows the user to arbitrarily record a picture file, text file, and a karaoke text file and set the output timing in correspondence with a particular track.

Besides, these files can be recorded only by updating these files and the AUX-TOC thereof without updating the corresponding program (or track), so that the recording can be executed in a significantly short time.

The output timings can be changed or adjusted and tracks to be related can be easily changed only by updating the AUX-TOC.

The following describes a recording procedure with reference to a flowchart shown in FIGS. 38A, 38B, 38C, and 38D.

When a recording operation is instructed, the U-TOC area is first reproduced in step S201. In step S202, data such as the recording position of each piece of music in the program area is stored in memory. In step S203, the AUX-U-TOC area is reproduced to tabulate various file number information corresponding to the recording position and music number in the AUX data area in which a picture file, a text file, and a karaoke file are recorded and timing information for synchronous reproduction. The resultant table is stored in memory in step S204. In step S205, auxiliary data is reproduced from the AUX data area. The reproduced auxiliary data is once saved in memory in step S206.

In step S207, image or text data supplied from a personal computer, digital still camera, or an image scanner for example through the interface is additionally written from the AUX data area saved in memory onto the auxiliary data.

In step S208, whether an operation for relating the auxiliary data composed of the image or text data captured through the interface with the music already recorded in the program area is to be performed or not is made by use of the operator panel 23 shown in FIG. 1.

If the relating operation is determined to be performed in step S208, a music number to be related is selected. In step S209, the music corresponding to the music number selected in step S208 is reproduced. If it is desired to synchronously reproduce the still image or text data captured in a desired timed relation for the output of the audio signal being reproduced, the user specifies a period of the synchronous reproduction in steps S210 through S213.

To be more specific, in step S210, while listening to the audio signal being reproduced, the user performs a predetermined operation on the operator panel 23 shown in FIG. 1 at the position at which the synchronous reproduction of the still image or text data is to start.

In step S211, the offset address of the position being reproduced when the above-mentioned predetermined operation was performed is stored in memory.

In step S212, while listening to the audio signal being reproduced, the user performs a predetermined operation on the operator panel 23 shown in FIG. 1 at the position at which the synchronous reproduction of the still image or text data is to be ended.

In step S213, the offset address of the position being reproduced when the above-mentioned predetermined operation was performed is stored in memory.

On the other hand, if, in step S208, only the music number is specified and the synchronous reproduction start position and the synchronous reproduction end position are not specified in steps S210 and S212 respectively, then, in step S214, "000h" is stored in memory as the start address and the end address to be stored in memory.

In step S215, the music number specified in step S208 is stored in memory.

In step S216, the additionally written image or text data stored in memory is recorded onto the AUX data area. In step S217, the recording position of the image or text data in the AUX data area is stored in memory for control by the AUX-U-TOC sector 1 or 6.

Based on the recording position information stored in step S217, the AUX-U-TOC sector 1 or 6 is edited for updating in step S218.

In step S219, it is determined whether the music number is specified. If not, then, in step S221, this recording operation is ended. If yes, the AUX-U-TOC sector 5 or 7 is edited for updating based on the music number, start address, and end address stored in memory.

9. Variations 9-1 Variation A

Various variations are possible for the above-mentioned arrangement of a karaoke text file. The following describes two variations A and B for example.

Variation A does not use the AUX-TOC sector 9. In the above-mentioned example, each karaoke text file is composed of a pair of karaoke text file sector and karaoke address sector. In the variation A, however, no karaoke address sector is provided and therefore one karaoke text file is composed of only one karaoke text file sector.

Consequently, one track is related to one karaoke text file sector, which is controlled only by the AUX-TOC sector 8, negating the need for the AUX-TOC sector 9.

Figure 26:
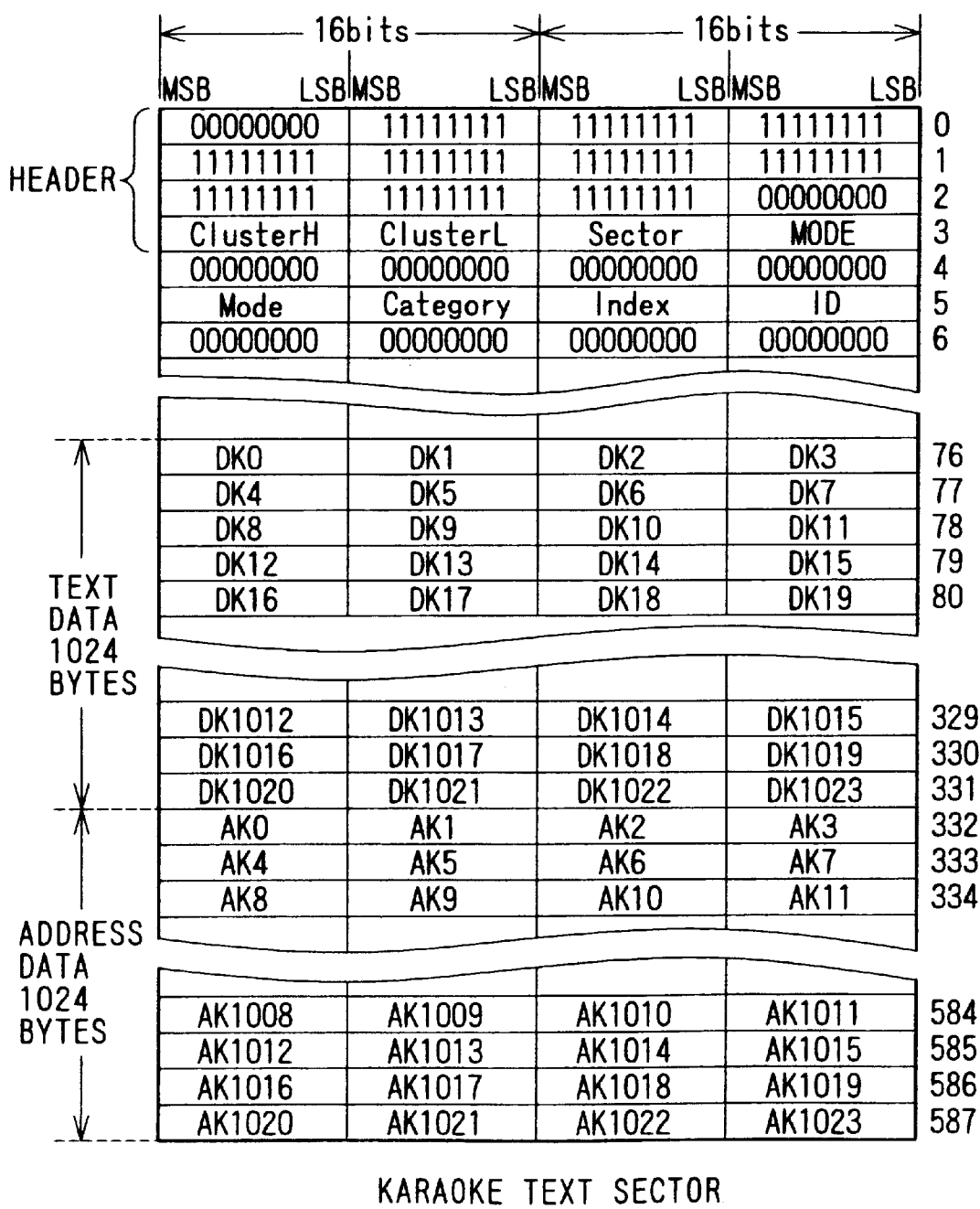
FIG. 26 is a diagram illustrating a data structure of a case in which both karaoke text data and karaoke address data are controlled in one sector of the AUX data area practiced as a second preferred embodiment of the invention.

In this case, the karaoke text file sector is formatted as shown in FIG. 26 for example.

To be more specific, the header, the error correction mode information (Mode), the category information (Category), the index information (Index), and the system identifier (ID) are the same as those of the above-mentioned nonvariation example. In the variation A, however, an area for recording 1024 bytes of character information (and control codes) is provided as indicated with data DK0 through DK1023. An area of the remaining 1024 bytes is used for recording the address information as indicated with address data AK0 through AK1023.

In other words, character information such as a lyrics text and the address information as the output timing of this character information are recorded in one sector.

Obviously, in this case, the character information such as a lyrics text that can be recorded for one track is 1024 bytes long per sector, a half of the above-mentioned nonvariation example. However, specifying the start and end addresses of part table in the AUX-TOC sector 8 allows the user to arbitrarily set the length of the karaoke text file for one piece of music on a sector basis.

In this case, too, one piece of address information corresponds to every four bytes of character information.

To be more specific, as shown in FIG. 27, data DK0 through DK3 correspond to address data AK0 through AK3, data DK4 through DK7 correspond to address data AK4 through AK7, . . . , data DK1020 through DK1023 correspond to address data AK1020 through AK1023.

This arrangement allows the display output of a lyrics text in synchronization with its song or accompaniment like the above-mentioned nonvariation example.

9-2 Variation B

Variation B also does not require the control by the AUX-TOC sector 9. However, unlike the variation A, a karaoke text file is formed by a pair of karaoke text file sector and karaoke address sector. Namely, the karaoke text file sector and the karaoke address sector as shown in FIGS. 23 and 24 are provided. Therefore, the size of character information for one track is 2324 bytes.

In the variation B, the karaoke text file sector for a certain track is specified by the AUX-TOC sector 8. The karaoke address sector to be paired with this karaoke text file sector is specified by predetermined rules.

Figure 28:
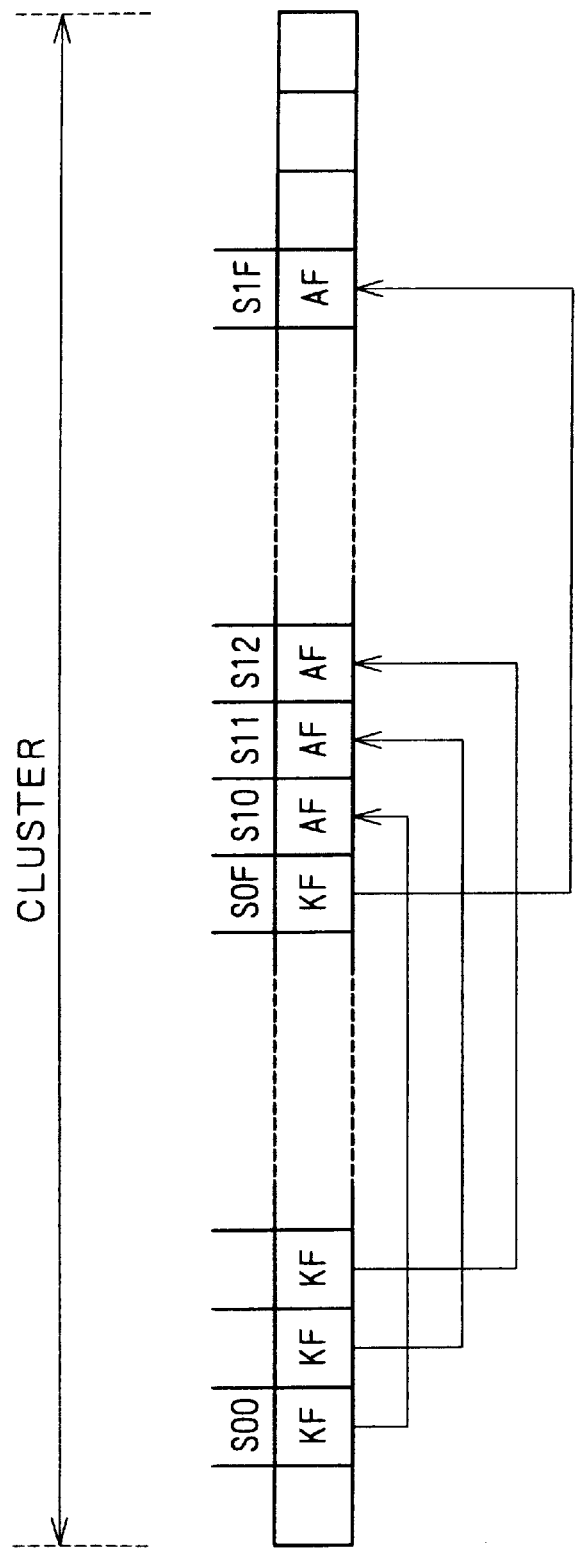
FIG. 28 is a schematic diagram illustrating a relationship between a karaoke text file and a karaoke address file in one cluster.

For example, FIG. 28 shows a cluster that is set in the karaoke text file area. The first 16 sectors S00 through S0F are specified each for use as a karaoke text file sector KF and the last 16 sectors S10 through S1F are specified each for use a karaoke address sector AF.

The karaoke address sector for a certain karaoke text file sector always a sector which is 16 sectors ahead of that karaoke text file sector.

Namely, if the control information is not especially provided, the karaoke text file sector and the karaoke address sector are related with each other on a one-to-one basis as sectors S00 to sector S10, sector S01 to sector S11, and so on.

This arrangement also enables the display output of a lyrics text for example which is in synchronization with its song or accompaniment.

9-3 Variation C

In actual karaoke systems, generally, several lines of a lyrics text which form a totality meaningful as a melody are displayed on the screen beforehand and so-called wipe processing is performed on the displayed characters forming the lyrics lines. The wipe processing provides a capability of guiding a karaoke singer along the song being played. For example, the wipe processing sequentially changes the display colors of lyrics characters as the song melody progresses.

According to the data structure and control arrangement of the karaoke text file so far described, a totality of lyrics text can be displayed in an appropriate timing relation in synchronization with the song or accompaniment for each program (or piece of music) for example. However, comparatively fine display control such as wiping lyrics characters along with the progress of a melody as described above requires definition of predetermined control information for example for the character data and so on.

The following describes, as the variation C, a karaoke text file format for realizing a practical karaoke lyrics display capability that allows the above-mentioned lyrics wiping processing.

The variation C does not use the AUX-TOC sector 9 either. In the variation C, character information as a karaoke text file and display control information for displaying that character information as actual karaoke lyrics are stored in each sector according to predetermined rules, thereby forming the karaoke text file.

In the variation C, like the above-mentioned formats, the area recording one karaoke text file related to each of the tracks 1 through 255 by pointers P-TN01 through P-TN0255 in the AUX-TOC sector 8 shown in FIG. 19 is controlled by specifying a particular part table. Namely, the start and end addresses of the part table pointed by pointer P-TN0(x) indicate the addresses of the start and end sectors between which the karaoke text file of the track corresponding to that pointer is stored.

In this case, however, the number of sectors forming the karaoke text file corresponding to one track is not limited, provided that these sectors must be recorded not discretely but continuously in the AUX data area.

FIG. 29 shows the format of a karaoke text file sector practiced as the variation C. It should be noted that, if two or more sectors form the karaoke text file corresponding to one track, the sector shown in FIG. 29 provides the start sector of that karaoke text file.

In this case, the format is composed of a header formed by slots of lines 0 through 3 (one line=four bytes), error correction mode information (Mode) in the slot of line 11, category information (Category), index information (Index), and a system identifier (ID) in this order. The data of the karaoke text file is recorded in a 2304-byte area formed by slots of lines 12 through 587.

The above-mentioned data is used in units of "block" arranged every six lines of slots as shown in FIG. 29. Therefore, the size of each block is 4 bytes×6=24 bytes. As given by (587−11)/6=96, one sector contains 96 blocks #1 through #96.

In what follows, the byte data in one block is arranged as byte 1 through byte 4 from the upper byte to the lower byte on the top line, and subsequently byte 5, byte 6, . . . , byte 23 and byte 24 from the upper byte to the lower byte of line 2, and so on.

As shown in FIG. 29, SOL (Start Of Line) is set to byte 1 of block #1. SOL indicates that the current block is a block including the start character of a line to be displayed as a karaoke lyrics text. For example, SOL is formed by a predetermined fixed bit pattern. Namely, the variation C is controlled by SOL for each character string information forming a lyrics display line.

CTL, Fnt, P-X, and P-Y are set to byte 2 through byte 5 in block #1 respectively. CTL stores information indicative of execution or nonexecution of lyrics wiping, a title, and other required attributes. Fnt stores font-associated display information such as the type, size, and color of fonts to be used by lyrics display. For example, this Fnt changes the setting of character color and character attribute before and after the wiping processing or display characters to be described later. P-X and P-Y indicates, X coordinate and Y coordinate respectively, a display position (for example, a display start position of a lyrics display line) of the character string information (or lyrics display line) controlled by SOL.

The following byte 6 through byte 8 store text data. To be more specific, the first character of the lyrics display line is stored in byte 6 of the block in which SOL exists. In this example, text data corresponding to characters a, b, and c, alphabetical characters typical as a 1-byte code are stored in byte 6 through byte 8.

In 4-byte area formed by byte 9 through byte 12, a Display Start Address is set. For this address, a time (or an address in the corresponding program) at which the lyrics display line controlled by the SOL of the current block is displayed is set. The Display Start Address may be represented by any one of the above-mentioned absolute address and offset address.

Wipe Start and Wide End are set to a 2-byte area formed by byte 13 and byte 14 and a 2-byte area formed by byte 15 and byte 16 respectively. Wipe Start indicates a wipe start time (or address) by an offset value for the above-mentioned Display Start Address. Wipe End indicates a wipe end time (or address) by an offset value for the above-mentioned Display Start Address.

Display End is set to a 2-byte area formed by byte 17 and byte 18. Display End indicates, by an offset value for the Display Start Address, a time (or address) at which the display of a lyrics display line controlled by the SOL of the current line is ended (or erased).

Information associated with wipe control on each character information (or text data) stored in the current block is stored in byte 19 through byte 24. For the information associated with wipe control, WL* and PL* are set. For WL*, data equivalent to a duration of time necessary for wiping the character* displayed as a lyrics text is stored. For PL*, a during of time (normally 0 in may cases) from the end of wiping of the character * to the start of wiping of a next character to be wiped is stored.

Therefore, WLa and PLa are set to byte 19 and byte 20 of block #1 shown in FIG. 29 respectively as the wipe control information about character "a" stored in byte 6. Subsequently, wipe control information WLb and PLb about the character "b" stored in byte 7 are set to byte 21 and byte 22 respectively. Further, wipe control information WLc and PLc about the character "c" stored in byte 8 are set to byte 23 and byte 24 respectively.

Thus, the block in which SOL is located at byte 1 is a block that includes the start character of karaoke lyrics text display lines. This SOL-including block also functions as a header area (subsequently referred to as a header block) that includes such display control information associated with lyrics display lines as CTL, Fnt, P-X, P-Y, Display Start Address, Wipe Start, Wipe End, and Display End. Therefore, since these pieces of display control information must be allocated to the predetermined byte positions in the block as described above, only three characters of text data and wipe control information are stored in the block that has SOL.

In this case, following block #1, block #2 stores the character information of the same lyrics display line as block #1 and the wipe control information associated with this character information.

Thus, in a block (also referred to as a data block) following the block having SOL, in which the text file data of the same lyrics display line as in the SOL containing block, byte 1 through byte 8 of the 24 bytes forming the data block are allocated as an area for storing the text data corresponding to lyrics characters. The remaining byte 9 through byte 24 are set as an area in which wipe control information WL* and PL* for the characters (or text data) stored in byte 1 through byte 8 are stored.

As for block #2 shown in FIG. 29, seven characters of text data, namely d, e, f, g, h, i, and j are stored in byte 1 through byte 7. In this case, because character "j" terminates one lyrics display line, no text data is stored at byte 8. In such a case, all "0s" are set to indicate that no text data is stored at that byte.

In byte 8 through byte 22 of block #2, the wipe control information (WLd and PLd) through (WLj and PLj) about characters d, e, f, g, h, i, and j are sequentially stored. In this case, all "0s" are set to both byte 23 and byte 24 because all "0s" are set to byte 8.

In this case, block #1 and block #2 record the text data of one lyrics display line (namely 10 characters "a" through "j") and, at the same time, record the display control information such as lyrics line display timing and position and the wipe Liming for each character forming this lyrics display line.

FIG. 29 shows an example of a state in which the data about the lyrics display line continued from the lyrics display line stored in above-mentioned block #1 and block #2 is stored starting with block #3. In this state, text data about characters k, l, and m and accompanying wipe control information are stored in block #3.

Subsequently, karaoke text file data complying with the actual display format of lyrics display line is stored, although not shown. It should be noted that the last block #96 stores character information about characters x, y, and z forming a lyrics display line continued from the preceding block and wipe control information (WLx and PLX) through (WLz and PLz) into byte 1 through byte 3 and byte 8 through byte 13 respectively.

If one piece of music (or one track) of karaoke text file data cannot be stored in one sector, the excess portion may be stored a succeeding sector in the same format as described with reference to FIG. 29. The number of continued sectors for storing one piece of music (or one track) is not limited as described before. Actually, any number of sectors may be concatenated that is enough for storing one track of karaoke text file data.

According to the above-mentioned format, if the number of characters for each lyrics display line is within three for example, the data equivalent to one lyrics display line completes only in the block having SOL, the following block being set with a SOL corresponding to the next lyrics display line.

On the other hand, if the number of characters forming one lyrics display line exceeds 11, the block having SOL may be followed by a block having the format described as block #2 may be provided continuously in the number enough for storing the characters forming one lyrics display line.

The system controller 11 can identify the delimiting position between blocks each corresponding to one lyrics display line by the SOL set to byte 1 of the header block. By use of the karaoke text file data composed of the header block corresponding to one lyrics display line identified by this SOL and the following data block (no data block follows depending on the number of characters per lyrics display line), each lyrics display line can be formed and impart variations to the display of a karaoke lyrics text according to the display control information and wipe control information set to this display character line and each character thereof.

The following describes, with reference to FIGS. 30A through 30D, an example of karaoke lyrics display to be realized by the karaoke text file data shown in FIG. 29. It should be noted that it is preferable in reality for the display processing shown in FIGS. 30A through 30D to be performed on a display device having a comparatively large screen such as an externally attached monitor device for example.

While the music (namely karaoke) of the track corresponding to the karaoke text file sector shown in FIG. 29 is reproduced for example, the system controller 11 displays a lyric text of one line of text data characters "a, b, c, d, e, f, g, h, i, and j" at a predetermined position of the display monitor 24 (or an externally attached monitor device) as shown in FIG. 30A based on the data of block #1 and block #2 shown in FIG. 29. At this time, start of displaying this lyrics display line is timed based on the Display Start Address of block #1 and the display position on the display screen is determined based on P-X and P-Y of block #1.

Then, the system controller 11 performs timing control on the wipe display for each display characters according to the Wipe Start information of block #1 and the wipe control information set to the text data characters "a, b, c, d, e, f, g, h, i, and j" forming one line of lyrics text. This allows these text data characters to be sequentially wiped starting with "a" in synchronization with the progress of the music as shown in FIG. 30B. Each wiped character is indicated here by a hollow character for example. In actual wipe processing, the wiped characters may be indicated by any other form such as changed color for example.

Also, FIG. 30B shows a state in which a lyrics text line based on text data "k, l, m, n, and o" is displayed below a lyrics text line based on text data "a, b, c, d, e, f, g, h, i, and j" in a timed relation in which character "e" is wiped for the case in which the contents of the karaoke text file data shown in FIG. 29 are set so that the lyrics text line based on text data "k, l, m, n, and o" is displayed following the lyrics text line based on text data "a, b, c, d, e, f, g, h, i, and j" for example. This results from starting the display according to the Display Start Address, P-X, and P-Y (stored in block #3) corresponding to the lyrics text line based on text data "k, l, m, n, and o."

Subsequently, as shown in FIG. 30C for example, a state is indicated in which the lyrics text line "a, b, c, d, e, f, g, h, i, and j" has been wiped and wiping of the following lyrics text line "k, l, m, n, and o" is about to start. The time at which the wiping of the lyrics text line "a, b, c, d, e, f, g, h, i, and j" ends corresponds to the Wipe End in block #1 and the time at which wiping of the lyrics text line "k, l, m, n, and o" starts is determined by the Wipe Start in block #3.

In FIG. 30D indicative of a state subsequent to the state shown in FIG. 30C, the wiping has been performed up to character "n" inclusive in the lyrics text line "k, l, m, n, and o" with the wiping of the lyrics text line "a, b, c, d, e, f, g, h, i, and j" ended. It should be noted that the display of the lyrics text line "a, b, c, d, e, f, g, h, i, and j" is ended based on the information of the Display End stored in block #1.

It should be noted that the display forms shown in FIGS. 30A through 30D are for the illustrative purposes only. For example, setting the Display Start Addresses for the lyrics text data "a, b, c, d, e, f, g, h, i, and j" and the lyrics text data "k, l, m, n, and o" to a same value allows simultaneous display of these lyrics text lines. At this time, specifying different predetermined display positions to the P-X and P-Y for the text data of these lyrics text lines allows these lines to be displayed at desired positions.

For example, when the display control is performed based on the karaoke text file data thus specified, lyrics text lines can be displayed that generally complies with a normal karaoke lyrics display arrangement. That is, if a lyrics text containing a certain number of characters (lines) in a certain timed relation is displayed beforehand, the characters of the displayed lyrics text can be wiped sequentially in synchronization with the progress of the melody of the music.

Meanwhile, if 2-byte-code text data such as kanji and European character is stored as lyrics text information at a predetermined position in the karaoke text file sector practiced as the variation C, a 3-byte area, byte 6 through byte 8, is allocated to store this text data in a block to which SOL is set for example (block #1 in the case of FIG. 29). Hence, if one character of 2-byte-code text data is recorded at byte 6 and byte 7, byte 8 remains unused. If this happens, the upper one byte of the 2-byte-code text data may be stored in byte 8, the lower two bytes being stored in byte 1 of the following block (block #2 in the case of FIG. 29).

If 2-byte-code text data is stored in the karaoke text file sector, two pairs of "WL* and PL*" are allocated to one character of text data according to the format shown in FIG. 29. Therefore, setting different times to these two pairs of "WL* and PL*" for example also allows display control in which the left half of displayed characters is wiped first, followed by wiping of the right half as the melody goes.

It should be noted that, if the reproducing system has no capability of lyrics text wipe display for example, the variation C can at least execute lyrics text display in synchronization with the progress of music in the same manner as the arrangement of the karaoke text file data described above.

In this case, of the contents of the karaoke text file data shown in FIG. 29, at least the character information (or text data) and the Display Start Address information may only be read.

To be more specific, the text data and the Display Start Address are read for each data area based on SOL-identified blocks to generate lyrics text line data from the read text data. Then, the generated lyrics text line data may be arranged so that the lyrics text line is displayed in a timed relation based on the Display Start Address. It should be noted that display of a displayed lyrics text line may be ended in a time relation in which a lyrics text line is displayed based on the next Display Start Address.

As described, the variation C specifies the character information for a lyrics text and the various control information for this character information to be stored as the karaoke text file data as shown in FIG. 29. This arrangement realizes a display form approximately conforming to an actual karaoke lyrics text display method including lyrics text wipe display while relating the character information with the above-mentioned display control information through a comparatively simple control arrangement. In addition, the variation C does not limit the number of sectors as the karaoke text file data corresponding to one track, so that, if the number of lyrics text characters of one piece of music exceeds an average, all characters may be accommodated by linking the enough number of sectors.

9-4 Variation D

The following describes the variation D.

Like the variation C, the variation D also provides a karaoke text file arrangement intended to enable display control including the wipe processing of displayed characters.

Like the above-mentioned variations, the variation D does not use the AUX-TOC sector 9. In addition, the variation D controls the area recording one karaoke text file corresponding to each of tracks 1 through 255 by specifying a particular part table. However, the variation D specifies that one karaoke text file corresponding to one track is formed by the predetermined number of continuous sectors. The following description will be made by assuming that one karaoke text file corresponding to one track is formed by three continuous sectors.

FIG. 31 schematically illustrates a mapping example of the karaoke text file data in AUX data to be specified by pointer P-TN0n in the AUX-TOC sector 8.

As shown in the figure, the karaoke text file corresponding to track n to be specified by pointer P-TN0n of the AUX-TOC sector 8 is formed by areas of three sectors (#n, #n+1, and #n+2) to be recorded continuously in the AUX data area. In this case, the sector #n is specified by the start address of the part table pointed by pointer P-TN0(n) of the AUX-TOC sector 8 and the sector #n+2 is specified by the end address of that part table.

In the following description, the three karaoke text file sectors corresponding to one track are referred to as a first sector, a second sector, and a third sector from top to bottom.

Figure 32:
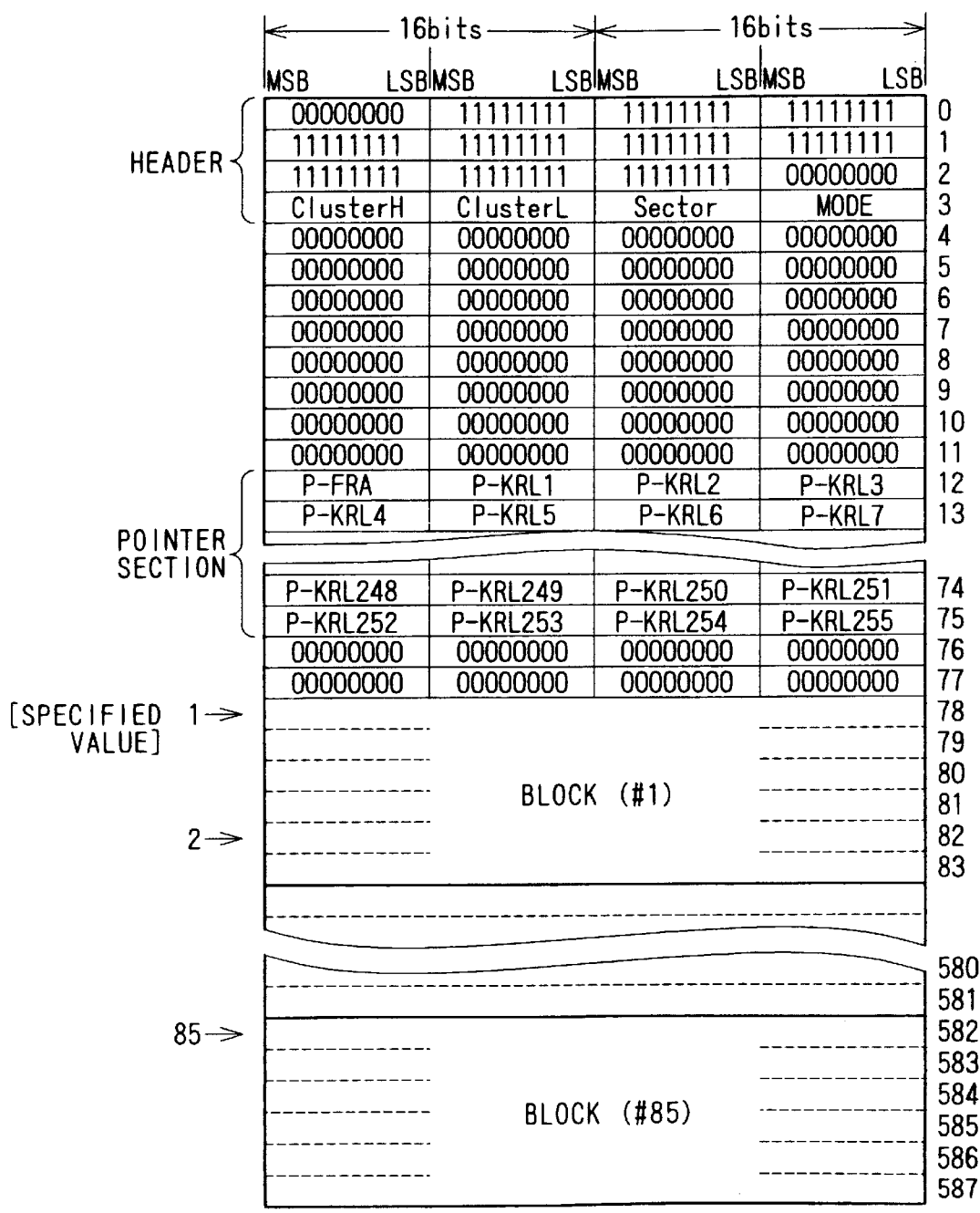
FIG. 32 is a diagram illustrating a first sector of the fourth preferred embodiment shown in FIG. 31.
Figure 33:
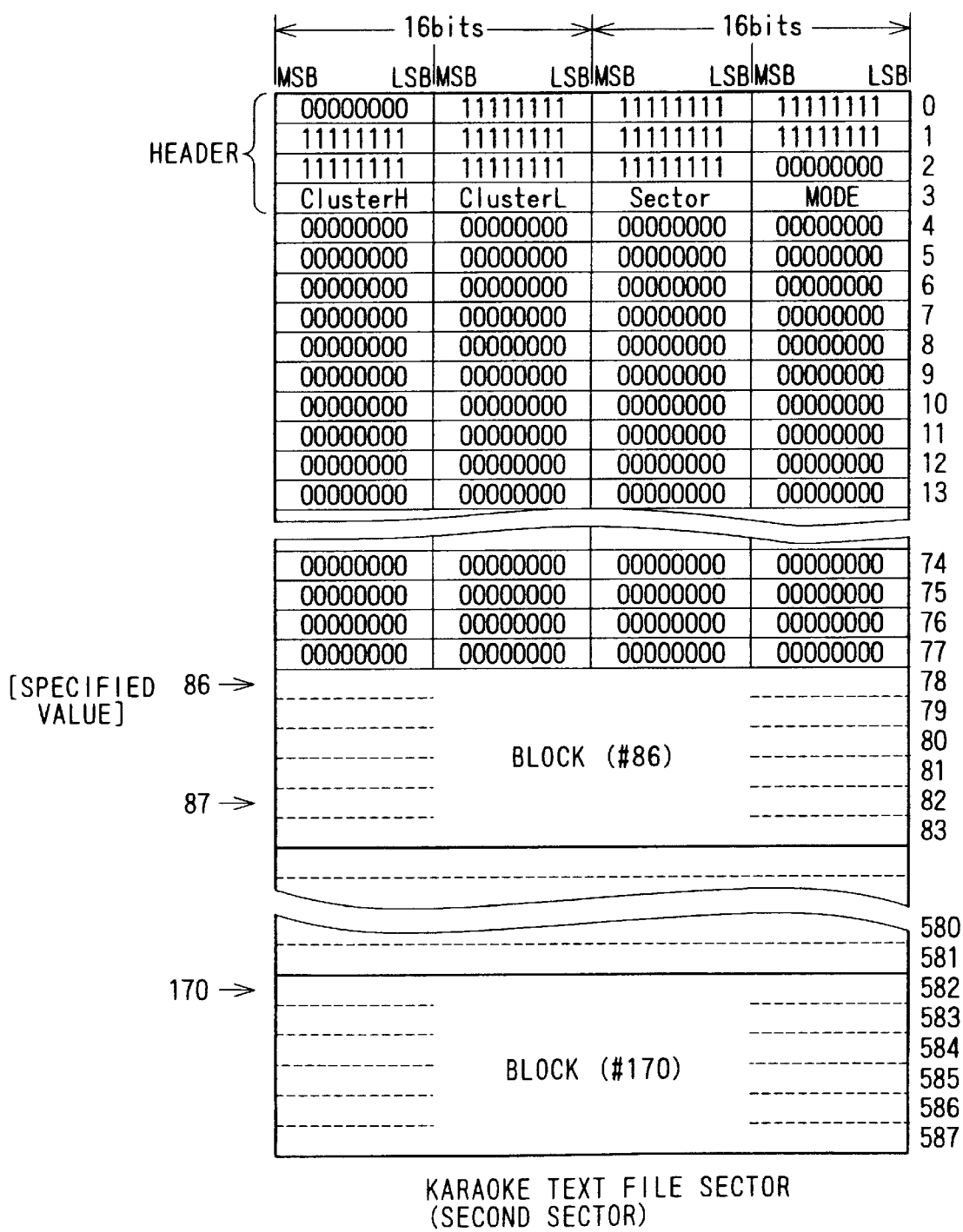
FIG. 33 is a diagram illustrating a second sector of the fourth preferred embodiment shown in FIG. 31.
Figure 34:
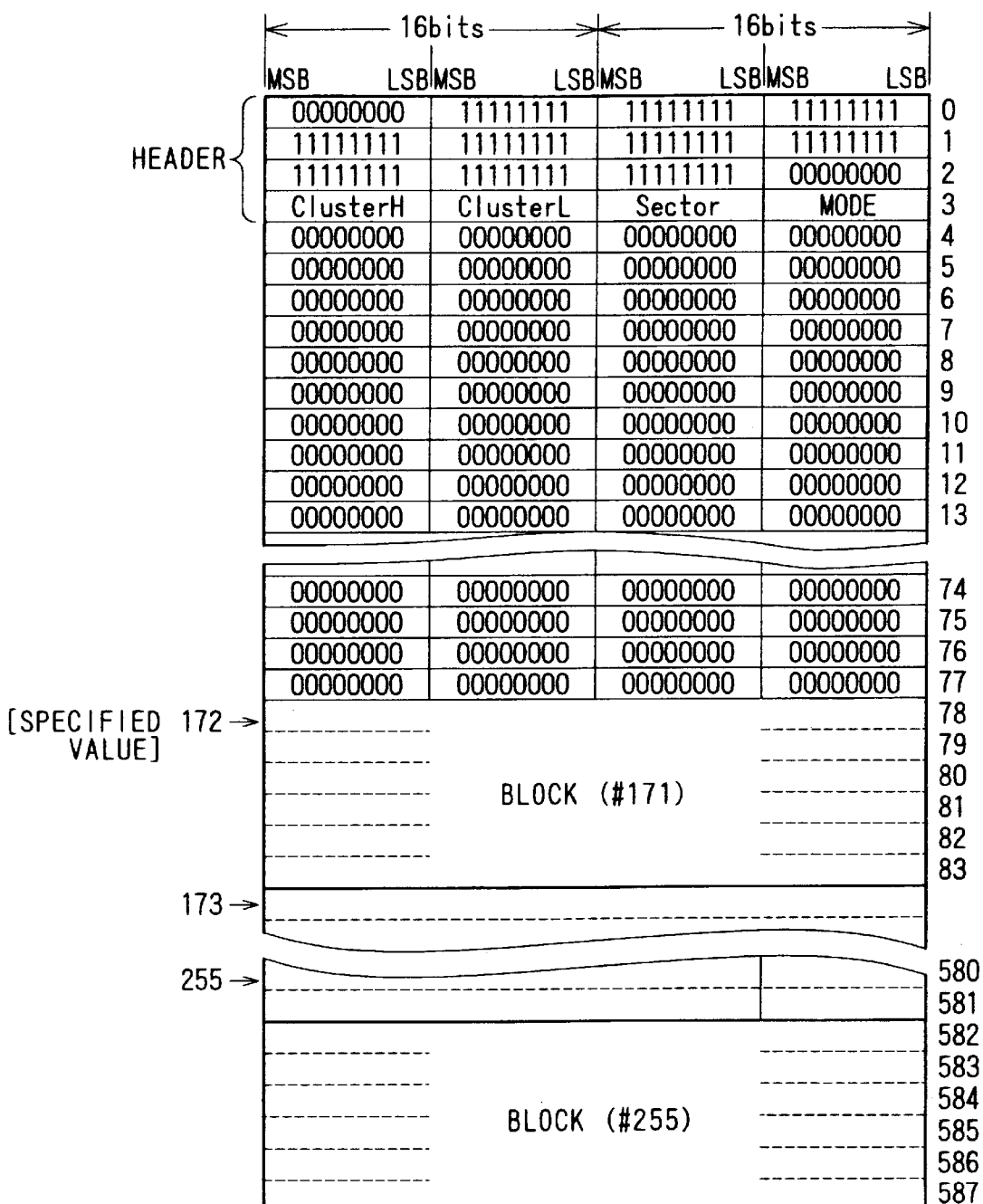
FIG. 34 is a diagram illustrating a third sector of the fourth preferred embodiment shown in FIG. 31.

FIGS. 32, 33, and 34 illustrate the structures of the first sector, the second sector, and the third sector respectively of the karaoke text file.

In the first sector shown in FIG. 32, a header is followed by a pointer section starting with line 11. The pointer section contains pointer P-FRA and pointers P-KRL1 through P-KRL255 in this order. A data area starts with a slot at line 78 and ends with a slot at line 587. Like that of the variation C, the data area is formed on a block basis, each block consisting of six lines of slots (24 bytes). In this case, 85 blocks are provided for each sector as is given by (587−77)/6=85.

In the second sector and the third sector shown in FIGS. 33 and 34 respectively, no pointer section is provided. This is because the karaoke text file data in the first sector through the third sector are collectively controlled by the pointers P-KRL1 through P-KRL255 of the first sector as will be described later.

In each of the second and third sectors, lines 78 through 587 are allocated as slots to the data area, so that the data area consisting of 85 blocks exists in each sector. Therefore, for the karaoke text file data formed by the first sector through the third sector, the data areas consisting of a total of 85×3=255 blocks exist. Namely, as for the data areas of the first sector through the third sector alone, 255 blocks are set in blocks #1 through #85 (the first sector), blocks #86 through #170 (the second sector), and blocks #171 through #255 (the third sector). This means that a maximum of 255 lines of lyrics text can be set for one track according to the data area format of the variation D to be described later.

FIGS. 35A through 35C are diagrams illustrating tables providing relationships between pointer P-KRL(n) and the slots in the first sector through the third sector.

Pointer P-KRL(n) indicates that a lyrics text line in one track correspond to n-th line (up to 255 lines). As shown in FIG. 32, the value of pointer P-KRL(n) can be set to any of P-KRL1 through P-KRL255.

A value to be actually recorded in the area of each of pointer P-KRL(n), namely a value specified by pointer P-KRL(n), is 1 to 255 in correspondence to the maximum number of blocks 255 included in the first sector through third sector. The values to be specified by pointer P-KRL(n) are divided into the following:

$$1 \leq K \leq 85, \ 86 \leq L \leq 170, \ 171 \leq M \leq 255.$$

When value K is taken as a specification value of pointer P-KRL(n), a slot corresponding to the specified value is specified in the first sector as shown in FIG. 35A. For example, if K=1, the slot at line 78 in the first sector is specified. This specifies the start slot in block #1. If K=2, the slot at line 84 in the first sector (the start slot in block #2) is specified.

Namely, if value K is specified as pointer P-KRL(n), the slot at line 72+6K in the first sector is specified.

If the last block #85 in the first sector for example is specified, the slot at line 72+6×85=line 582 is specified from value K=85.

If value L is taken as the specification value of pointer P-KRL(n), a slot in the second sector is specified as shown in FIG. 35B. Namely, the line indicated by the slot at line 6L—438 in the second sector is specified.

For example, if L=86, then 6×86−438=78 and the slot at line 78 in the second sector (the start slot of block #86) is specified. If L=87, then 6×87−438=87 and the slot at line 87 in the second sector (the start slot of block #86) is specified. If L=170, then 6×170−438=582, and the start slot of the last block #170 of the second sector is specified.

If value M is taken as the specification value of pointer P-KRL(n), the slot indicated by line 6M—948 in the third sector is specified as shown in FIG. 35C.

For example, if M=171, then 6×171−948=78 and the slot at line 78 in the third sector (the start slot of block #171) is specified. If M=172, then 6×172−948=87 and the slot at line 87 in the third sector (the start slot of block #86) is specified. If M=255, the start slot of the last block #255 of the third sector, the slot at line 582 (6×255−948=582) is specified.

Namely, the specification value of pointer P-KRL(n) can be eventually regarded as specifying a block in correspondence to block numbers #1 through #255 stored in the first sector through the third sector.

The block specified by pointer P-KRL(n) is the first block of the blocks that form "n" lyrics text line in one track and is always the header block with SOL set to its byte 1 if the format of the karaoke text file data to be described later is followed.

For example, the system controller 11 reads pointer P-KRL(n) of the first sector and executes computational processing such as described above according to the value of pointer P-KRL(n) as shown in FIGS. 35A through 35C, thereby identifying a required slot position specified by this pointer.

If "2" (in decimal notation) for example is recorded as pointer P-KRL2, the slot at line 84 of the first sector is specified as given by 72+6K=72+6×2=84. This means that the blocks for storing a karaoke text file as a second lyrics text line in a certain track starts with the slot at line 84 of the first sector (block #2). At this time, block #2 is the header block with SOL recorded at its byte 1.

FIG. 36 shows the format of karaoke text file data for one line of karaoke lyrics text. It is assumed here that the lyrics line be stored first in a track. Namely, FIG. 36 shows the structure of one line of lyrics text file data that starts with the slot at line 78 of the first sector specified by "1" (decimal notation) of pointer P-KRL1 of the first sector.

It should be noted that the description of the same portions in FIG. 36 as those defined for the variation C shown in FIG. 29 will be omitted.

In the variation D, character information as a lyrics text is not stored in byte 8 of each block. Instead, over the first sector through the third sector, link information indicative of a next block position is stored. In this case, any one of 1 through 255 (decimal notation) is recorded as link information LinkP according to the same definition as the specification value of pointer P-KRL(n) described above with reference to FIG. 35. If Link=0, it includes that the current block is followed by no other blocks.

In other words, a block with LinkP=0 set is the last block of more than one block forming one lyrics text line of karaoke text file data.

Referring to FIG. 36, in block # with SOL set to its byte 1, text data of characters "a" and "b" forming a lyrics text are stored in byte 6 and byte 7 respectively. This means that the first lyrics text line for this track start with characters "a" and "b". The link information stored in byte 8 indicates LinkP=4 (=K). This logically links, after block #1, block #4 with the slot at line 96 (72+6×4) of the first sector being the first slot.

If the block for forming the same lyrics text line as that of block #1 is block #2 for example, LinkP=2 is set for the link information. Like the variation C shown in FIG. 29, CTL, Fnt, P-X, P-Y, Display Start Address, Wipe Start, and Wipe End are set at predetermined byte positions in block #1. In block #1 in this case, wipe control information WLa, PLa, WLb, and PLb associated with characters "a" and "b" are set in bytes 19 and on. Byte 23 and byte 24 in this case are not defined. This is because no text data is stored in byte 8, so that wipe control information to be set to byte 23 and byte 24 does not exist.

In block #3 to be linked after the above-mentioned block #1, text data characters "c", "d", "e", "f", "g", "h", and "i" are stored in byte 1 through byte 7. The link information at byte 8 is LinkP=0, indicating that block #3 is followed by no other blocks. Namely, the text file data forming this one lyrics text line is formed by two blocks #1 and #3. One line of lyrics text is formed by nine text data characters "a, b, c, d, e, f, g, h, and i".

If, in block #3, one line of lyrics text is completed by storing text data characters "c, d, e, f, g, and h" in byte 1 through byte 6 for example, all "0s" are set to byte 7 in which no text data is stored.

In block #3 shown in FIG. 36, wipe control information WLc, PLc through WLi, and PLi associated with text data characters c, d, e, f, g, h, and i are sequentially stored in byte 9 through byte 22. In this case too, byte 23 and byte 24 are left undefined because the link information is set to byte 8 of block #3.

In the variation D, pointer P-FRA in the first sector controls blocks in the first sector through the third sector as free areas by way of example.

In this case too, a value to be set to pointer P-FRA is one of 1 through 255 (decimal notation) according to the same definition as the specification value of pointer P-KRL(n) described with reference to FIG. 35 based on an actual control arrangement.

For example, to control an unused area in the first sector through the third sector by pointer P-FRA, a certain block (#n) that is the start block of the unused area is specified by pointer P-FRA (as described above, the slot at the start line of that block is specified). If this block (#n) is followed by a block as an unused area, a value indicative of the slot at the first line of the block as an unused area following the block (#n) is recorded to the area of the link information at byte 8 of the block (#n) by way of example. If the current block is followed by no other block as an unused area, all "0s" for example are recorded as the link information at byte 8.

Like the variation C, the above-mentioned karaoke text file arrangement realizes a display operation approximately conforming to a general karaoke lyrics text displaying arrangement. Namely, the karaoke lyrics text display capability based on the arrangement described with reference to FIG. 29 is provided.

In this case, a karaoke text file as one lyrics text display line is formed by linking blocks by the link information. Therefore, within the areas of the first sector through the third sector for one track, not only various display control information for lyrics text character information can be changed, but also a corresponding degree of freedom can be imparted to the modification and change of the character information.

For example, in making modification such as adding characters for forming a certain lyrics text line, if the number of blocks necessary for forming a karaoke text file for that lyrics text display line increases, a particular block may be selected from among free area blocks or unused blocks in the first sector through the third sector and add the selected block to the blocks forming the karaoke text file. In doing so, the link relation of the newly added block is indicated by the link information of the preceding block.

When the number of blocks enough for storing the karaoke text file for the lyrics text display line has been allocated, the data modified by adding the lyrics text characters may be written to the above-mentioned blocks. In doing so, the value of pointer P-FRA in the first sector and the link information in the block as a free area are rewritten as required.

It should be noted that, although the variation C and the variation D have been described as examples of application to a karaoke system, the actual application is not limited to this at all. For example, it is practicable to record a foreign language learning software program in the program area as the main data to generate and record corresponding text file data based on the variation C and the variation D. Namely, in synchronization with the pronunciation of a sample foreign language sentence as the main data, characters forming that sample sentence or a reply sentence are displayed, in which wipe processing is performed as a pronunciation guide for example. In other words, in at least the variation C and the variation D, any software that can impart the variation in display form to displayed characters by predetermined display control information is not by any means limited to the karaoke application. Therefore, the display control information may be defined for a character string or each character in other appropriate manners than those defined in the variation C and the variation D.

In the above-mentioned embodiment and variations thereto, a magneto-optical disc is used for the disc 90. It will be apparent to those skilled in the art that the structures and output operations of the AUX data and AUX-TOC may also be applied to a reproduction-only disc in the same manner.

Obviously, in the above-mentioned case, the disc manufacturer (or a disc software maker) records the AUX data and sets the output timing.

In the above-mentioned embodiment and variations thereto, the output timing of character information for example is specified by the address (absolute address or offset address) in the program. It will be apparent to those skilled in the art that, instead of address specification, a time value from starting of music reproduction may be recorded to specify the output timing for example.

The above-mentioned embodiment is a Mini Disc system. It will be apparent to those skilled in the art that the present invention is widely applicable to other various recording and/or reproducing systems.

As mentioned above and according to the invention, the recording medium records programs as main data and data files of characters and images for example as auxiliary data. The data files as auxiliary data are recorded in particular areas that provide auxiliary data areas. The data files are controlled by auxiliary data control information independently of the programs. Further, appropriately specifying the auxiliary data control information allows the data in a certain data file to be outputted in synchronization with the output timing in a particular program.

The above-mentioned novel constitutions bring about the following advantages.

Because the data files as auxiliary data are recorded in auxiliary data areas different from program areas and controlled by the auxiliary data control information, the data files can be recorded, updated, and edited independently of programs. This novel arrangement, when recording or modifying a data file of characters or images as auxiliary data for example, eliminates the need for recording the corresponding program at the same time, thereby realizing easy and quick recording and updating operations.

In addition, because the auxiliary data is controlled by the auxiliary data control information independently of programs. Consequently, a significantly high degree of freedom is imparted to the data files as auxiliary data, so that the data files can be recorded, reproduced, edited, or their control state can be set or updated without being constrained by the program reproducing operation state and control state.

Because data files as auxiliary data can be outputted in synchronization with the output timing in a particular program by auxiliary data control information, a data file as information of a song lyrics text for example can be displayed in synchronization with program reproduction, thereby providing operations such as display of singing contents as music performance and display as karaoke guiding. Thus, the program and the data files associated thereto can be reproduced in conjugation, thereby providing a variety of reproducing operations.

In addition, in the output operations in synchronization with the contents of a program, data file output is not controlled by main data control information. This facilitates the modification for example of output timings, thereby facilitating the adjustment in which the display timing of characters to be displayed is matched to the music, or a program. This novel arrangement can realize a recording and/or reproducing system that is high in functional upgradability and ease of operation.

Especially because display control information required for each character or a character string to be displayed is recorded for character information as a data file of auxiliary data, not only the character information can be displayed or erased in synchronization with main data reproduction but also a variety of display effects can be imparted to displayed characters.

If the present invention is applied to a karaoke system for example, while reproducing a audio as a karaoke song by use of the main data, use of a karaoke data file as the auxiliary data allows control operations such as displaying a character string onto a desired display area in a desired timed relation and imparting an effect known as wiping to the characters forming the displayed character string. Namely, the present invention can realize substantially the same display form as that generally practiced at a commercial level for example as song lyrics text display processing that provides karaoke signing guide.

While the preferred embodiments of the present invention have been described using specific terms, such description is for illustrative purposes only, and it is to be understood that changes and variations may be made without departing from the spirit or scope of the appended claims.

What is claimed is:

1. A reproducing apparatus for reproducing a recording medium having main data area for recording a main program composed of main data, an auxiliary data area for recording, independently of said main program, an auxiliary program composed of auxiliary data corresponding to said main program composed of said main data in said main data area, a first control area for controlling at least a recording position of said main program composed of said main data in said main data area, and a second control area for controlling at least a recording position of said auxiliary program composed of said auxiliary data in said auxiliary data area and timing information for reproducing said auxiliary program in synchronization with said main program composed of said main data in said main data area, said reproducing apparatus comprising:

reproducing means for reproducing said first control area, said second control area, said auxiliary data area, and said main data area sequentially;

a memory means for storing said auxiliary program composed of said auxiliary data reproduced by said reproducing means from said auxiliary data area;

a memory control means for reading from said memory means said auxiliary program composed of said auxiliary data corresponding to said main program in synchronization with said main program reproduced from said main data area by said reproducing means based on said timing information reproduced from said second control area by said reproducing means; and a display means for displaying said auxiliary program in synchronization with said main program, said auxiliary program being read from said memory means.

2. The reproducing apparatus as claimed in claim 1, wherein said auxiliary program composed of said auxiliary data recorded in said auxiliary data area is a still image.

3. The reproducing apparatus as claimed in claim 1, wherein said auxiliary program composed of said auxiliary data recorded in said auxiliary data area is text data.

4. The reproducing apparatus as claimed in claim 1, wherein said main data is karaoke data and said auxiliary data is lyrics text data to be reproduced in synchronization with said karaoke data.

5. The reproducing apparatus as claimed in claim 1, wherein said first control area controls therein at least a main program number and a start address and an end address of said main program composed of said main data in said main data area corresponding to said main program number and said second control area controls therein said main program number, an output timing of said auxiliary data to be synchronously reproduced in correspondence to said main program number, and an auxiliary program number of said auxiliary data to be synchronously reproduced in correspondence to said main program number.

6. The reproducing apparatus as claimed in claim 3, wherein said second control area further controls therein a control code for controlling a display position, a font, a font color, and a wipe timing of text data on said display means.

7. A recording apparatus for recording auxiliary data in a manner related to main data onto a recording medium having main data area for recording a main program composed of said main data, an auxiliary data area for recording, independently of said main program, an auxiliary program composed of said auxiliary data corresponding to said main program composed of said main data in said main data area, a first control area for controlling at least a recording position of said main program composed of said main data in said main data area, and a second control area for controlling at least a recording position of said auxiliary program composed of said auxiliary data in said auxiliary data area and timing information for reproducing said auxiliary program in synchronization with said main program composed of said main data in said main data area, said recording apparatus comprising:

a recording means for independently recording said auxiliary program composed of said auxiliary data corresponding to said main program onto said auxiliary data area;

an operating means for relating said auxiliary program recorded by said recording means to said main program recorded in said main data area; and an updating means for updating, based on said recording position of said auxiliary program recorded in said auxiliary data area by said recording means and an operation performed through said operating means, said auxiliary program composed of said auxiliary data in said auxiliary data area recorded in said second control area and timing information for use in synchronous reproduction of said auxiliary program and said main program.

8. The recording apparatus as claimed in claim 7, wherein said auxiliary program composed of said auxiliary data recorded in said auxiliary data area is a still image.

9. The recording apparatus as claimed in claim 7, wherein said auxiliary program composed of said auxiliary data recorded in said auxiliary data area is text data.

10. The recording apparatus as claimed in claim 7, wherein said main data is karaoke data and said auxiliary data is lyrics text data to be reproduced in synchronization with said karaoke data.

11. The recording apparatus as claimed in claim 7, wherein said first control area controls therein at least a main program number and a start address and an end address of said main program composed of said main data in said main data area corresponding to said main program number and said second control area controls therein said main program number, an output timing of said auxiliary data to be synchronously reproduced in correspondence to said main program number, and an auxiliary program number of said auxiliary data to be synchronously reproduced in correspondence to said main program number.

12. The recording apparatus as claimed in claim 9 further comprising:

a display means for displaying said text data; wherein said second control area further controls therein a control code for controlling each of a display position, a font, a font color, and a wipe timing of said text data to be displayed on said display means.

13. A recording medium having a main data area for recording at least one main program composed of main data, an auxiliary data area for recording, independently of said main program, an auxiliary program composed of auxiliary data corresponding to said main program composed of main data, a first control area for controlling at least a recording position of said main program composed of main data in said main data area, and a second control area for controlling at least a recording position of said auxiliary program composed of auxiliary data in said auxiliary data area and timing information for reproducing said auxiliary program in synchronization with said main program, said timing information being in a form configured to be edited by a user in order to adjust the reproducing of said auxiliary program in synchronization with said main program.

14. The recording medium as claimed in claim 13, wherein said first control area controls therein at least a main program number and a start address and an end address of said main program composed of said main data in said main data area corresponding to said main program number and said second control area controls therein said main program number, an output timing of said auxiliary data to be synchronously reproduced in correspondence to said main program number, and an auxiliary program number of said auxiliary data to be synchronously reproduced in correspondence to said main program number.

15. The recording medium as claimed in claim 13, wherein said auxiliary program composed of said auxiliary data recorded in said auxiliary data area is a still image.

16. The recording medium as claimed in claim 13, wherein said auxiliary program composed of said auxiliary data recorded in said auxiliary data area is text data.

17. The recording medium as claimed in claim 16, wherein said second control area further controls therein a control code for controlling each of a display position, a font, a font color, and a wipe timing of said text data.

* * * * *

UNITED STATES PATENT AND TRADEMARK OFFICE
CERTIFICATE OF CORRECTION

PATENT NO. : 6,288,990 B1
DATED : September 11, 2001
INVENTOR(S) : Kazuhiko Fujiie et al.

It is certified that error appears in the above-identified patent and that said Letters Patent is hereby corrected as shown below:

Column 8,
Line 61, please insert -- as -- between "such" and "an".

Column 11,
Line 8, please change "A0032h" to -- 0032h --.

Column 15,
Line 3, please change "o" to -- 0 -- (zero).

Column 22,
Line 57, please change "performed" to -- perform --.

Column 23,
Line 32, please change "control led" to -- controlled --;
Line 33, please change "With" to -- with --;
Line 51, please change "650" to -- 640 --.

Column 24,
Lines 6, 22 and 48, please change "RDC0" to -- EDC0 --.

Column 26,
Line 49, please change "th e" to -- the --.

Column 27,
Line 18, please change "AUXU-TOC" to -- AUX-TOC --;
Line 33, please change "AUX-U-TOC" to -- AUX-TOC --.

Column 28,
Line 32, please insert -- of -- after "specification";
Line 38, please change "display" to -- displayed --.

Column 29,
Line 29, please insert -- be -- before "performed"; same line, change "made" to -- done --;
Line 67, please change "AUX-U-TOC" to -- AUX-TOC --.

UNITED STATES PATENT AND TRADEMARK OFFICE
CERTIFICATE OF CORRECTION

PATENT NO. : 6,288,990 B1
DATED : September 11, 2001
INVENTOR(S) : Kazuhiko Fujiie et al.

It is certified that error appears in the above-identified patent and that said Letters Patent is hereby corrected as shown below:

Column 30,
Line 2, please change "AUX-U-TOC" to -- AUX-TOC --;
Line 6, please change "AUX-U-TOC" to -- AUX-TOC --.

Column 31,
Line 5, please insert -- is -- after "always".

Column 32,
Line 61, please change "during" to -- duration --; same line, please change "may" to -- many --.

Column 33,
Line 44, please change "Liming" to -- timing --.

Column 38,
Line 23, please change "Link=0" to -- LinkP=0 --; same line, please change "includes" to -- indicates --;
Line 34, please insert -- = -- before "72".

Signed and Sealed this

Sixteenth Day of July, 2002

Attest:

JAMES E. ROGAN
Attesting Officer         Director of the United States Patent and Trademark Office